(12) United States Patent
Molev Shteiman et al.

(10) Patent No.: US 10,205,491 B2
(45) Date of Patent: Feb. 12, 2019

(54) SYSTEM AND METHOD FOR LARGE SCALE MULTIPLE INPUT MULTIPLE OUTPUT COMMUNICATIONS

(71) Applicant: Futurewei Technologies, Inc., Plano, TX (US)

(72) Inventors: Arkady Molev Shteiman, Bridgewater, NJ (US); Xiao-Feng Qi, Westfield, NJ (US); Yun Liu, Chengdu (CN)

(73) Assignee: Futurewei Technologies, Inc., Plano, TX (US)

( * ) Notice: Subject to any disclaimer, the term of this patent is extended or adjusted under 35 U.S.C. 154(b) by 142 days.

(21) Appl. No.: 15/226,361

(22) Filed: Aug. 2, 2016

(65) Prior Publication Data

US 2017/0093467 A1    Mar. 30, 2017

Related U.S. Application Data

(63) Continuation-in-part of application No. 14/867,931, filed on Sep. 28, 2015, now abandoned, and a
(Continued)

(51) Int. Cl.
*H04B 7/0413*    (2017.01)
*H04L 12/26*    (2006.01)
(Continued)

(52) U.S. Cl.
CPC ............. *H04B 7/0413* (2013.01); *H04B 7/04* (2013.01); *H04B 7/0456* (2013.01); *H04B 7/0617* (2013.01); *H04L 43/16* (2013.01)

(58) Field of Classification Search
CPC ...... H04B 7/04; H04B 7/0413; H04B 7/0617; H04B 7/0456; H04L 43/16
See application file for complete search history.

(56) References Cited

U.S. PATENT DOCUMENTS

| | | | |
|---|---|---|---|
| 7,072,669 B1 | 7/2006 | Duckworth | |
| 8,023,577 B2 * | 9/2011 | Pande | H04L 25/0204 375/260 |

(Continued)

FOREIGN PATENT DOCUMENTS

| | | |
|---|---|---|
| CN | 1933356 A | 3/2007 |
| CN | 103004267 A | 3/2013 |

(Continued)

OTHER PUBLICATIONS

Dammann A., et al., "WHERE2 Location Aided Communications," Europoean Wireless, Guildford, UK, Apr. 16-18, 2013, pp. 1-8.
(Continued)

*Primary Examiner* — Jenee Holland
(74) *Attorney, Agent, or Firm* — Slater Matsil, LLP

(57) ABSTRACT

A method for communicating using a large scale multiple input multiple output (MIMO) antenna array, the method includes determining angular domain channel estimates of the large scale MIMO antenna array in accordance with antenna domain channel estimates of the large scale MIMO antenna array, identifying significant beams of the large scale MIMO antenna array by maximizing the angular domain channel estimates, and communicating with at least one receiving device utilizing the significant beams as identified.

22 Claims, 45 Drawing Sheets

Related U.S. Application Data continuation-in-part of application No. 14/932,849, filed on Nov. 4, 2015.

(51) Int. Cl.
*H04B 7/0456* (2017.01)
*H04B 7/04* (2017.01)
*H04B 7/06* (2006.01)

(56) References Cited

U.S. PATENT DOCUMENTS

| | | | |
|---|---|---|---|
| 8,989,768 B2 | 3/2015 | Woo et al. | |
| 9,008,008 B2* | 4/2015 | Baker | H04B 7/0417 370/329 |
| 2001/0049295 A1* | 12/2001 | Matsuoka | H04B 7/0617 455/562.1 |
| 2002/0128027 A1* | 9/2002 | Wong | H04B 7/0408 455/513 |
| 2002/0137538 A1* | 9/2002 | Chen | H04B 7/0491 455/575.7 |
| 2003/0068983 A1* | 4/2003 | Kim | H04B 7/0634 455/69 |
| 2003/0152099 A1* | 8/2003 | Chun | H04B 7/086 370/441 |
| 2003/0190897 A1 | 10/2003 | Lei et al. | |
| 2004/0063467 A1* | 4/2004 | Shapira | H01Q 3/26 455/561 |
| 2004/0204108 A1* | 10/2004 | Etkin | H04W 16/28 455/562.1 |
| 2004/0253987 A1* | 12/2004 | Lee | G01S 3/74 455/562.1 |
| 2005/0157683 A1* | 7/2005 | Ylitalo | H04B 7/0634 370/334 |
| 2006/0194552 A1* | 8/2006 | Jin | H04B 17/21 455/226.1 |
| 2007/0042720 A1* | 2/2007 | Pan | H04B 7/0417 455/69 |
| 2007/0142074 A1 | 6/2007 | Black et al. | |
| 2008/0009321 A1* | 1/2008 | Sayeed | H01Q 3/2605 455/562.1 |
| 2008/0218404 A1* | 9/2008 | Ma | G01S 13/0209 342/126 |
| 2009/0161805 A1* | 6/2009 | Gao | H04L 1/005 375/346 |
| 2009/0252251 A1* | 10/2009 | Tosato | H04B 7/0632 375/267 |
| 2009/0268835 A1* | 10/2009 | Imai | H04B 7/0626 375/267 |
| 2009/0299715 A1* | 12/2009 | Chan | H04L 25/0242 703/13 |
| 2010/0080269 A1* | 4/2010 | Kim | H04L 5/0032 375/211 |
| 2010/0239034 A1 | 9/2010 | Lee et al. | |
| 2010/0260288 A1* | 10/2010 | Aoki | H04B 7/043 375/296 |
| 2011/0013615 A1* | 1/2011 | Lee | H04L 5/0023 370/344 |
| 2011/0105174 A1* | 5/2011 | Pelletier | H04W 52/367 455/522 |
| 2011/0110307 A1* | 5/2011 | Ko | H04B 7/0669 370/328 |
| 2013/0028341 A1* | 1/2013 | Ayach | H04B 7/0478 375/267 |
| 2013/0034130 A1 | 2/2013 | Forenza et al. | |
| 2013/0064129 A1* | 3/2013 | Koivisto | H04B 7/0621 370/252 |
| 2013/0120191 A1* | 5/2013 | Zhang | H04B 7/0469 342/377 |
| 2013/0163457 A1* | 6/2013 | Kim | H04W 24/02 370/252 |
| 2013/0163544 A1* | 6/2013 | Lee | H04W 72/04 370/329 |
| 2013/0258874 A1* | 10/2013 | Khoshnevis | H04L 5/0057 370/252 |
| 2013/0315328 A1* | 11/2013 | Liu | H04B 7/0413 375/267 |
| 2014/0018004 A1 | 1/2014 | Li et al. | |
| 2014/0153675 A1* | 6/2014 | Dandach | H04L 27/2684 375/340 |
| 2014/0266896 A1 | 9/2014 | Hyslop | |
| 2014/0278075 A1 | 9/2014 | Fink | |
| 2014/0317241 A1* | 10/2014 | Zhao | H04L 65/608 709/219 |
| 2014/0348255 A1* | 11/2014 | Lorca Hernando | H04B 7/0452 375/267 |
| 2014/0370823 A1* | 12/2014 | Yu | H04B 17/14 455/73 |
| 2015/0043439 A1* | 2/2015 | Sajadieh | H04W 76/14 370/329 |
| 2015/0049824 A1* | 2/2015 | Kim | H04B 7/0456 375/267 |
| 2015/0195019 A1* | 7/2015 | Nagata | H04B 7/0413 375/267 |
| 2015/0237510 A1 | 8/2015 | Kludt et al. | |
| 2015/0304868 A1* | 10/2015 | Yu | H04W 56/001 370/312 |
| 2015/0326289 A1* | 11/2015 | Kim | H04B 7/0639 375/267 |
| 2015/0334726 A1* | 11/2015 | Gao | H04B 7/04 370/330 |
| 2015/0372842 A1* | 12/2015 | Wicker, Jr. | H04L 25/0242 375/267 |
| 2016/0006122 A1* | 1/2016 | Seol | H04B 7/0408 342/372 |
| 2016/0044630 A1 | 2/2016 | Markhovsky et al. | |
| 2016/0066197 A1* | 3/2016 | Park | H04W 16/28 370/329 |
| 2016/0093950 A1 | 3/2016 | Cummings et al. | |
| 2016/0134015 A1* | 5/2016 | Sonoda | H01Q 1/1257 342/368 |
| 2016/0135180 A1* | 5/2016 | Yuan | H04B 7/0617 370/329 |
| 2016/0182196 A1* | 6/2016 | Lorca Hernando | H04L 5/0094 375/267 |
| 2016/0226564 A1* | 8/2016 | Taherzadeh Boroujeni | H04B 7/0417 |
| 2016/0380680 A1* | 12/2016 | Yang | H04B 7/0413 370/329 |
| 2017/0041811 A1* | 2/2017 | Qiao | H04W 16/28 |
| 2017/0048735 A1* | 2/2017 | Rao | H04W 40/12 |
| 2017/0187504 A1* | 6/2017 | Qian | H04L 5/00 |
| 2017/0214449 A1* | 7/2017 | Bi | H04L 1/06 |
| 2017/0295001 A1* | 10/2017 | Chen | H04L 5/0023 |

FOREIGN PATENT DOCUMENTS

| | | |
|---|---|---|
| CN | 103682677 A | 3/2014 |
| CN | 104410442 A | 3/2015 |
| CN | 104467934 A | 3/2015 |
| CN | 104902574 A | 9/2015 |
| JP | 2005249629 A | 9/2005 |
| WO | 2007027268 A2 | 3/2007 |

OTHER PUBLICATIONS

Di Taranto, R., et al., "Location-Aware Communications for 5G Networks," IEEE Signal Processing Magazine, Nov. 2014, pp. 102-112.

Guibene, W., et al., "Degrees of Freedom of Downlink Single- and Multi-Cell Multi-User MIMO Systems with Location Based CSIT," Vehicular Technology Conference, Jun. 5-5, 2013, pp. 1-5.

Larsson, E., et al, "Massive MIMO for Next Generation Wireless Systems," IEEE Communications Magazine, vol. 52, Issue 2, Feb. 2014, pp. 186-195.

Li, J., et al., "Position Location of Mobile Terminal in Wireless MIMO Communications Systems," Journal of Communications and Networks, vol. 9, No. 3, Sep. 2007, pp. 254-264.

(56) References Cited

OTHER PUBLICATIONS

Li, J., et al., "Joint Estimation of Channel Parameters for MIMO Communication Systems," Wireless Communications Systems, Sep. 7, 2005, pp. 22-26.

Slock, D., "Location Aided Wireless Communications," Proceedings of the 5th International Symposium on Communications, Control and Signal Processing, ISCCSP 2012, Italy, Rome, May 2-4, 2012, 6 pages.

Rusek, F., et al. "Scaling Up MIMO: Opportunities and Challenges with Very Large Arrays," IEEE Signal Processing Magazine, vol. 30, Issue 1, Jan. 2013, pp. 40-60.

Slock, D., "MIMO Broadcast and Interference Channels with Location based Partial CSIT," European Wireless 2013, Apr. 16-18, 2013, Guildford, UK, pp. 1-6.

Liu, L et al. "Cooperative Beamforming Algorithms Using the Assistant Information From Satellite Navigation Positioning Systems," Journal of Xidian University, Jun. 30, 2013, 1 page.

* cited by examiner

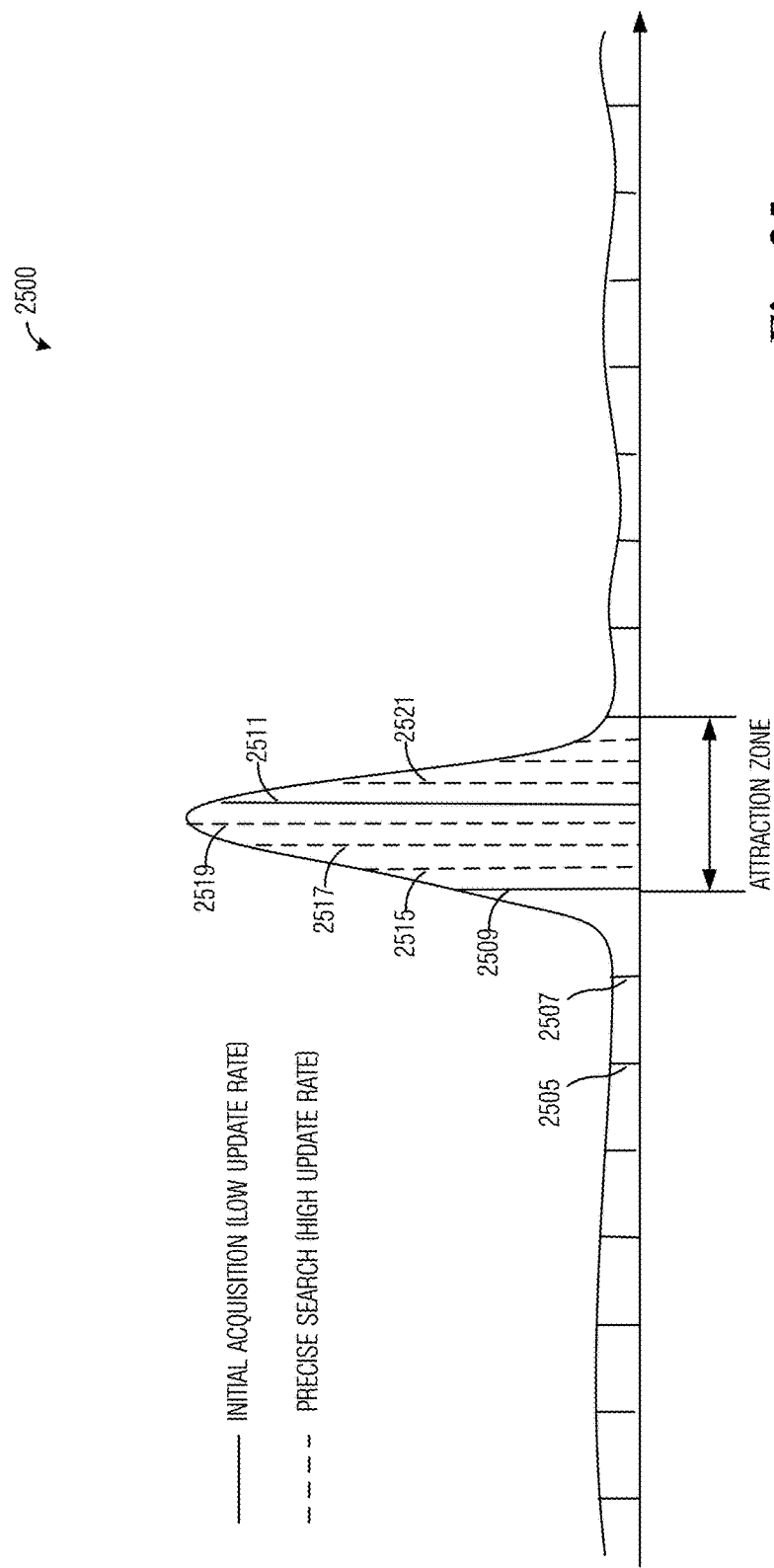

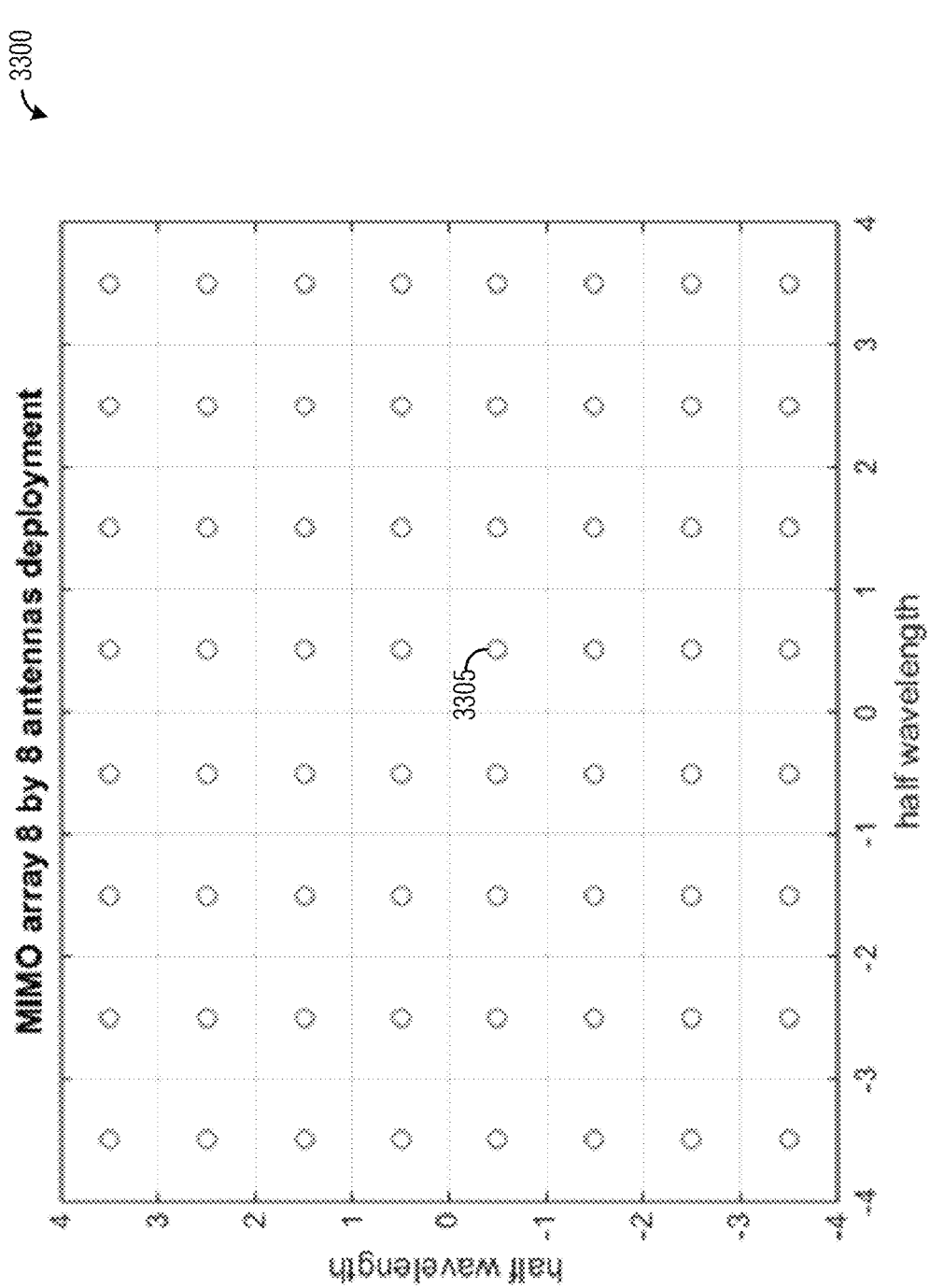

SYSTEM AND METHOD FOR LARGE SCALE MULTIPLE INPUT MULTIPLE OUTPUT COMMUNICATIONS

CROSS-REFERENCE TO RELATED APPLICATIONS

This application is a continuation-in-part of U.S. application Ser. No. 14/867,931, filed Sep. 28, 2015, entitled "System and Method for Large Scale Multiple Input Multiple Output Communications," and Ser. No. 14/932,849, filed Nov. 4, 2015, entitled "System and Method for Large Scale Multiple Input Multiple Output Beamforming," which applications are hereby incorporated herein by reference.

TECHNICAL FIELD

The present invention relates generally to a system and method for digital communications, and, in particular embodiments, to a system and method for large scale multiple input multiple output (MIMO) communications.

BACKGROUND

In general, multiple input multiple output (MIMO) increases the capacity of a radio link through the use of multiple transmit antennas and multiple receive antennas. MIMO exploits multipath propagation to increase the capacity of the radio link. MIMO has proven to be effective at increasing the capacity of the radio link and has been accepted into a variety of technical standards, including WiFi or Wireless LAN: IEEE 802.11n, and IEEE 802.11ac; Evolved High-Speed Packet Access (HSPA+); Worldwide Interoperability for Microwave Access (WiMAX); and Third Generation Partnership Project (3GPP) Long Term Evolution (LTE) Advanced.

Increasing the number of transmit antennas and receive antennas from a relatively small number (on the order of 10 or fewer) to a significantly larger number (on the order of 100, 1000, 10000, or more) can lead to even greater increases in the capacity of the radio link. However, dramatically increasing the number of transmit antennas and receive antennas also greatly increases the computational complexity involved in signal processing, as well as the amount of data exchanged between the antennas and a processing unit supporting MIMO communications. Therefore, there is a need for systems and methods for supporting large scale MIMO communications.

SUMMARY

Example embodiments provide a system and method for large scale multiple input multiple output (MIMO) communications.

In accordance with an example embodiment, a method for communicating using a large scale MIMO antenna array is provided. The method includes determining, by a transmitting device, angular domain channel estimates of the large scale MIMO antenna array in accordance with antenna domain channel estimates of the large scale MIMO antenna array, and identifying, by the transmitting device, significant beams of the large scale MIMO antenna array by maximizing the angular domain channel estimates. The method includes communicating, by the transmitting device, with at least one receiving device utilizing the significant beams as identified.

In accordance with an example embodiment, a non-transitory computer-readable medium storing programming for execution by a processor is provided. The programming includes instructions to determine angular domain channel estimates of a large scale MIMO antenna array in accordance with antenna domain channel estimates of the large scale MIMO antenna array, identify significant beams of the large scale MIMO antenna array by maximizing the angular domain channel estimates, and communicate with at least one receiving device utilizing the significant beams as identified.

In accordance with an example embodiment, a large scale MIMO communications device is provided. The large scale MIMO device includes an antenna array, a processor, and a computer readable storage medium storing programming for execution by the processor. The programming including instructions configuring the large scale MIMO communications device to determine angular domain channel estimates of a large scale MIMO antenna array in accordance with antenna domain channel estimates of the large scale MIMO antenna array, identify significant beams of the large scale MIMO antenna array by maximizing the angular domain channel estimates, and communicate with at least one receiving device utilizing the significant beams as identified.

In accordance with an example embodiment, a method for decoding received signals is provided. The method includes transforming, by a receiving device, antenna domain received signals into angular domain received signals, and selecting, by the receiving device, antenna beams with an average energy levels exceeding a specified threshold out of available antenna beams of the receiving device. The method includes updating, by the receiving device, a received signal vector in accordance with the selected antenna beams, determining, by the receiving device, angular domain channel estimates and an angular domain noise covariance matrix in accordance with the updated received signal vector, and decoding, by the receiving device, the updated received signal vector utilizing an interference rejection combining (IRC) algorithm.

In accordance with an example embodiment, a non-transitory computer-readable medium storing programming for execution by a processor is provided. The programming including instructions to transform antenna domain received signals into angular domain received signals, select antenna beams with an average energy levels exceeding a specified threshold out of available antenna beams of a receiving device, and update a received signal vector in accordance with the selected antenna beams. The programming including instructions to determine angular domain channel estimates and an angular domain noise covariance matrix in accordance with the updated received signal vector, and decode the updated received signal vector utilizing an IRC algorithm.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 25 illustrates a two-dimensional plot of the estimate of the multipath channel in the angular domain for an example antenna array, highlighting a two-phased search according to example embodiments described herein;

FIG. 33 illustrates large scale MIMO antenna array according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

The embodiments will be described with respect to example embodiments in a specific context, namely MIMO communications systems that support very large numbers of transmit antennas and receive antennas. The embodiments may be applied to standards compliant FD communications systems, such as those that are compliant with Third Generation Partnership Project (3GPP), IEEE 802.11, WiMAX, HSPA, and the like, technical standards, and non-standards compliant MIMO communications systems, that support very large numbers of transmit antennas and receive antennas.

Figure 1:
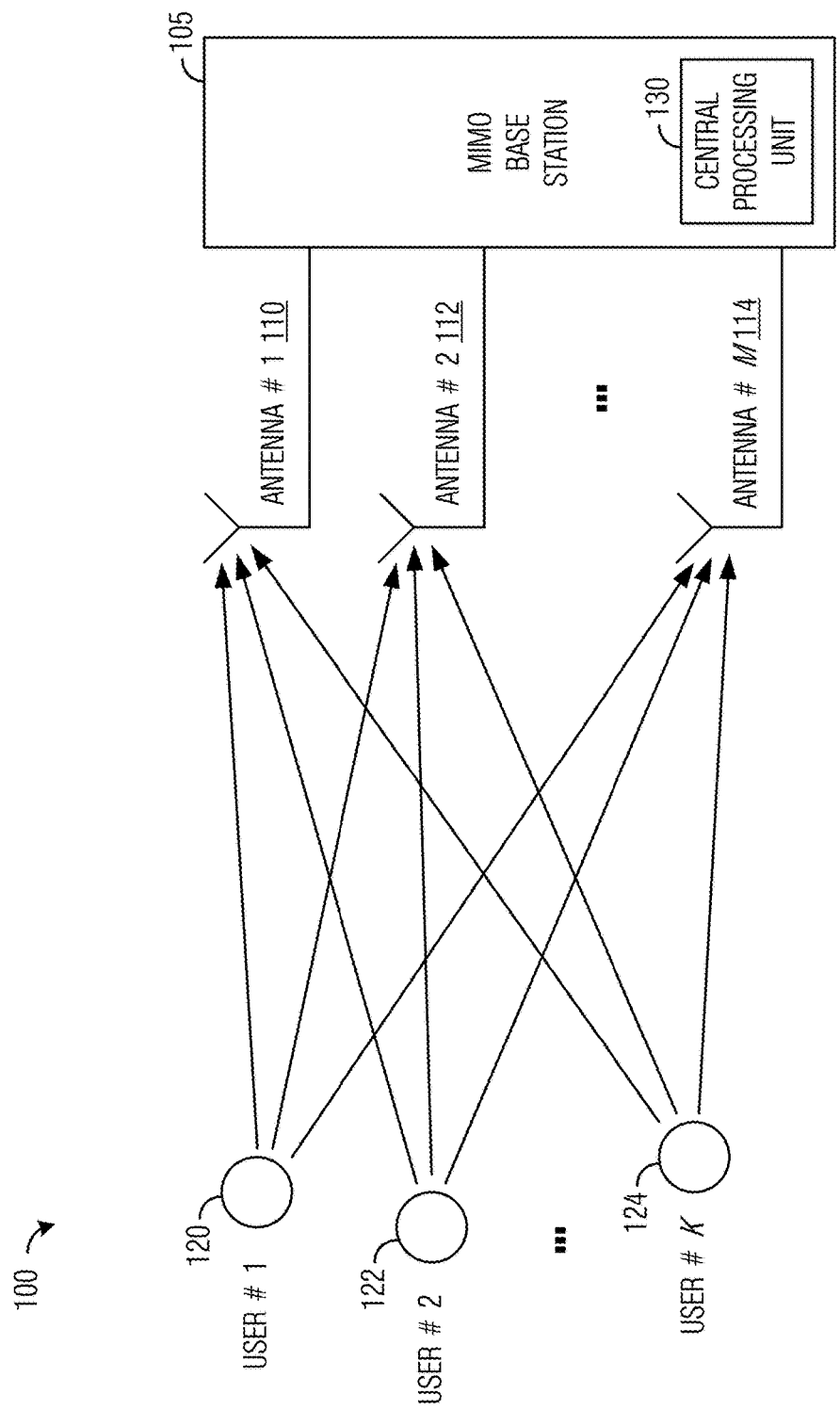
FIG. 1 is an example communications system highlighting MIMO reception according to example embodiments described herein.

FIG. 1 illustrates an example communications system 100 highlighting MIMO reception. Communications system 100 includes a MIMO base station 105 serving K users, such as user #1 120, user #2 122, and user #K 124, where K is an integer number greater than or equal to 1. MIMO base station 105 includes M receive antennas, such as antenna #1 110, antenna #2 112, and antenna #M 114, where M is an integer number greater than or equal to 1. In a large scale MIMO implementation, M may be on the order of 100s, 1000s, 10000s, or even greater. A special case of large scale MIMO is referred to as massive MIMO. Massive MIMO may involve an extremely large number of antennas, 100000 or more. A base station may also be referred to as an access point, a NodeB, an evolved NodeB (eNB), a communications controller, and so on, while a user may also be referred to as a mobile station, a mobile, a terminal, a subscriber, a user equipment (UE), and so forth. MIMO base station 105 also includes a central processing unit 130 configured to estimate signals transmitted by the users and received by MIMO base station 105.

While it is understood that communications systems may employ multiple base stations capable of communicating with a number of users, only one base station, and three users are illustrated for simplicity.

In communications system 100, the K users share the same communications system resources (such as time-frequency resources). To simplify discussion, each user is equipped with only one antenna. However, the example embodiments presented herein are operable with users with any number of antennas. Each of the M receive antennas at MIMO base station 105 are equipped with its own radio frequency (RF) hardware (such as filters, amplifiers, mixers, modulators, demodulators, constellation mappers, constellation demappers, and the like), analog to digital (A/D) converters, digital to analog (D/A) converters, as well as a local processing unit that is capable of performing a limited amount of processing. The local processing unit, the antenna and the associated hardware may be referred to as an antenna unit (AU). The local processing unit is referred to herein as an AU processing unit.

Communications system 100 may be represented as a mathematical model expressible as:

$$\begin{bmatrix} y_1 \\ y_2 \\ \vdots \\ y_M \end{bmatrix} = \begin{bmatrix} a_{1,1} & a_{1,2} & \cdots & a_{1,K} \\ a_{2,1} & a_{2,2} & \cdots & a_{2,K} \\ \vdots & \vdots & & \vdots \\ a_{M,1} & a_{M,2} & \cdots & a_{M,K} \end{bmatrix} \cdot \begin{bmatrix} x_1 \\ x_2 \\ \vdots \\ x_K \end{bmatrix} + \begin{bmatrix} n_1 \\ n_2 \\ \vdots \\ n_M \end{bmatrix} \text{ or}$$

$$Y = A \cdot X + N,$$

where X is a transmitted symbol vector of length K in which each element $x_k$ represents a data symbol associated with user k; Y is a received sample vector of length M in which each element $y_m$ represents a sample of receive antenna m; N is a receiver noise sample vector of length M in which each element $n_m$ represents the noise receive on receive antenna m, it is assumed that N is additive white Gaussian noise (AWGN); A is a channel matrix of size M by K in which each element $a_{m,k}$ represents a channel transfer function between user k and receive antenna m; K is the number of users served by MIMO base station 105; and M is the number of receive antennas of MIMO base station 105. In general, a MIMO receiver has to resolve the above expression and given the received sample vector Y, find an estimate of the transmitted symbol vector X (denoted $\hat{X}$) that is as close as possible to the transmitted symbol vector X.

There is a plurality of techniques that a MIMO receiver, such as one implemented in a central processing unit located in a MIMO base station, can use to solve the above expression. A first MIMO decoder technique that may be used is referred to as a maximum likelihood (ML) decoder. A ML decoder searches for a solution that as minimum distance D between the received sample vector Y and the estimate of the transmitted symbol vector $\hat{X}$, which may be expressed mathematically as:

$$X_{ML} = \underset{\hat{X}}{\operatorname{argmin}}\left( \left(Y - A \cdot \hat{X}\right)^T \cdot \left(Y - A \cdot \hat{X}\right) \right)$$

or $$X_{ML} = \underset{\hat{X}}{\operatorname{argmin}}(X^H \cdot A cor \cdot X - 2 \cdot Re(X^H \cdot R)),$$

where $R=A^T \cdot Y$ is a maximum ratio combining (MRC) vector of length K, Acor is an autocorrelation matrix with dimension K by K., and $(.)^T$ is a transpose operator.

A second MIMO decoder technique that may be used is referred to as an interference cancelling (IC) decoder. An IC decoder checks all possible combinations of the estimate of the transmitted symbol vector $\hat{X}$ to find the solution. The IC decoder iteratively searches for a ML solution that has the minimum distance by taking a gradient of the distance, which is a highly computationally intensive process. The IC decoder may be expressed mathematically as:

$$D = \left(R - Acor \cdot \hat{X}\right)^T \cdot \left(R - Acor \cdot \hat{X}\right),$$

$$\frac{\partial D}{\partial \hat{X}} = 2 \cdot \left(R - Acor \cdot \hat{X}\right),$$

where Acor is an autocorrelation matrix with dimension K by K.

A third MIMO decoder technique that may be used is referred to as a MRC decoder. A MRC decoder attempts to find the solution by minimizing a signal to additive noise ratio. The MRC decoder may be expressed mathematically as:

$$X_{MRC} = \left(\frac{1}{E_S}\right) \cdot R,$$

where $E_s$ is symbol energy and are diagonal elements of the autocorrelation matrix Acor.

A fourth MIMO decoder technique that may be used is referred to as a zero forcing (ZF) decoder. A ZF decoder attempts to find the solution by minimizing multi-user interference. The ZF decoder may be expressed mathematically as:

$X_{ZF} = inv(Acor) \cdot R$.

A fifth MIMO decoder technique that may be used is referred to as a minimum mean square error (MMSE) decoder. A MMSE decoder is a compromise between MRC and ZF decoders and attempts to find the solution by minimizing a common mean square error. The MMSE decoder may be expressed mathematically as:

$$X_{MMSE} = inv\left(Acor + \frac{\sigma^2}{E_S}\right) \cdot R.$$

It is noted that each of the five MIMO decoder techniques presented above have only two inputs:

$R=A^T \cdot Y$ (where $R$ is a MRC vector of length $K$), and

Acor=$A^T \cdot A$ (where Acor is an autocorrelation matrix with dimension $K$ by $K$).

The dimensions of both of the two inputs are dependent only on the number of users K and not on the number of receive antennas M. The number of users K places demands on the bit rate of the communications system, while the number of receive antennas M is representative of the number of receive antennas that can be associated with a base station (either actually located at the base station or controlled by the base station but remotely located). It is expected that both K and M will continue to grow, but M is expected to grow faster than K. In other words, M>>K. A summary of the five MIMO decoder techniques in equation form and their respective algorithm complexity is presented in tabular form.

TABLE

| MIMO Decoding Technique Algorithm Complexity. | | |
| --- | --- | --- |
| MIMO Decoder Technique | Equation | Complexity |
| Maximum Likelihood | $X_{ML} = \underset{\hat{X}}{\operatorname{argmin}}\left(\left(R - Acor \cdot \hat{X}\right)^T \cdot \left(R - Acor \cdot \hat{X}\right)\right)$ | Combination Number × K × K |
| Interference Cancellation | $\frac{\partial D}{\partial \hat{X}} = 2 \cdot \left(R - Acor \cdot \hat{X}\right)$ | Iteration Number × K × K |
| Maximum Ratio Combining | $X_{MRC} = \left(\frac{1}{E_S}\right) \cdot R$ | K |
| Zero Forcing | $X_{ZF} = inv(Acor) \cdot R$ | K × K |
| Minimum Mean Square Error | $X_{MMSE} = inv\left(Acor + \frac{\sigma^2}{E_S}\right) \cdot R$ | K × K |

Additionally, in the five MIMO decoder techniques presented above, a central processing unit located in the MIMO base station that is implementing one or more of the five MIMO decoder techniques does not need to know all inputs Y and channel estimates A of all of the M receive antennas. It is sufficient that the central processing unit has knowledge of the MRC vector R and the autocorrelation matrix Acor (with dimension K and K by K, respectively) to implement any and all of the five MIMO decoder techniques.

Figure 2:
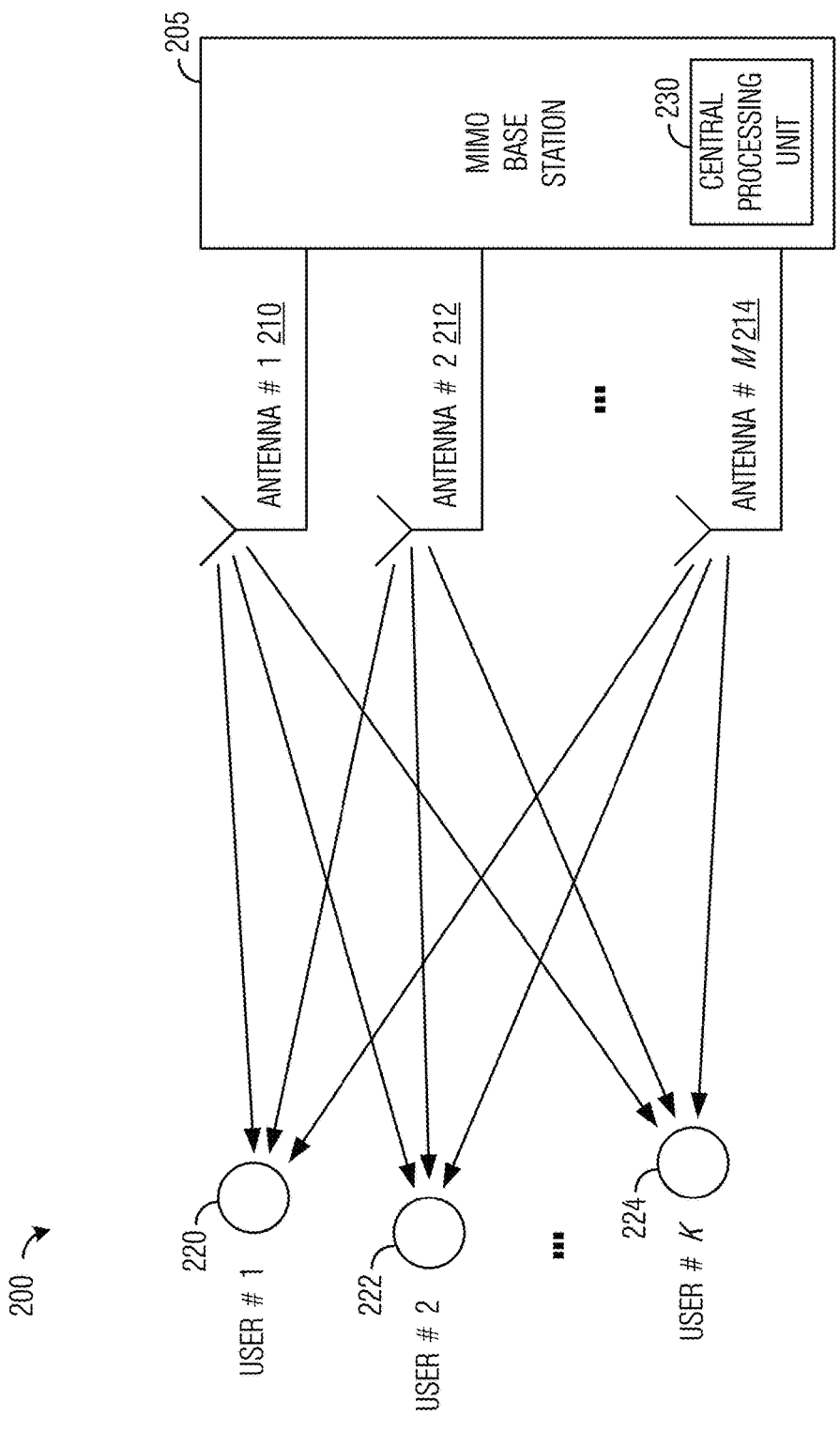
FIG. 2 is an example communications system highlighting MIMO transmission according to example embodiments described herein.

FIG. 2 illustrates an example communications system 200 highlighting MIMO transmission. Communications system 200 includes a MIMO base station serving K users, such as user #1 220, user #2 222, and user #K 224, where K is an integer number greater than or equal to 1. MIMO base station 205 includes M transmit antennas, such as antenna #1 210, antenna #2 212, and antenna #M 214, where M is an integer number greater than or equal to 2. In a large scale MIMO implementation, M may be on the order of 100s, 1000s, 10000s, or even greater. MIMO base station 205 also includes a central processing unit 230 configured to assist in precoding transmissions to the K users. Central processing unit 230 is also configured to assist in channel estimation.

Communications system 200 may be represented as a mathematical model expressible as:

$$\begin{bmatrix} r_1 \\ r_2 \\ \vdots \\ r_K \end{bmatrix} = \begin{bmatrix} a_{1,1} & a_{1,2} & \cdots & a_{1,M} \\ a_{2,1} & a_{2,2} & \cdots & a_{2,M} \\ \vdots & \vdots & & \vdots \\ a_{K,1} & a_{K,2} & \cdots & a_{K,M} \end{bmatrix} \cdot \begin{bmatrix} w_{1,1} & w_{1,2} & \cdots & w_{1,K} \\ w_{2,1} & w_{2,2} & \cdots & w_{2,K} \\ \vdots & \vdots & & \vdots \\ w_{M,1} & w_{M,2} & \cdots & w_{M,K} \end{bmatrix} \cdot \begin{bmatrix} x_1 \\ x_2 \\ \vdots \\ x_K \end{bmatrix}$$

or $$R = A \cdot W \cdot X + N,$$

where X is a transmitted symbol vector of length K in which each element $x_k$ represents a symbol of user k; R is a received sampled vector of length K in which each element $r_k$ represents a sample received by user k; N is a received noise vector of length K in which each element $n_k$ represents noise received by user k (it is assumed that N is AWGN); A is a channel matrix of size M by K in which each element $a_{m,k}$ represents the channel transfer function between user k and transmit antenna m; and W is a precoding matrix of size K by M.

There are several ways to define the precoding matrix W. A ZF precoding matrix fully removes multi-user interference and is expressible as $$W = A^T \cdot \text{inv}(A \cdot A^T) = A^T \cdot \text{inv}(A\text{cor})$$

where $A^T$ is a transposed channel matrix of size K by M, and inv(Acor) is an inverse autocorrelation matrix of size M by M.

It is possible to re-express the above expression for R as $$R = A \cdot W \cdot X + N = A \cdot A^T \cdot \text{inv}(A\text{cor}) \cdot X + N = A \cdot A^T \cdot S + N$$

where S=inv(Acor)·X is a precoded symbol vector of length K. If M is sufficiently large, the autocorrelation matrix converges to an identify matrix (Acor=inv(Acor)=I). Therefore, it is possible to skip the multiplication by inv(Acor). Such a transmitter may be referred to as a MRC transmitter.

As discussed previously, beamforming is a signal processing technique used for directional communications (signal transmission and/or reception). Beamforming involves combining antenna elements in such a way that some directions experience constructive interference while other directions experience destructive interference, therefore generating a communications beam in an intended direction. Therefore, in order to utilize beamforming, a communications device needs to obtain directional information regarding other communications devices with which it is communicating. From the directional information, the communications device may be able to generate antenna coefficients to generate communications beams directed towards the other communications devices.

Figure 3:
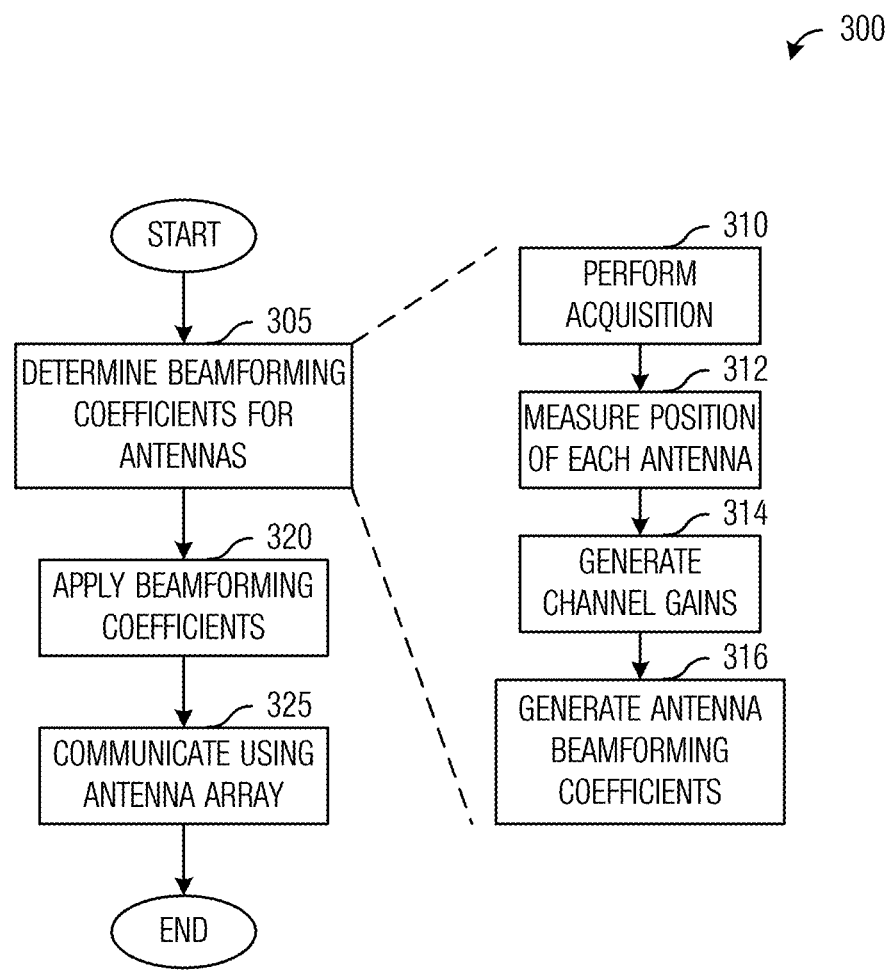
FIG. 3 is a flow diagram of example operations occurring in a large scale MIMO communications device performing beamformed communications according to example embodiments described herein.

FIG. 3 illustrates a flow diagram of example operations 300 occurring in a large scale MIMO communications device performing beamformed communications. Operations 300 may be indicative of operations occurring in a large scale MIMO communications device performing beamformed communications.

Operations 300 begin with the large scale MIMO communications device generating beamforming coefficients for the antennas of the antenna array (block 305). The generation of the beamforming coefficients may include the large scale MIMO communications device performing acquisition to obtain directional information regarding other communications devices with which it is communicating (block 310), measuring positions for each of the antennas in the antenna array (block 312), determining channel gains for channels between the antennas and the other communications devices (block 314), and generating the antenna beamforming coefficients based on the channel gains (block 316). Detailed discussions of the measuring of the positions for each of the antennas in the antenna array, the generating of the channel gains, and the generating of the antenna beamforming coefficients are provided below.

The large scale MIMO communications device applies the beamforming coefficients (block 320). Applying the beamforming coefficients may involve providing appropriate beamforming coefficients to the antennas of the antenna array. The large scale MIMO communications device communicates with the other communications devices using the antenna array (block 325). The large scale MIMO communications device may transmit using the antenna array, receive using the antenna array, or a combination of both.

Typically, performing acquisition to obtain directional information involves the large scale MIMO communications device using an antenna array to scan over a search space using communications beams to measure received energy from the other communications devices. The large scale MIMO communications device may select a number of communications beams corresponding to measured received energy exceeding a specified threshold. The selected communications beams correspond to the directions of the other communications devices. Normally, the acquisition process may be slow because the large scale MIMO communications device may have a large number of communications beams with which to scan the search space. Furthermore, when the antenna array of the large scale MIMO communications device has a large number of antennas, the communications beams generated by the antenna array are narrow, which may require the large scale MIMO communications device to use a large number of communications beams to fully scan the search space. In a co-assigned U.S. patent application Ser. No. 14/867,931, entitled "System and Method for Large Scale Multiple Input Multiple Output Communications", filed Sep. 28, 2015, which is hereby incorporated herein by reference, a fast acquisition technique is presented which helps to speed up the acquisition process by partitioning the search space and the antenna array. In the fast acquisition technique, different portions of the antenna array are assigned to scan different parts of the search space. Reducing the size of the search space affords a reduction in the time required to scan the search space. An additional reduction in the scanning time is obtained due to the wider communications beams generated by the smaller number of antennas in each portion of the antenna array; the wider communications beams help to speed up the scan of the search space. Therefore, the combination of the smaller search space and the wider communications beams significantly shortens the acquisition time.

Figure 4:
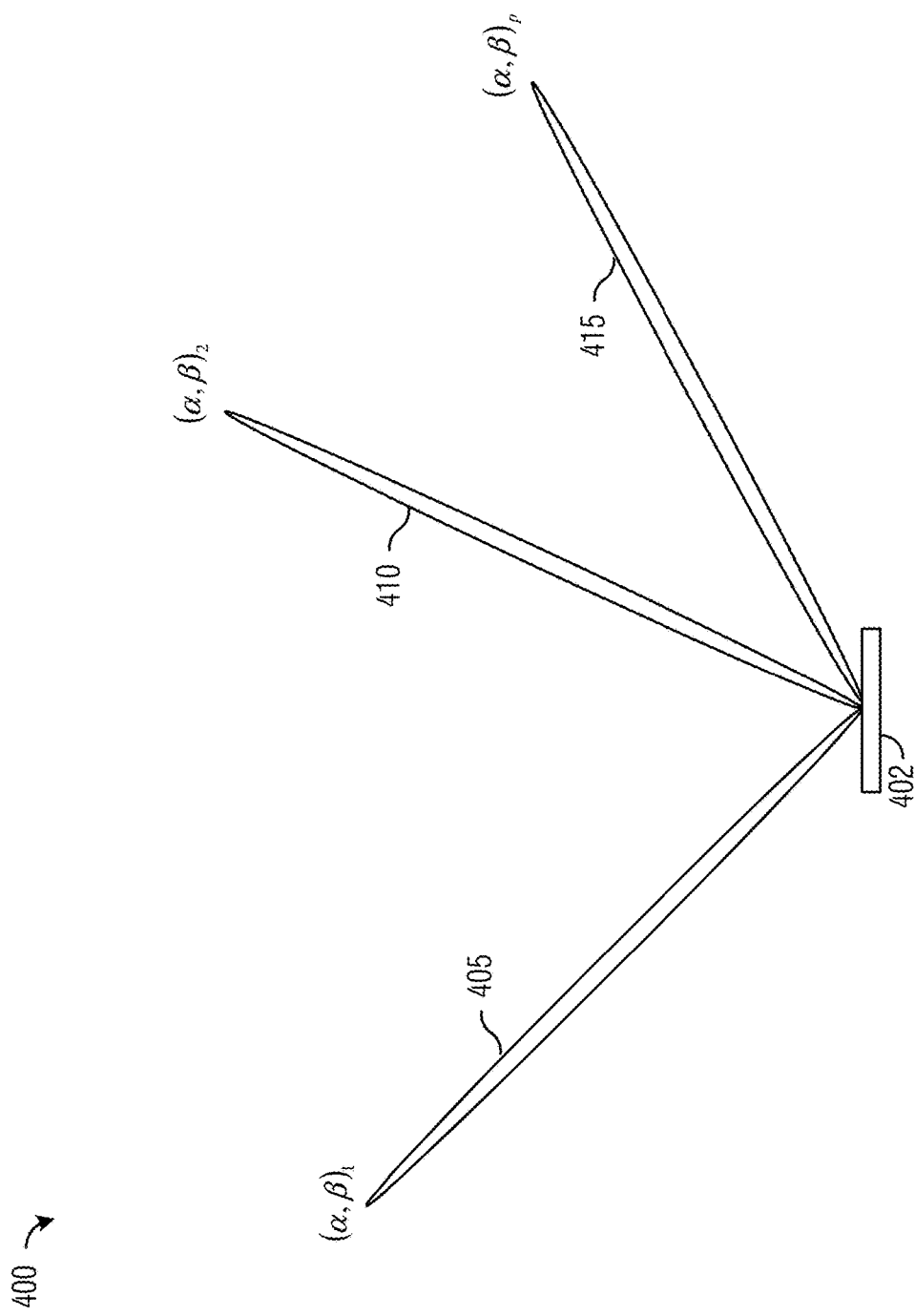
FIG. 4 illustrates a plurality of antenna beams according to example embodiments described herein.

FIG. 4 illustrates a plurality of antenna beams 400. Plurality of antenna beams 400 may be illustrative of communications beams found during an acquisition process. Plurality of antenna beams 400 may be associated with antenna array 402. Plurality of antenna beams 400 may include antenna beam 405 with direction $(\alpha,\beta)_1$, antenna beam 410 with direction $(\alpha,\beta)_2$, and antenna beam 415 with direction $(\alpha,\beta)_3$. The directions $(\alpha,\beta)$ may be referred to as the directional information.

According to an example embodiment, a time of arrival (TOA) method is used to determine coordinates of each antenna in an antenna array. TOA is a technique that is used in positioning systems, such as Global Positioning System (GPS). TOA uses delays in received reference signals transmitted by a plurality of reference signal generators to determine the position of an antenna that received the reference signals.

Figure 5:
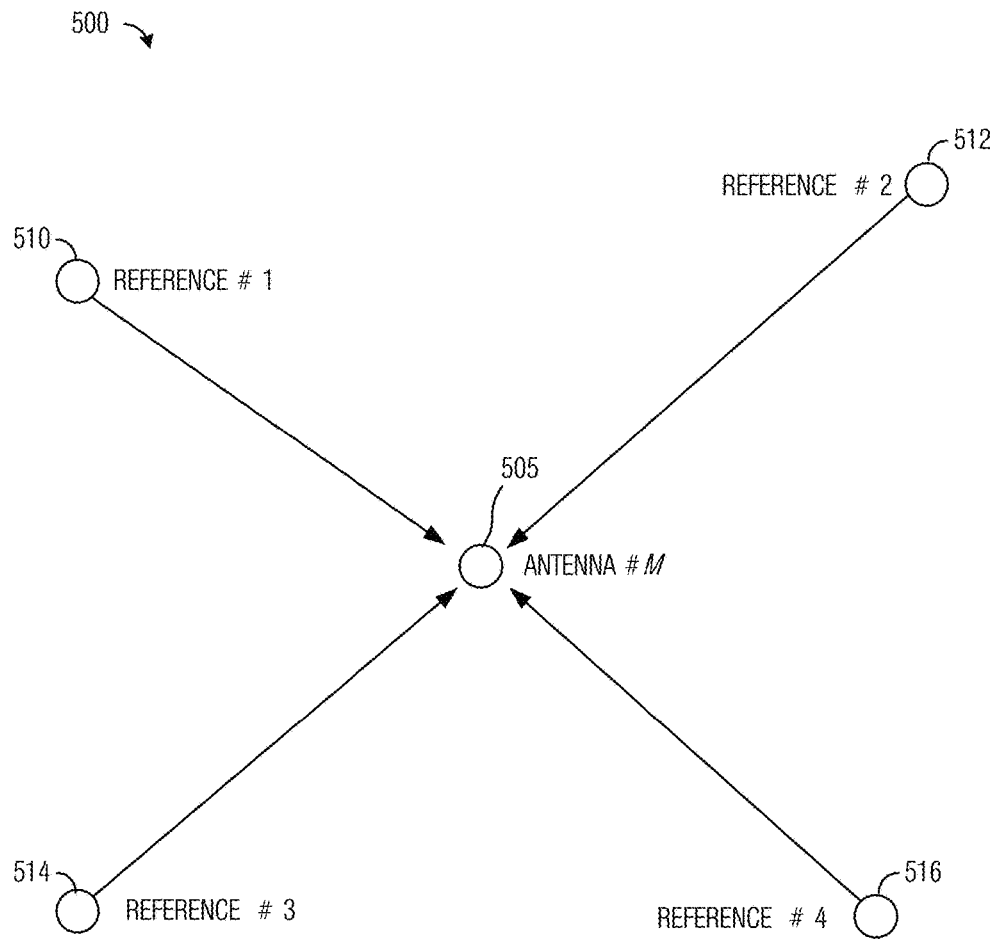
FIG. 5 illustrates an example positioning system for determining the coordinates of an antenna using a TOA method according to example embodiments described herein.

FIG. 5 illustrates an example positioning system 500 for determining the coordinates of an antenna using a TOA method. Positioning system 500 is configured to determine the position of an antenna M 505 of an antenna array. Positioning system 500 includes a plurality of reference signal generators, such as reference signal generator #1 510, reference signal generator #2 512, reference signal generator #3 514, and reference signal generator #4 516. The positions of the reference signal generators are known. Although positioning system 500 includes 4 reference signal generators, it is possible to determine the position of an antenna using 4 or more reference signal generators. Generally, the more reference signal generators being used in a positioning system, the more accurate the results.

Reference signal generators transmit orthogonal reference signals that individually arrive at antenna M 505 with different delay. The delays associated with the reference signals are expressible as $$c^2 \cdot (\tau_m^0 - t_m)^2 = (X_0 - x_m)^2 + (Y_0 - y_m)^2 + (Z_0 - z_m)^2$$

$$c^2 \cdot (\tau_m^1 - t_m)^2 = (X_1 - x_m)^2 + (Y_1 - y_m)^2 + (Z_1 - z_m)^2$$

$$c^2 \cdot (\tau_m^2 - t_m)^2 = (X_2 - x_m)^2 + (Y_2 - y_m)^2 + (Z_2 - z_m)^2$$

$$c^2 \cdot (\tau_m^3 - t_m)^2 = (X_3 - x_m)^2 + (Y_3 - y_m)^2 + (Z_3 - z_m)^2$$

where $(X_k, Y_k, Z_k)$ is the coordinates of a k-th reference signal generator, $(x_m, y_m, z_m)$ is the unknown coordinates of antenna M 505, $t_m$ is an unknown time offset of antenna M 505, $\tau_m^k$ is a time of arrival of reference signals sent by reference signal generator k at antenna M 505, and c is the speed of light. Because there are 4 equations and 4 unknowns $(x_m, y_m, z_m, t_m)$, it is possible to solve for the 4 unknowns to determine the coordinates of antenna M 505 and the time offset for antenna M 505 $(x_m, y_m, z_m, t_m)$.

Figure 6A:
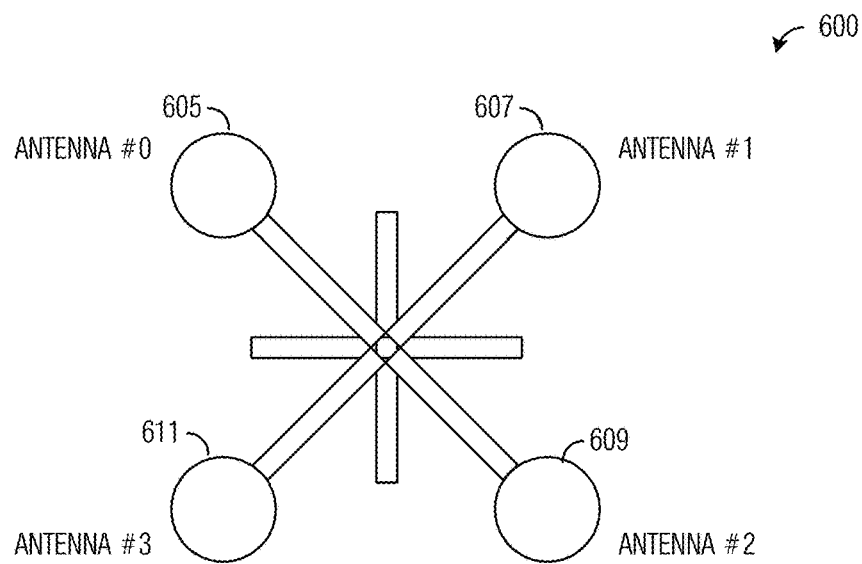
FIG. 6A illustrates a top view of an example portable reference signal generating system according to example embodiments described herein.
Figure 6B:
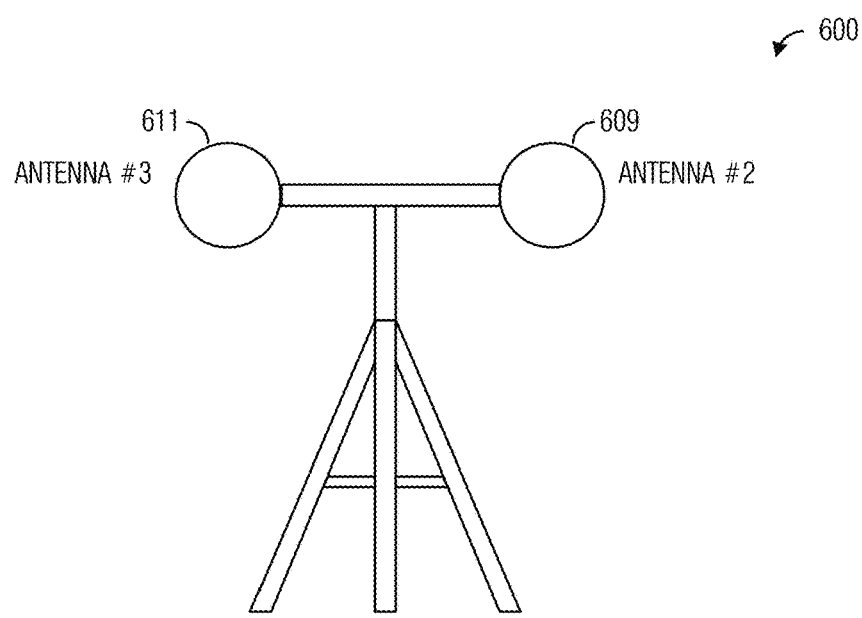
FIG. 6B illustrates a side view of portable reference signal generating system according to example embodiments described herein.

In an outdoor deployment, it may be possible to use an existing positioning system, such as GPS, for example, to determine the positions of the antennas in an antenna array. However, in an indoor deployment where GPS signals have trouble penetrating walls, a portable reference signal generating system may be used. FIG. 6A illustrates a top view of an example portable reference signal generating system 600. Portable reference signal generating system 600 includes 4 antennas, including antenna 605, antenna 607, antenna 609, and antenna 611. Each of the 4 antennas is configured to send orthogonal reference signals. FIG. 6B illustrates a side view of portable reference signal generating system 600. In the side view shown in FIG. 6B, antennas 609 and 611 obscure views of antennas 605 and 607.

According to an alternative example embodiment, if the positions of 4 or more of the antennas of an antenna array are known, the 4 or more antennas are used as reference signal generators and send orthogonal reference signals to be used to determine the positions of the remaining antennas of the antenna array.

Because the antennas of the antenna array are usually in a constant location or moving very slowly, the antenna array is stable. Therefore, there is not a problem with antenna position determining precision. The determining of the position of the antennas may be performed during a wake up, initialization, or re-initialization process. Hence, there are typically no strict time limits on determining the positions of the antennas of the antenna array. The relatively relaxed time constraints may enable position estimation averaging over an extended amount of time in order to obtain a desired level of precision, with position estimation precision increasing with increased averaging time.

According to an example embodiment, the channel gains are determined for the antennas in the antenna array based on the positions of the antennas and the directional information. The channel gains are determined for channels from each of the antennas in the antenna array to each of the other communications devices.

Figure 7A:
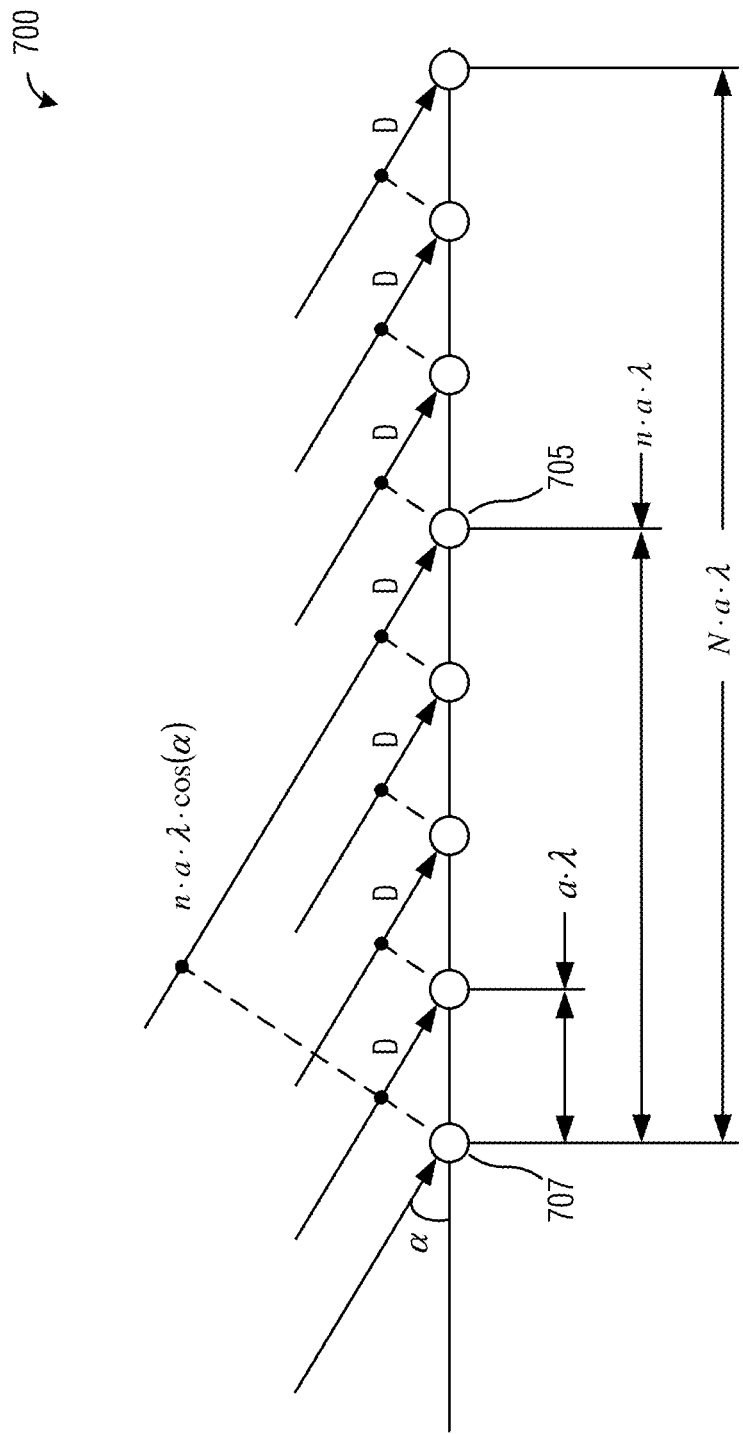
FIG. 7A illustrates a one-dimensional large scale MIMO antenna according to example embodiments described herein.

In a typical large scale MIMO implementation, a large number (M×N) omni-directional antennas are mounted on a flat surface with a consistent spacing between antennas $(a\cdot\lambda \times b\cdot\lambda)$, where N and M are integer values and l is wavelength of a signal. FIG. 7A illustrates a one-dimensional large scale MIMO antenna 700. In such a configuration, an antenna #n 705 has coordinate $(n\cdot a\cdot\lambda, 0)$ in plane (x,y) centered at antenna #0 707 when the spacing between consecutive antennas is $a\cdot\lambda$. If a beam arrives at one-dimensional MIMO antenna 700 with angle $\alpha$, the beam arrives at antenna #n with a delay that is equal to a length of an orthogonal projection of a normalized vector D with angle $\alpha$ and the coordinate of antenna #n 705 divided by the speed of light c, which is expressible as $$t_n = \frac{D_n}{c} = n \cdot \frac{D}{c} = n \cdot \frac{a \cdot \lambda}{c} \cdot \cos(\alpha).$$

Therefore, the beam arrives at antenna #n 705 with a complex gain expressible as $$H_n(\alpha) = \exp\left(j \cdot 2 \cdot \pi \cdot \frac{c \cdot t_n}{\lambda}\right) = \exp(j \cdot 2 \cdot \pi \cdot n \cdot a \cdot \cos(\alpha)).$$

Hence, antenna arrays that are tuned to the receive the signal from direction $\alpha$ may be configured with coefficients that match the complex gain $H_n^*(\alpha)$.

Figure 7B:
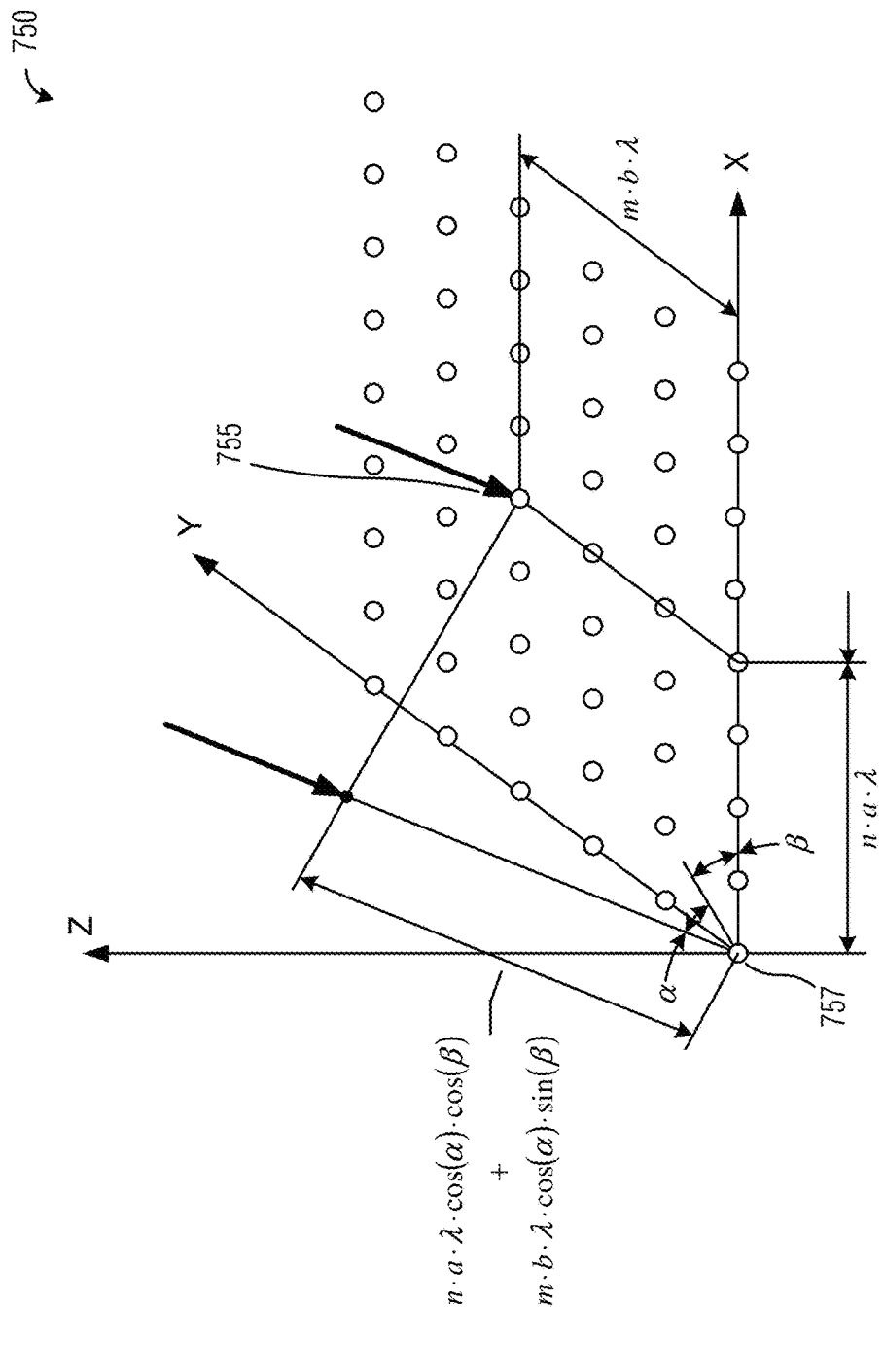
FIG. 7B illustrates a two-dimensional large scale MIMO antenna according to example embodiments described herein.

FIG. 7B illustrates a two-dimensional large scale MIMO antenna 750. In such a configuration, an antenna (n,m) 755 has coordinates $(n\cdot a\cdot\lambda, n\cdot b\cdot\lambda, 0)$ in space (x,y,z) centered at antenna (0,0) 757, where a and b are spacing constants. If a beam arrives at two-dimensional MIMO antenna 750 with angle $(\alpha,\beta)$, the beam arrives at antenna (n,m) 755 with a delay that is equal to a length of an orthogonal projection of a normalized vector with angle $(\alpha, \beta)$ and the coordinates of antenna (n,m) 755 divided by the speed of light c, expressible as $$t_{n,m} = \frac{D_{n,m}}{c} = n \cdot \frac{a \cdot \lambda}{c} \cdot \cos(\alpha) \cdot \cos(\beta) + m \cdot \frac{b \cdot \lambda}{c} \cdot \cos(\alpha) \cdot \sin(\beta).$$

Therefore, the beam arrives at antenna (n,m) 755 with a complex gain expressible as $$H_{n,m}(\alpha, \beta) = \exp\left(j \cdot 2 \cdot \pi \cdot \frac{c \cdot t_{n,m}}{\lambda}\right)$$

or $$H_{n,m}(\alpha, \beta) = \exp(j \cdot 2 \cdot \pi \cdot (n \cdot a \cdot \cos(\alpha) \cdot \cos(\beta) + m \cdot b \cdot \cos(\alpha) \cdot \sin(\beta)))$$

Hence, antenna arrays that are tuned to the receive the signal from direction $(\alpha,\beta)$ may be configured with coefficients that match the complex gain $H_{n,m}^*(\alpha,\beta)$.

The antennas of the large scale MIMO antenna arrays discussed in FIGS. 7A and 7B are arranged in linear or planar arrays with uniform spacing between antennas. In such a situation, the total number of antennas in the antenna array is $P=N\times M$ and each antenna $(n,m)$ has coordinates $(n\cdot a\cdot\lambda, m\cdot b\cdot\lambda, 0)$ in space $(x,y,z)$. The classical beamforming equation is expressible as $$H_{n,m}(\alpha,\beta)=\exp(j\cdot 2\cdot\pi\cdot(n\cdot a\cdot\cos(\alpha)\cdot\cos(\beta)+m\cdot b\cdot\cos(\alpha)\cdot\sin(\beta))).$$

Therefore, the channel for antenna $(n,m)$ located at $$\left(x_{n,m} = n \cdot \frac{\lambda}{2}, y_{n,m} = m \cdot \frac{\lambda}{2}, z_{n,m} = 0\right)$$

is expressible as $$H_{n,m} = \sum_{k=0}^{K-1} G_k \cdot \exp(j \cdot \pi \cdot (n \cdot \cos(\alpha_k) \cdot \cos(\beta_k) + m \cdot \cos(\alpha_k) \cdot \sin(\beta_k))),$$

where $G_k$ is the complex amplitude of beam k.

Figure 8A:
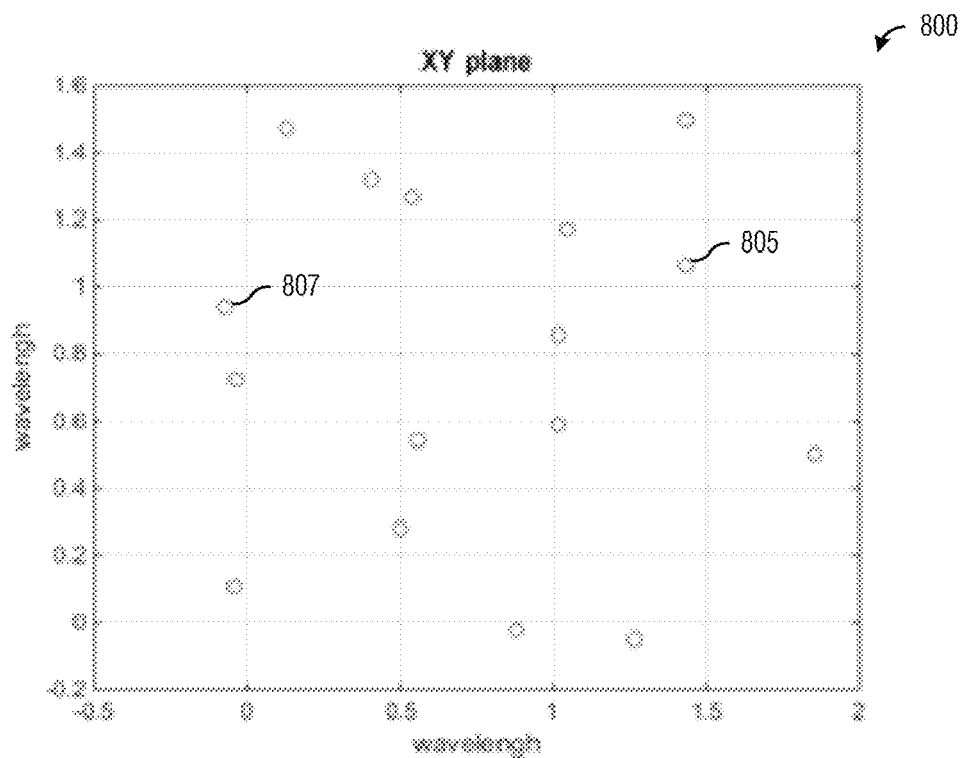
FIGS. 8A and 8B illustrate example cross-sectional views of three-dimensional array configurations where the antennas in the antenna array are not planar or uniformly spaced according to example embodiments described herein.
Figure 8B:
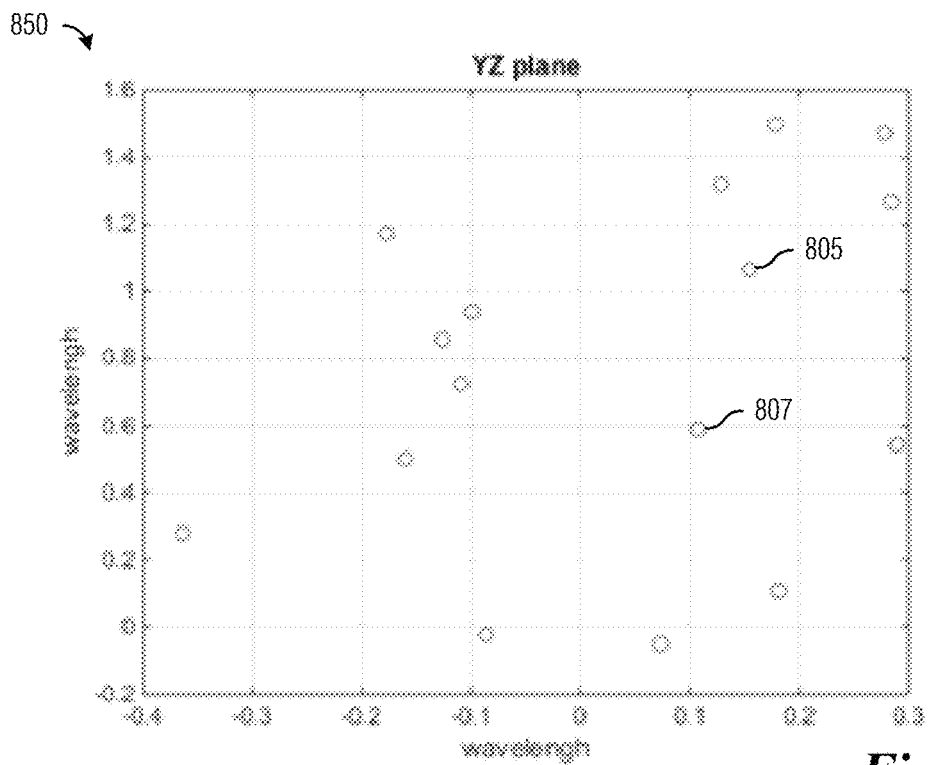

However, the antennas in the antenna array do not have to be in a plane, nor does the antenna spacing have to be uniform. For discussion purposes, consider a situation wherein a large scale MIMO communications device has an antenna array with P antennas where the antennas are located at a set of coordinates $(x,y,z)_p$. FIGS. 8A and 8B illustrate example cross-sectional views of three-dimensional array configurations where the antennas in the antenna array are not planar or uniformly spaced. FIG. 8A illustrates a view 800 of the antenna array taken along an X-Y plane and FIG. 8B illustrates a view 850 of the antenna array taken along a Y-Z plane. Included in FIGS. 8A and 8B are two example antennas 805 and 807 and their potential locations in the two views.

According to the definition of a far field, in order to determine the coefficients for the antennas for direction $(\alpha,\beta)$, the distance from the antenna array to the target in direction $(\alpha,\beta)$ must be at least an order of magnitude greater than the size of the antenna array. The coordinates of the target are expressible as $$x_T = R\cdot\cos(\alpha)\cdot\cos(\beta),$$

$$y_T = R\cdot\cos(\alpha)\cdot\sin(\beta),$$

$$z_T = R\cdot\sin(\alpha),$$

where R is at least an order of magnitude greater than $\sqrt{x_p^2 + y_p^2 + z_p^2}$ for any antenna p. It may be shown that the complex gain of each antenna p is expressible as $$H_p(\alpha, \beta) = \exp\left(j \cdot 2 \cdot \pi \cdot \frac{\sqrt{(x_p - x_T)^2 + (y_p - y_T)^2 + (z_p - z_T)^2}}{\lambda}\right),$$

which may be normalized as $$\overline{H}_p(\alpha, \beta) = \lim_{R \to \infty}\left(\frac{H_p(\alpha, \beta)}{H_0(\alpha, \beta)}\right).$$

It can also be shown that $\overline{H}_p(\alpha,\beta)$ converges to a projection of unit vector $(\alpha,\beta)$ upon vector $(x_p-x_0, y_p-y_0, z_p-z_0)$, which is expressible as $$\overline{H}_p(\alpha, \beta) = \exp\left(j \cdot 2 \cdot \pi \cdot \frac{(x_p - x_0)\cdot\cos(\alpha)\cdot\cos(\beta) + (y_p - y_0)\cdot\cos(\alpha)\cdot\sin(\beta) + (z_p - z_0)\cdot\sin(\alpha)}{\lambda}\right)$$

Therefore, the channel for antenna m located at $(x_m, y_m, z_m)$ is expressible as $$H_m = \sum_{k=0}^{K-1} G_k \cdot \exp\left(j \cdot 2 \cdot \pi \cdot \frac{x_m\cdot\cos(\alpha_k)\cdot\cos(\beta_k) + y_m\cdot\cos(\alpha_k)\cdot\sin(\beta_k) + z_m\cdot\sin(\alpha_k)}{\lambda}\right)$$

where $G_k$ is the complex amplitude of beam k and antenna 0 is located at reference point $(x_0, y_0, z_0)$.

A received sample of antenna m at time t is expressible as $$Y_m(t) = H_m \cdot D(t) + \text{Noise}_m(t),$$

where $\text{Noise}_m(t)$ is the thermal noise of antenna m at time t, and $D(t)$ is the data symbol at time t, which also can be re-written as $$Y_m(t) = \sum_{k=0}^{K-1} G_k \cdot \exp\left(j \cdot 2 \cdot \pi \cdot \frac{x_m\cdot\cos(\alpha_k)\cdot\cos(\beta_k) + y_m\cdot\cos(\alpha_k)\cdot\sin(\beta_k) + z_m\cdot\sin(\alpha_k)}{\lambda}\right) \cdot D(t) + \text{Noise}_m(t).$$

Using multi-beam maximum ratio combining (MRC) decoding, an output at time t of a MRC decoder is expressible as $$R(t) = \frac{1}{\sum_{m=0}^{M-1}|H_m|^2} \cdot \sum_{m=0}^{M-1} \text{conj}(H_m) \cdot Y_m(t) = D(t) + \text{Noise}(t),$$

which also can be re-written as $$R(t) = \frac{1}{\sum_{k=0}^{K-1} G_k^2} \cdot \sum_{k=0}^{K-1} \text{conj}(G_k) \cdot R_k(t, \alpha_k, \beta_k),$$

where $R_k(t,\alpha_k,\beta_k)$ is the MRC decoder output for beam k at time t, which is expressible as $$R_k(t, \alpha_k, \beta_k) = \frac{1}{M} \cdot \sum_{m=0}^{M-1} \exp\left(-j \cdot 2 \cdot \pi \cdot \frac{x_m \cdot \cos(\alpha_k) \cdot \cos(\beta_k) + y_m \cdot \cos(\alpha_k) \cdot \sin(\beta_k) + z_m \cdot \sin(\alpha_k)}{\lambda}\right) \cdot Y_m(t),$$

Utilizing the expressions for $R_k(t,\alpha_k,\beta_k)$ and $Y_m(t)$ above, and because the beams are orthogonal to each other, it may be shown that the MRC decoder output for beam k at time t is approximately equal to the data symbol at time t multiplied by the complex amplitude of beam k: $R_k(t,\alpha_k, \beta_k) \approx G_k \cdot D(t)$. Suppose that the pilot sequence of length N is known (i.e., $D(t)=PLT(t)$ For $(0 \le t < N)$), then the Least Mean Squared (LMS) complex gain estimation is expressible as $$\hat{G}_k = \frac{1}{N} \cdot \sum_{n=0}^{N-1} R_k(n, \alpha_k, \beta_k) \cdot PLT(n) \approx G_k.$$

The expression for $H_p(\alpha,\beta)$ and $\overline{H}_p(\alpha,\beta)$ above shows that it is possible to tune the antenna array with antennas at coordinates $(x,y,z)_p$ in space $(x,y,z)$ to transmit and/or receive signals to and/or from direction $(\alpha,\beta)$ may be configured with coefficients that match the complex gain $H_p^*(\alpha,\beta)$.

The antenna array, which may be non-planar with non-uniform antenna spacing, may also be non-rigid. Being non-rigid means that the antennas in the antenna array may move or otherwise change position as a function of time. Although the antennas in the antenna array may move, reference signal generators (such as shown in FIG. 5 and described previously) can assist in compensating for the movement of the antennas and keep the communications beams of the antenna oriented in the proper directions. As an illustrative example, the antenna array may be attached on the skin of a lighter than air airship, such as a zeppelin.

Figure 9:
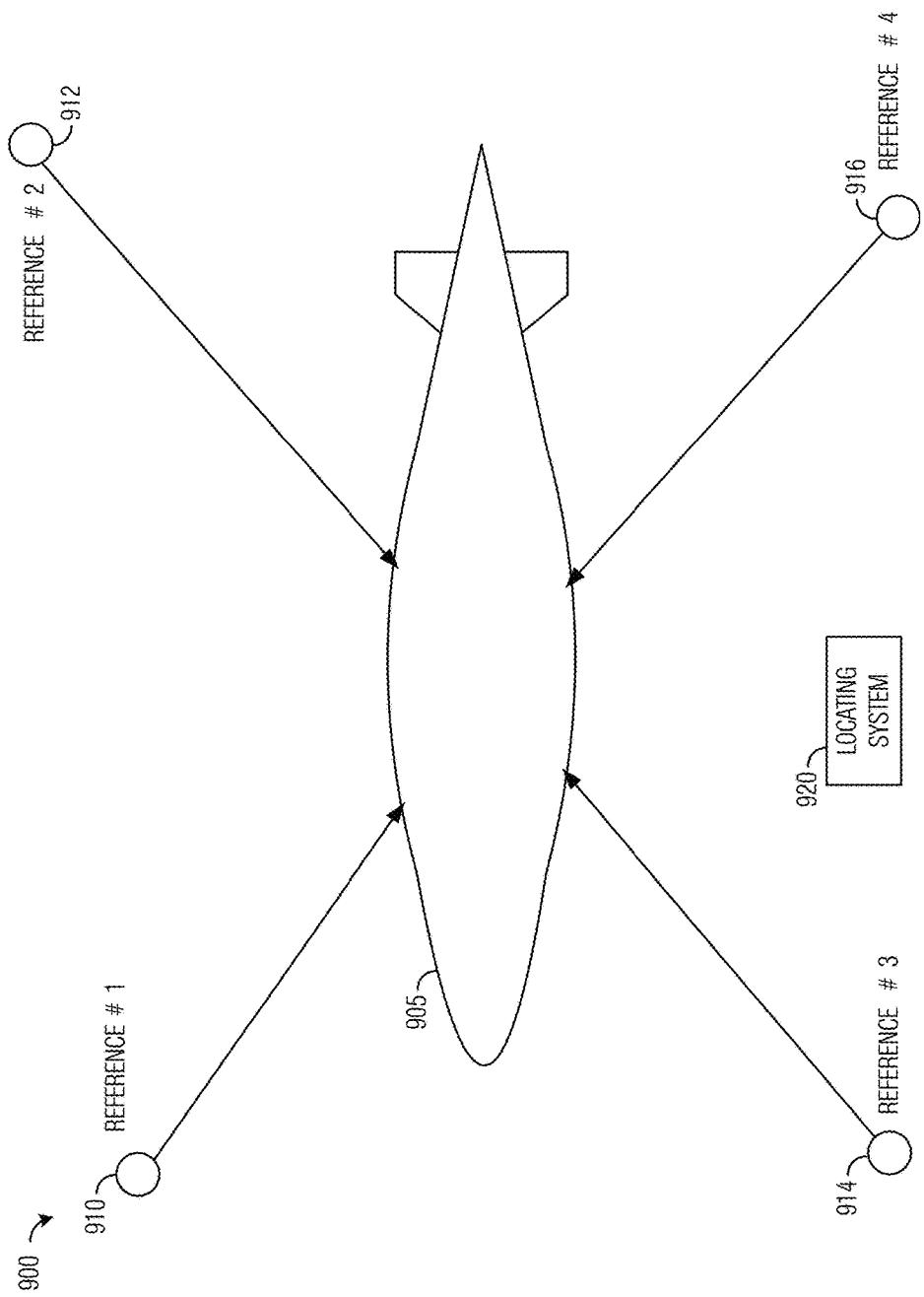
FIG. 9 illustrates an example positioning system for determining the coordinates of antennas of an antenna array disposed on the skin of a lighter than air airship according to example embodiments described herein.

FIG. 9 illustrates an example positioning system 900 for determining the coordinates of antennas of an antenna array disposed on the skin of a lighter than air airship. Positioning system 900 is configured to determine the position of an airship 905. Positioning system 900 includes a plurality of reference signal generators, such as reference signal generator #1 910, reference signal generator #2 912, reference signal generator #3 914, and reference signal generator #4 916. The plurality of reference signal generators may radiate airship 905 with a plurality of orthogonal reference signals, e.g., four orthogonal reference signals. Positioning system 900 may operate in a manner similar to positioning system 500 of FIG. 5. Because airship 905 may move, a locating system 920, such as ground to air radar or a global positioning system may be used to help keep track of the position of airship 905 and help ensure that the plurality of reference signal generators provide good reference signal coverage of airship 905.

According to an example embodiment, the surface area of a lighter than air airship provides for a very large antenna array that is usable in implementing a communications system with extremely narrow communications beams. As discussed previously, a beamwidth of a communications beam is inversely proportional to the number of antennas of the antenna array. Furthermore, the communications beam will have a very large antenna gain that compensates for long distance losses.

Figure 10A:
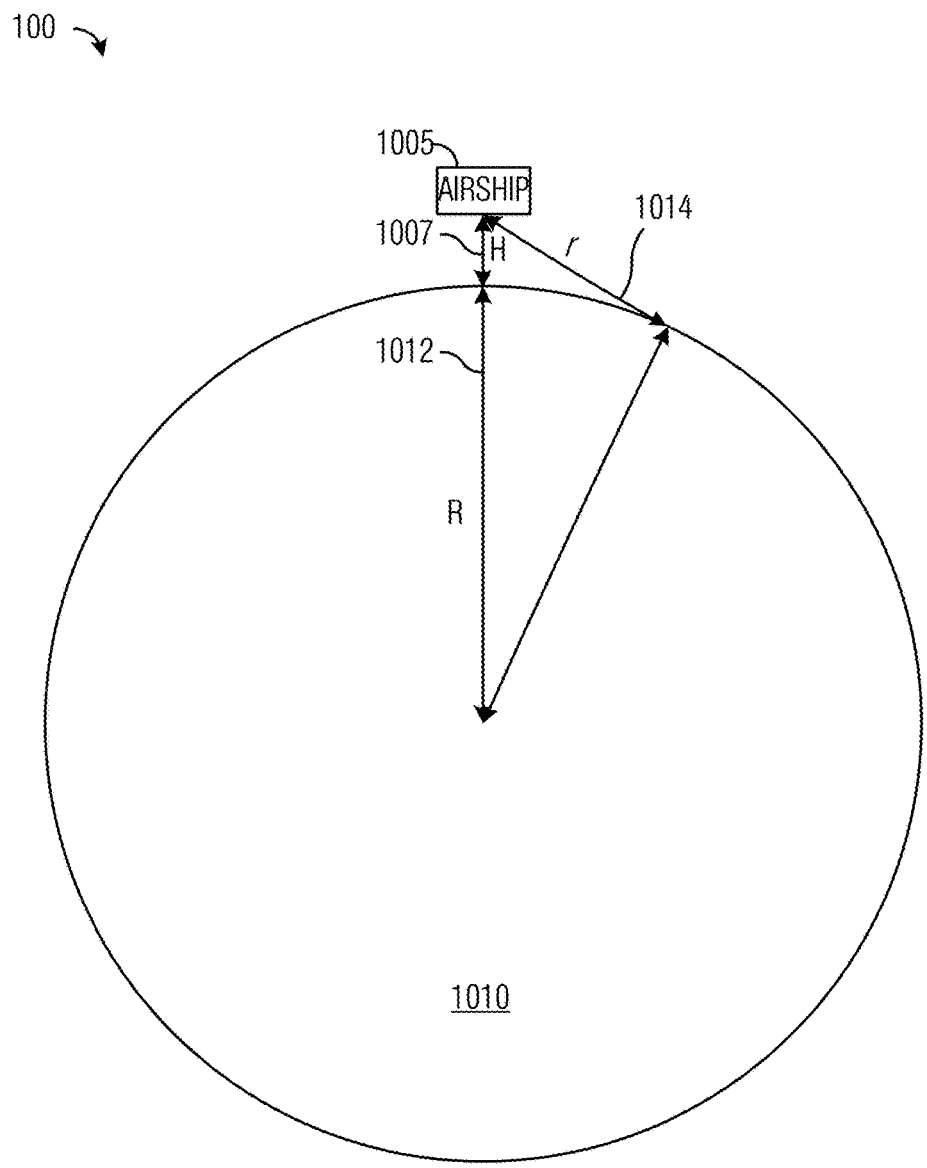
FIG. 10A illustrates an example coverage area of a communications system utilizing an antenna array disposed on the surface of a lighter than air airship according to example embodiments described herein.
Figure 10B:
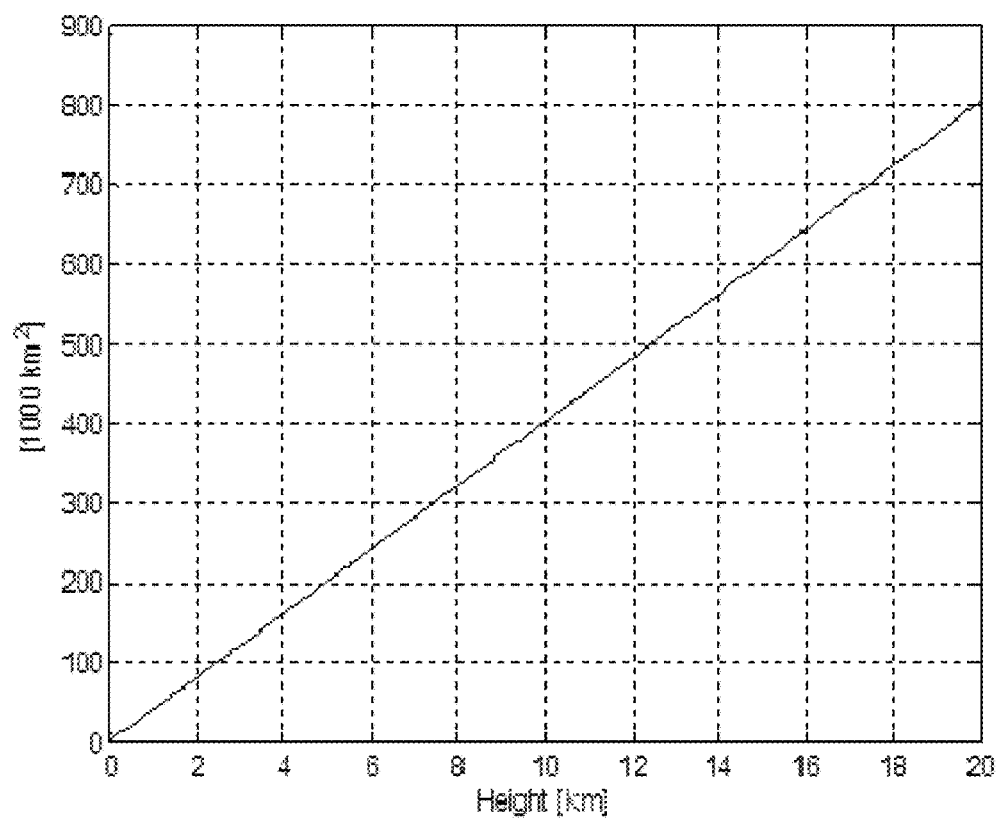
FIG. 10B illustrates a data plot of coverage area size (in square kilometers) versus height (in kilometers) according to example embodiments described herein.

According to an example embodiment, a very large antenna array disposed on the surface of a lighter than air airship provides coverage for state-sized areas. The extremely narrow communications beams, coupled with very large antenna gains, may allow for communications system with a coverage area on the order of a hundred thousand or more square miles. FIG. 10A illustrates an example coverage area 1000 of a communications system utilizing an antenna array disposed on the surface of a lighter than air airship. As shown in FIG. 10A, an airship 1005 is positioned a distance H 1007 above planet Earth 1010, which has a radius R 1012. At height H, airship 1005 is able to utilize line-of-sight communications in a coverage area with radius r 1014. Such a communications system may be implemented in rural environments where typical base stations would be cost prohibitive. FIG. 10B illustrates a data plot 1050 of coverage area size (in square kilometers) versus height (in kilometers). As an example, if the airship is 10 kilometers above the surface of planet Earth, the resulting communications system will have a coverage area of about 400 thousand square kilometers.

Figure 10C:
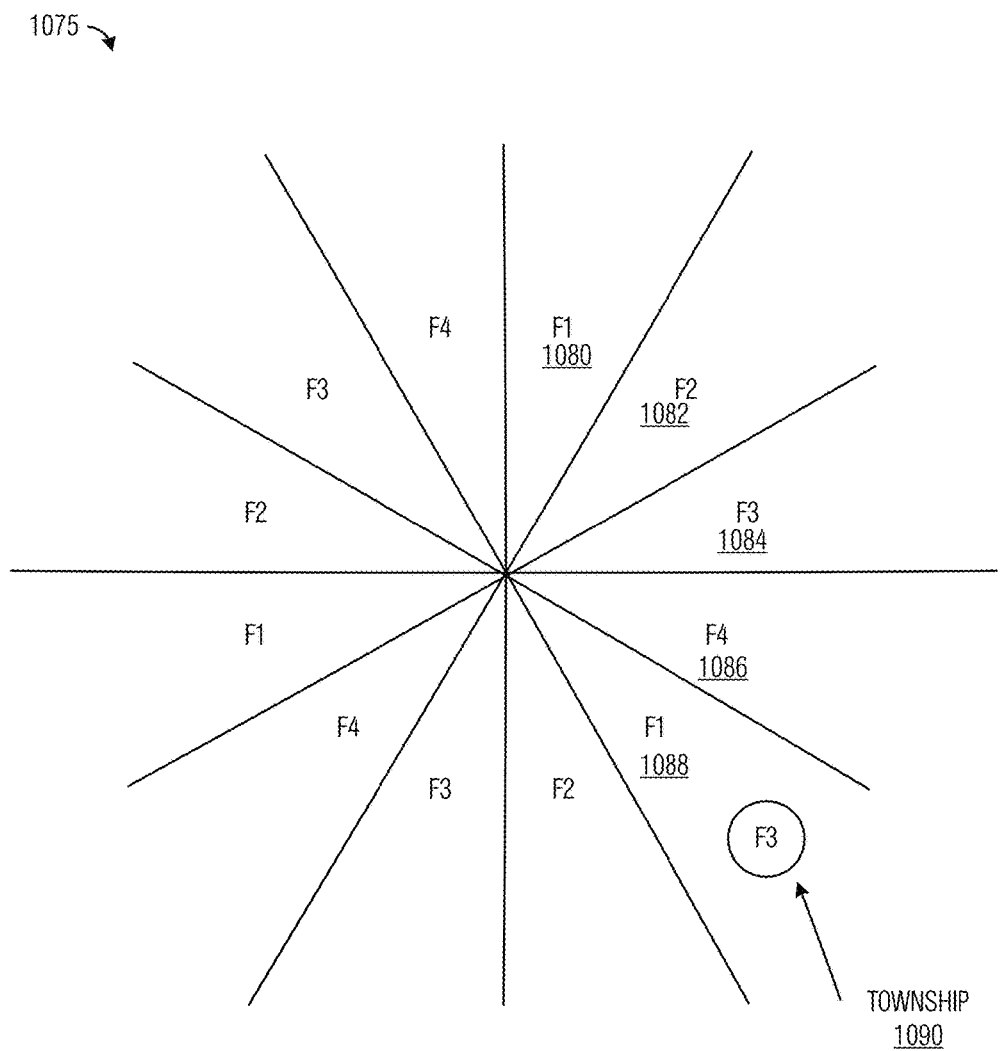
FIG. 10C illustrates an example coverage area of a communications system as described in FIG. 10A according to example embodiments described herein.

FIG. 10C illustrates an example coverage area 1075 of a communications system as described in FIG. 10A. Coverage area 1075 may be sectorized. As shown in FIG. 10C, coverage area 1075 is divided into 12 sectors (including sectors 1080, 1082, 1084, 1086, and 1088), and communications beam frequencies are reused to help increase resource utilization and reduce interference. The sectors may be served by different communications beams, such as sector 1080 served by communications beam frequency F1, sector 1082 served by communications beam frequency F2, sector 1084 served by communications beam frequency F3, and sector 1086 served by communications beam frequency F4. The service pattern of the communications beam frequencies may be repeated in a cyclic manner as shown in FIG. 10C. Different service pattern cycles are also possible.

The communications system as described in FIG. 10A may also coexist with existing cellular communications networks. As shown in FIG. 10C, township 1090 is served by a cellular communications network utilizing frequency F3. As long as sector 1088 which encompasses township 1090 uses a different communications beam frequency (as shown in FIG. 10C, communications beam frequency F1 is used in sector 1088 while frequency F3 is used in the cellular communications network) from that used by the cellular communications network, interference does not occur between transmissions occurring in sector 1088 and the cellular communications network serving township 1090. If the cellular communications network spans several sectors, interference can still be avoided by having the sectors encompassing the cellular communications network use frequencies different from those used in the cellular communications network.

Figure 11:
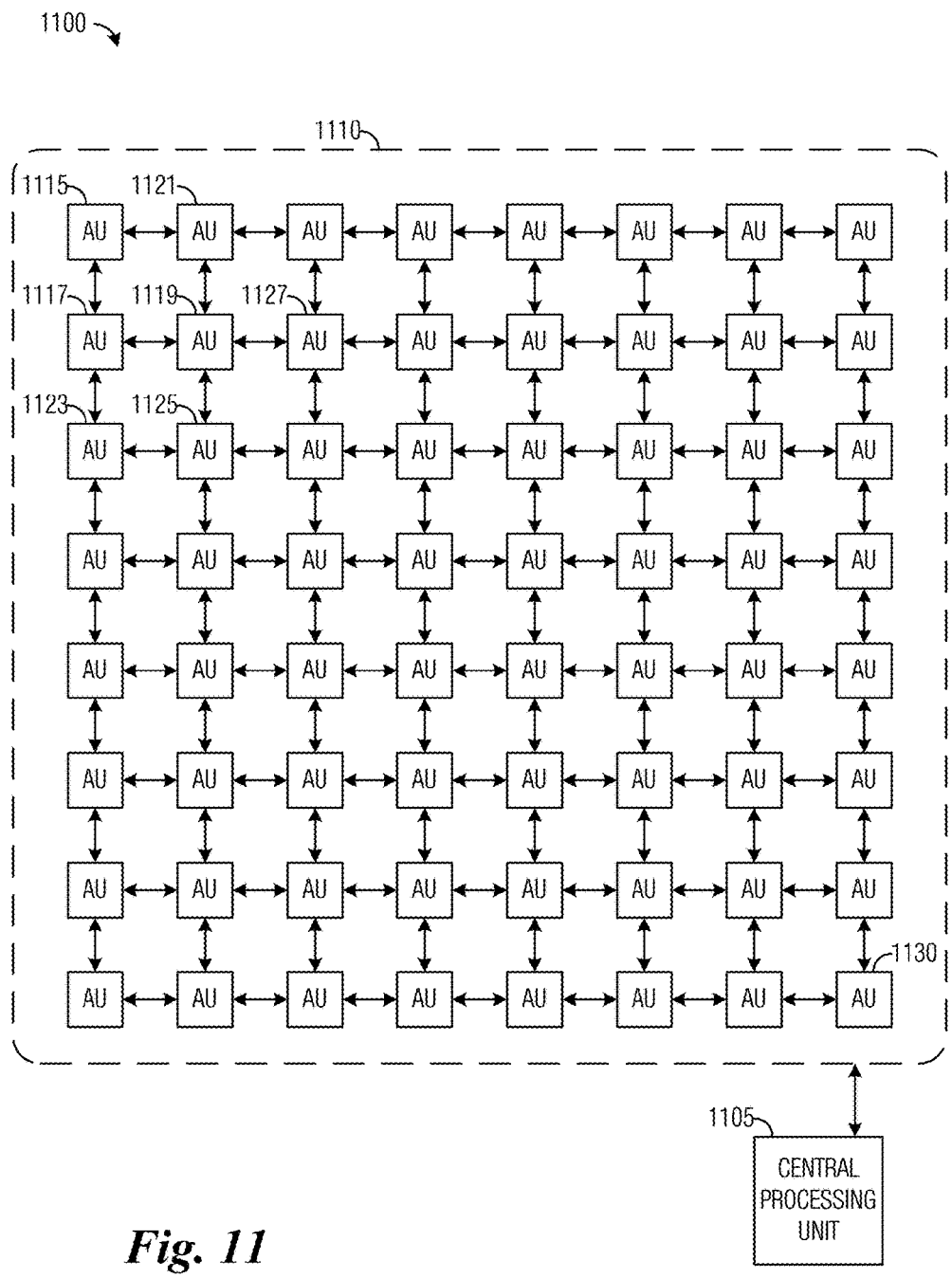
FIG. 11 illustrates an example MIMO communications device, highlighting the architecture of MIMO communications device according to example embodiments described herein.

FIG. 11 illustrates an example MIMO communications device 1100, highlighting the architecture of MIMO communications device 1100. MIMO communications device 1100 includes a central processing unit 1105 and an array of antenna units (AUs) 1110 coupled to central processing unit 1105. Array of AUs 1110 may include any number of AUs, but for large scale MIMO implementations, it is expected that array of AUs 1110 includes on the order of hundreds, thousands, tens of thousands, or more AUs. Central processing unit 1105 may be a single processor or a multi-processor system. Not shown in FIG. 11 are ancillary circuitry such as memories, network interfaces, user interfaces, power supplies, and so forth.

Array of AUs 1110 may be arranged in a mesh configuration. Each AU in array of AUs 1110 is connected to a subset of neighboring AUs. As an illustrative example, AU 1115 is located at a vertex and is connected to two neighboring AUs (AU 1117 and AU 1121). While AU 1117 is located on an edge and is connected to three neighboring AUs (AU 1115, AU 1119, and AU 1123) and AU 1119 is located in a field of AUs and is connected to four neighboring AUs (AU 1117, AU 1121, AU 1125, and AU 1127). The AUs in array of AUs 1110 may be connected to central processing unit 1105 by one or more buses. Alternatively, central processing unit 1105 may be connected to a subset of the AUs in array AUs 1110. As an illustrative example, array of AUs 1110 may include an end AU 1130 that is connected to a subset of neighboring AUs (two neighboring AUs as shown in FIG. 11) and central processing unit 1105. Alternatively, the AUs may be arranged in a linear configuration or a tree configuration.

The AUs in array of AUs 1110 may be spaced regularly apart from one another, e.g., the AUs (or the antennas therein) are spaced one-half wavelength apart. Alternatively, the AUs in array of AUs 1110 may be irregularly spaced apart from one another, e.g., some AUs may be spaced regularly apart while others may be irregularly spaced apart, or none of the AUs are spaced apart by the same amount. The AUs in array of AUs 1110 may be planar (where all of the AUs lie in a single plane) or non-planar (where at least some of the AUs lie in different planes).

Figure 12A:
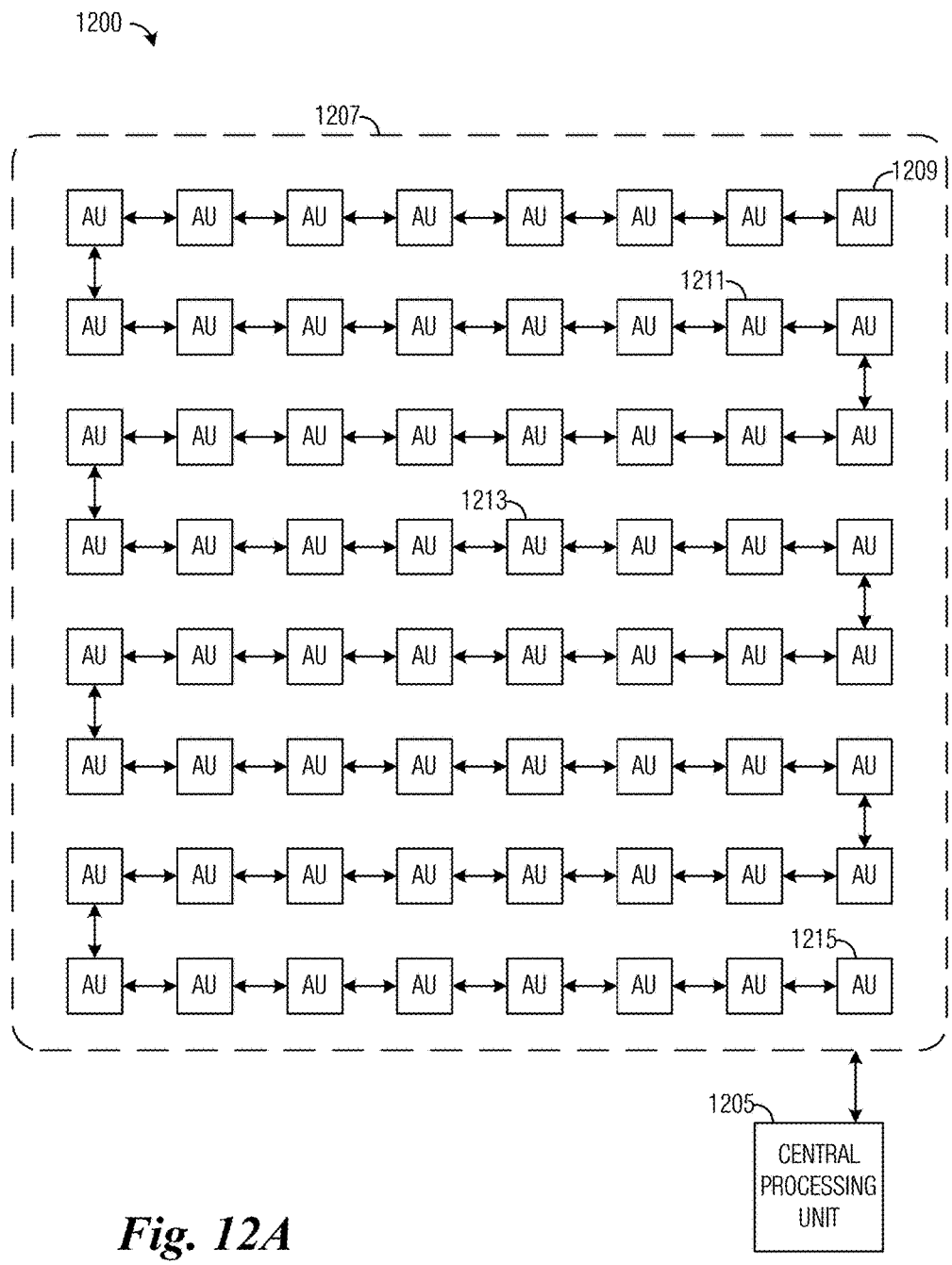
FIG. 12A illustrates a second example MIMO communications device, highlighting the architecture of MIMO communications device illustrated in FIG. 11 according to example embodiments described herein.

FIG. 12A illustrates a second example MIMO communications device 1200, highlighting the architecture of MIMO communications device 1100. MIMO communications device 1200 includes a central processing unit 1205 and an array of AUs 1207 coupled to central processing unit 1205. Array of AUs 1207 may be arranged in a linear configuration. Each AU in array of AUs 1207 is connected to a subset of neighboring AUs. As an illustrative example, AU 1209 is at a start of the linear array and is connected to a single neighboring AU, while AUs 1211 and 1213 are in the linear array and is connected to two neighboring AUs. The AUs in array of AUs 1207 may be connected to central processing unit 1205 by one or more buses. Alternatively, central processing unit 1205 may be connected to a subset of the AUs in array AUs 1207. As an illustrative example, AU 1215 is an end AU and is connected to one neighboring AUs and central processing unit 1205.

Figure 12B:
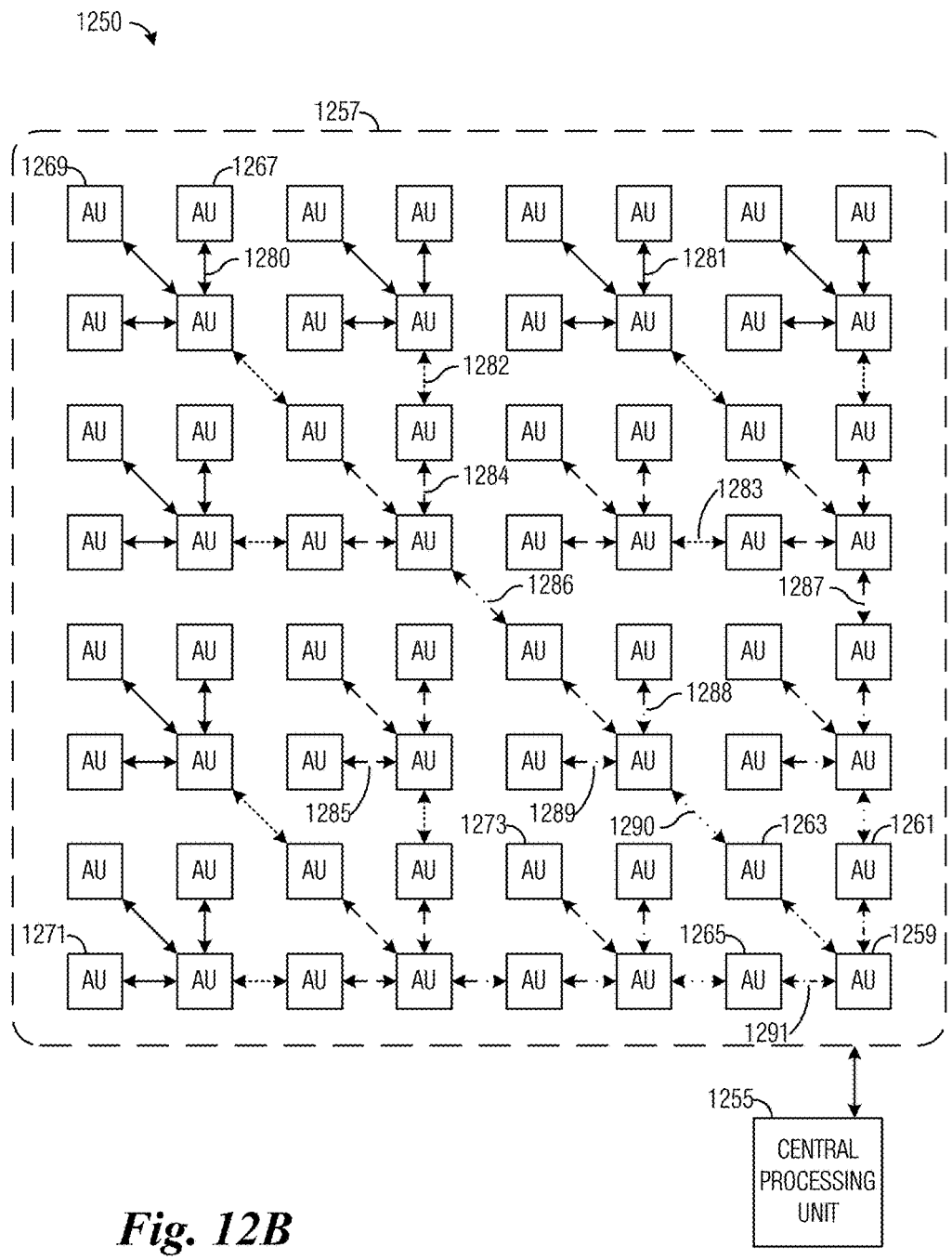
FIG. 12B illustrates a third example MIMO communications device, highlighting the architecture of MIMO communications device according to example embodiments described herein.

FIG. 12B illustrates a third example MIMO communications device 1250, highlighting the architecture of MIMO communications device 1250. MIMO communications device 1250 includes a central processing unit 1255 and an array of AUs 1257 coupled to central processing unit 1255. Array of AUs 1257 may be arranged in a tree configuration. Each AU in array of AUs 1257 is connected to a subset of neighboring AUs. As an illustrative example, AU 1259 is at a start of the tree and is connected to three neighboring AU, while AUs 1261, 1263, and 1265 are edge AUs and are connected to two neighboring AUs. Lowest level AUs, such as AUs 1267, 1269, 1271, and 1273, are coupled to a single neighboring AU. The AUs in array of AUs 1257 may be connected to central processing unit 1255 by one or more buses. Alternatively, central processing unit 1255 may be connected to a subset of the AUs in array AUs 1257. As an illustrative example, AU 1259 is an end AU and is connected to three neighboring AUs and central processing unit 1255.

In FIG. 12B, different line types indicate different phases of MRC vector and autocorrelation matrix accumulation. As an example, solid lines (such as lines 1280 and 1281) represent accumulations that occur at a first phase, short dotted lines (such as lines 1282 and 1283) represent accumulations that occur at a second phase, long dashed lines (such as lines 1284 and 1285) represent accumulations that occur at a third phase, dashed double dotted lines (such as lines 1286 and 1287) represent accumulations that occur at a fourth phase, dashed dotted lines (such as lines 1288 and 1289) represent accumulations that occur at a fifth phase, thin dotted lines (such as line 1290) represent accumulations that occur at a sixth phase, and thin dashed dotted lines (such as line 1291) represent accumulations that occur at a seventh phase. It is noted that the accumulations occur in a pipelined manner and once an initial accumulation occurs in a particular phase (as indicated above), subsequent accumulations of further arriving information occur in follow-on phases. Therefore, for the 64 AU array of AUs 1257, it takes 7 phases for AU 1259 to have the accumulated MRC vector and autocorrelation matrix for a first received symbols vector, in a next phase (i.e., an eighth phase) AU 1259 will have the accumulated MRC vector and autocorrelation matrix for a second received symbols vector, and so on.

According to an example embodiment, a MIMO communications device with a distributed array of AUs is presented. The example MIMO communications devices discussed in FIGS. 12A, and 12B feature a single array of AUs that is directly coupled to the central processing unit. It is also possible to have one or more distributed arrays of AUs coupled to a central processing unit. The one or more distributed arrays of AUs may be coupled to the central processing unit by way of a high-speed connection. The one or more distributed arrays may have the same configuration. The one or more distributed arrays may have different configurations. The one or more distributed arrays may all have the same number of AUs in each array. The one or more distributed arrays may have different numbers of AUs in each array. The one or more distributed arrays may have some arrays having the same number of AUs and/or the same configuration, while other arrays having different numbers of AUs and/or different configurations.

Figure 13:
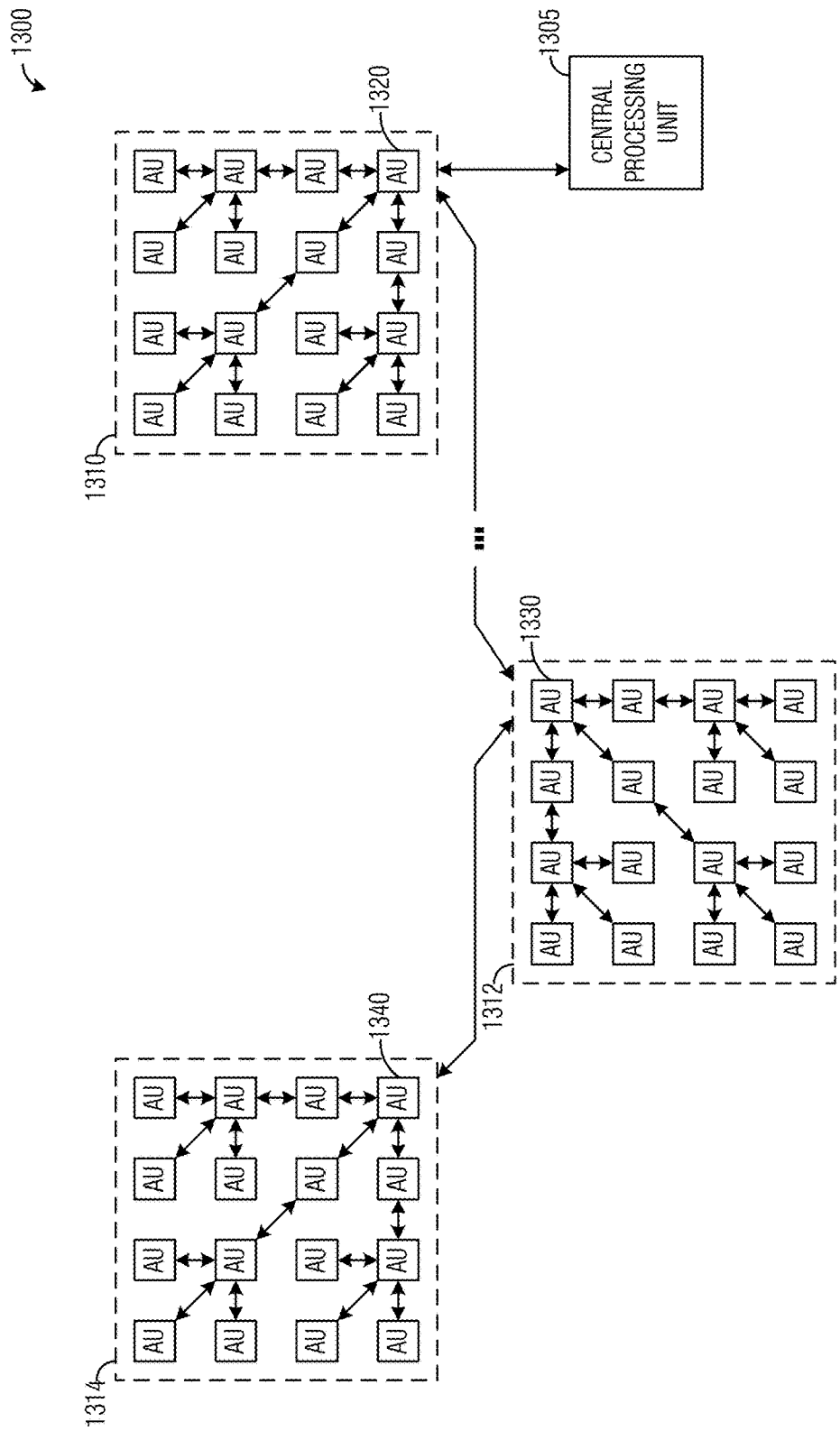
FIG. 13 illustrates an example MIMO communications device, highlighting distributed arrays of AUs according to example embodiments described herein.

FIG. 13 illustrates an example MIMO communications device 1300, highlighting distributed arrays of AUs. MIMO communications device 1300 includes a central processing unit 1305 that is coupled to a plurality of arrays of AUs (each array of AUs is referred to as a leaf). As shown in FIG. 13, central processing unit 1305 is coupled to leaves 1310, 1312, and 1314. As an illustrative example, the leaves of MIMO communications device 1300 may be remotely control antennas or antenna arrays, such as remote radio heads (RRH), or distributed antennas. The leaves shown in FIG. 13 have the same number of AUs and are configured the same way. However, the leaves may have different configurations and/or different numbers of AUs. Therefore, the illustration and discussion of all leaves having the same number of AUs and the same configuration should not be construed as being limiting to either the scope or the spirit of the example embodiments. Furthermore, central processing unit 1305 may be directly coupled to a leaf, such as leaf 1310. In other words, central processing unit 1305 and leaf 1310 may be a MIMO communications device as shown in FIGS. 12A, and 12B.

The leaves may be coupled to each other (and the central processing unit) by way of a high speed bus or connection. As shown in FIG. 13, an end AU of a first leaf is connected to an end AU of a second leaf and so on. In general, any AU in any leaf may be connected to any AU in another leaf. However, resulting latency may be sub-optimal.

Figure 14:
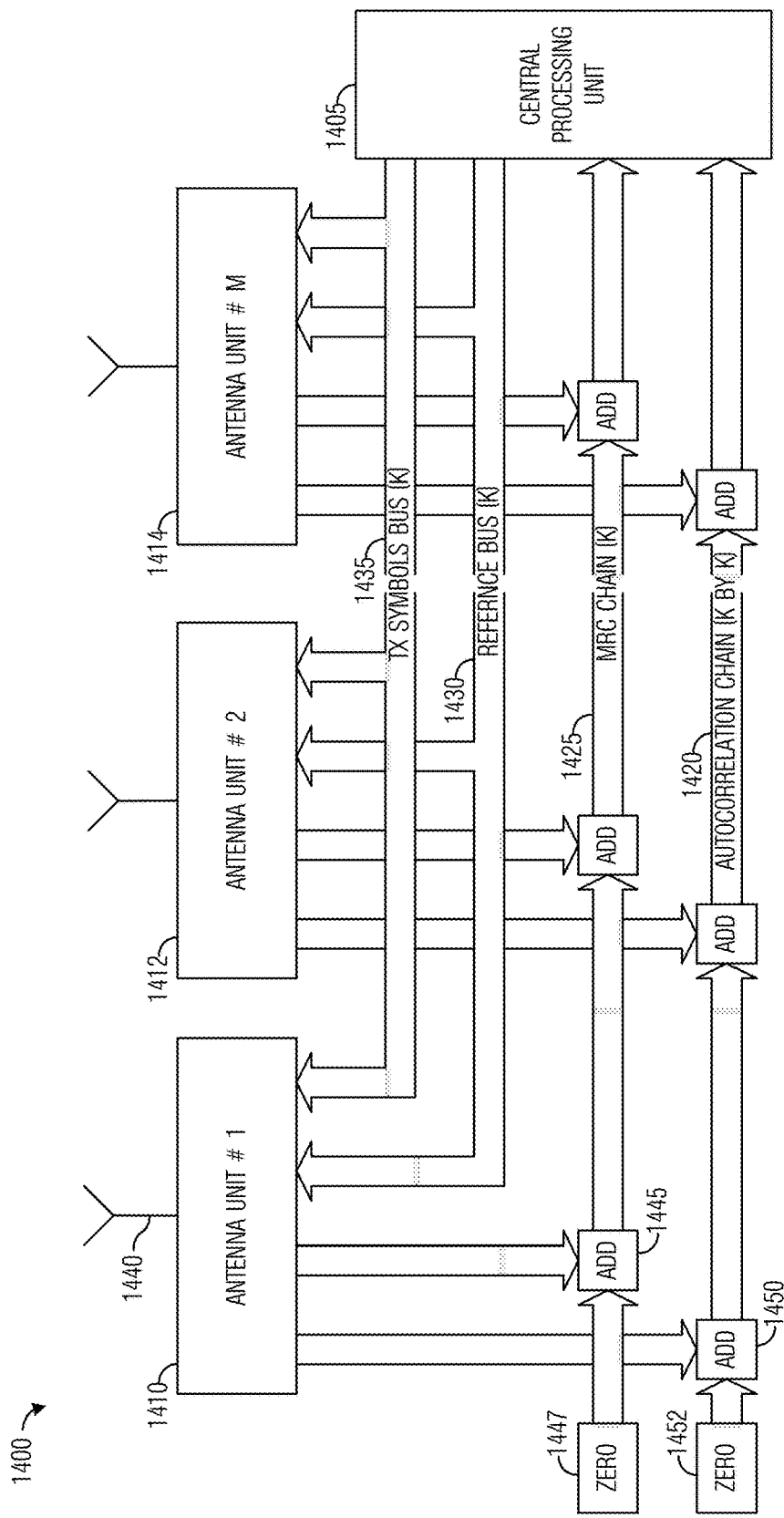
FIG. 14 illustrates a detailed view of an example MIMO communications device, highlighting interconnections between components of MIMO communications device according to example embodiments described herein.

FIG. 14 illustrates a detailed view of an example MIMO communications device 1400, highlighting interconnections between components of MIMO communications device 1400. MIMO communications device 1400 includes a central processing unit 1405 connected to a plurality of AUs (such as AU 1410, AU 1412, and AU 1414), wherein the plurality of AUs may be arranged in an array of AUs but are shown as a linear sequence to simplify the figure. Central processing unit 1405 is connected to the plurality of AUs with an autocorrelation connection 1420 (used to exchange autocorrelation matrices), a maximum ratio combining (MRC) connection 1425 (used to exchange MRC vectors), a reference connection 1430 (used to exchange reference signals), and a TX symbols connection 1435 (used to exchange TX symbols to be transmitted).

Autocorrelation connection 1420 allows for the exchange of the accumulated autocorrelation matrix and has sufficient bandwidth to support the transfer of K by K-sized matrices. MRC connection 1425 allows for the exchange of the accumulated MRC vector and has sufficient bandwidth to support the transfer of K-sized vectors. Reference connection 1430 allows for the exchange of reference signals for use in channel estimation and has sufficient bandwidth to support the transfer of K-sized vectors. TX symbols connection 1435 allows for the exchange of TX symbols for transmission precoding and transmission and has sufficient bandwidth to support the transfer of K-sized vectors. The connections may be bi-directional in nature, allowing the AUs in the plurality of AUs to exchange information with one another. A control bus allows for the exchange of control signals regulating the operation of MIMO communications device.

MIMO communications device 1400 includes a plurality of adders (such as adders 1445 and 1450) to accumulate information from neighboring AUs. As shown in FIG. 14, information, after accumulation in a first adder is provided as input to a second adder associated with a neighboring AU. Adders associated with a first AU (i.e., AU 1410) are provided with zeroes as input by zeroes 1447 and 1452. Each AU also includes antennas (such as antenna 1440 for AU 1410). Although shown in FIG. 14 as a single antenna, each AU includes a receive antenna and a transmit antenna, which may be implemented as a single antenna with a duplexer or as two distinct antennas.

Figure 15:
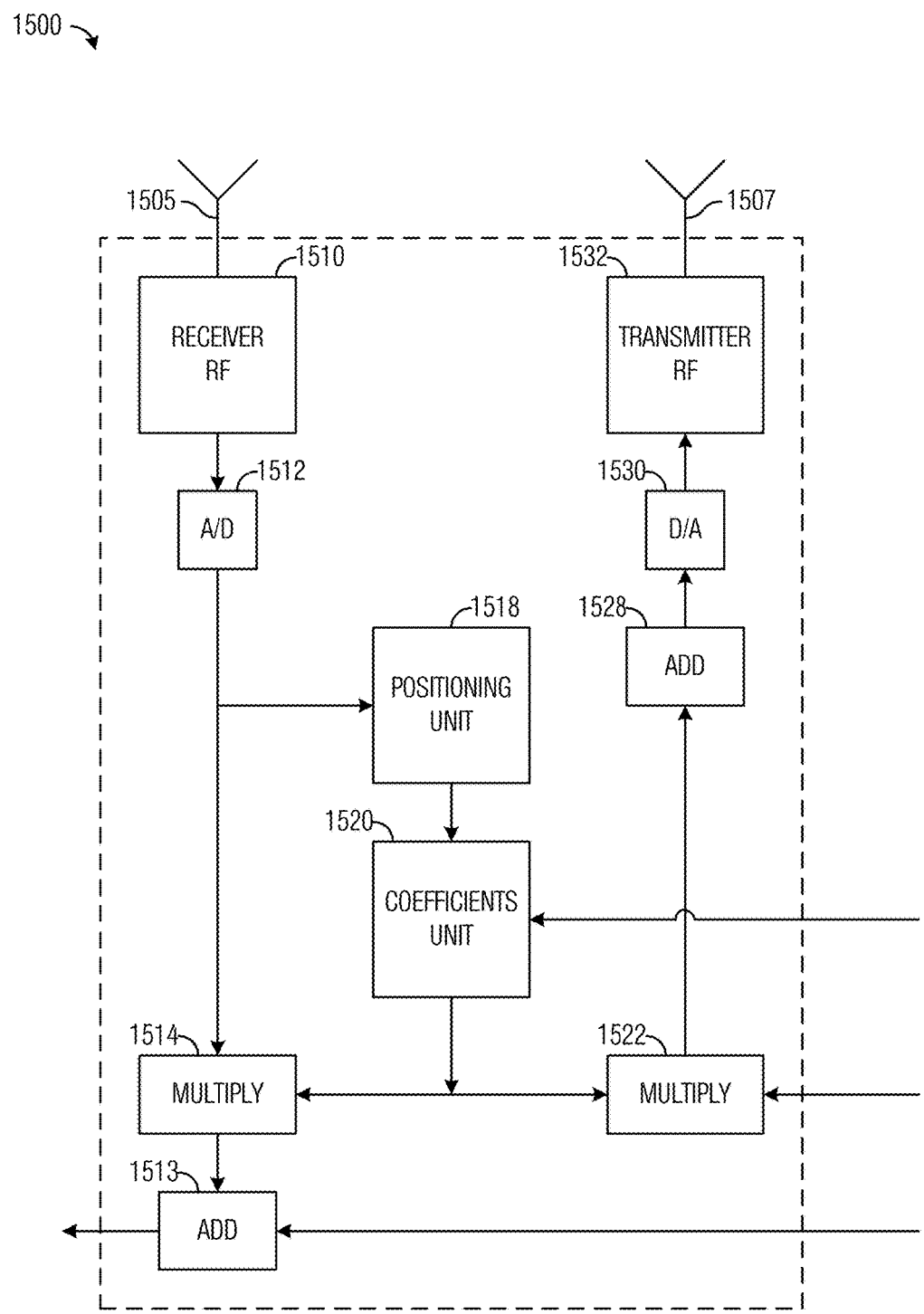
FIG. 15 illustrates a detailed view of an example AU according to example embodiments described herein.

FIG. 15 illustrates a detailed view of an example AU 1500. AU 1500 includes a receive antenna 1505 and a transmit antenna 1507, although it is possible to share a single antenna through the use of a duplexer. AU 1500 also includes receiver RF circuitry 1510, which may include filters, demodulators, constellation demappers, and the like, and an A/D converter 1512. A multiply unit 1514 is configured to multiply received signals with coefficients provided by a coefficients unit 1520. As an illustrative example, the received signals may be multiplied by a reference signal, or a channel matrix. An adder 1516 is configured to accumulate results of multiplier 1516 along with shared information provided by a neighboring AU. The accumulated result of adder 1516 may be shared with another neighboring AU or with a central processing unit.

A positioning unit 1518 is configured to assist in determining a position of AU 1500 using received reference signals (such as those transmitted by positioning systems 500 and 900), while a multiply unit 1522 is configured to multiply coefficients provided by coefficients unit 1520 with signals provided by the central processing unit. As an illustrative example, multiply unit 1522 may multiply transmission symbols provided by the central processing unit with channel transfer functions. An adder 1528 combines the outputs of multiplier 1528 and provides the combine value to a D/A converter 1520. AU 1500 also includes transmitter RF circuitry 1532, which may include filters, modulators, constellation mappers, and so on.

According to an example embodiment, each receive AU includes an AU processing unit which implement distributed computing to reduce computational load at the central processing unit, as well as the amount of data exchanged between the AUs and the central processing unit. Since the central processing unit that is implementing one or more of the five MIMO decoder techniques does not need to know all inputs Y and channel estimates A of all of the M receive antennas, it is possible to utilize AU processing units in the AUs to implement distributed (or cloud) computing. Results of the distributed computing performed at individual AUs are shared with other AUs, and eventually, the central processing unit where the results are used to estimate the received transmissions.

According to an example embodiment, a MRC vector R is represented as an accumulation of increments from the M receive antennas. The MRC vector R is expressible as $$R = A^T \cdot Y = \sum_{m=1}^{M} R_m$$

and $$R_m = A_m^T \cdot y_m$$

where $R_m$ is the component of the MRC vector R that is associated with receive antenna #m and is a vector of length K, $y_m$ is a sample that is received by receive antenna #m, and $A_m$ is an m-th row of channel matrix A that is associated with receive antenna #m and is a vector of length K. Therefore, the MRC vector R may be simply generated by summing individual $R_m$ components received from each of the M receive antennas. If the summation is performed at the AU processing units, the central processing unit may not need to perform significant processing to determine the MRC vector R.

Figure 16A:
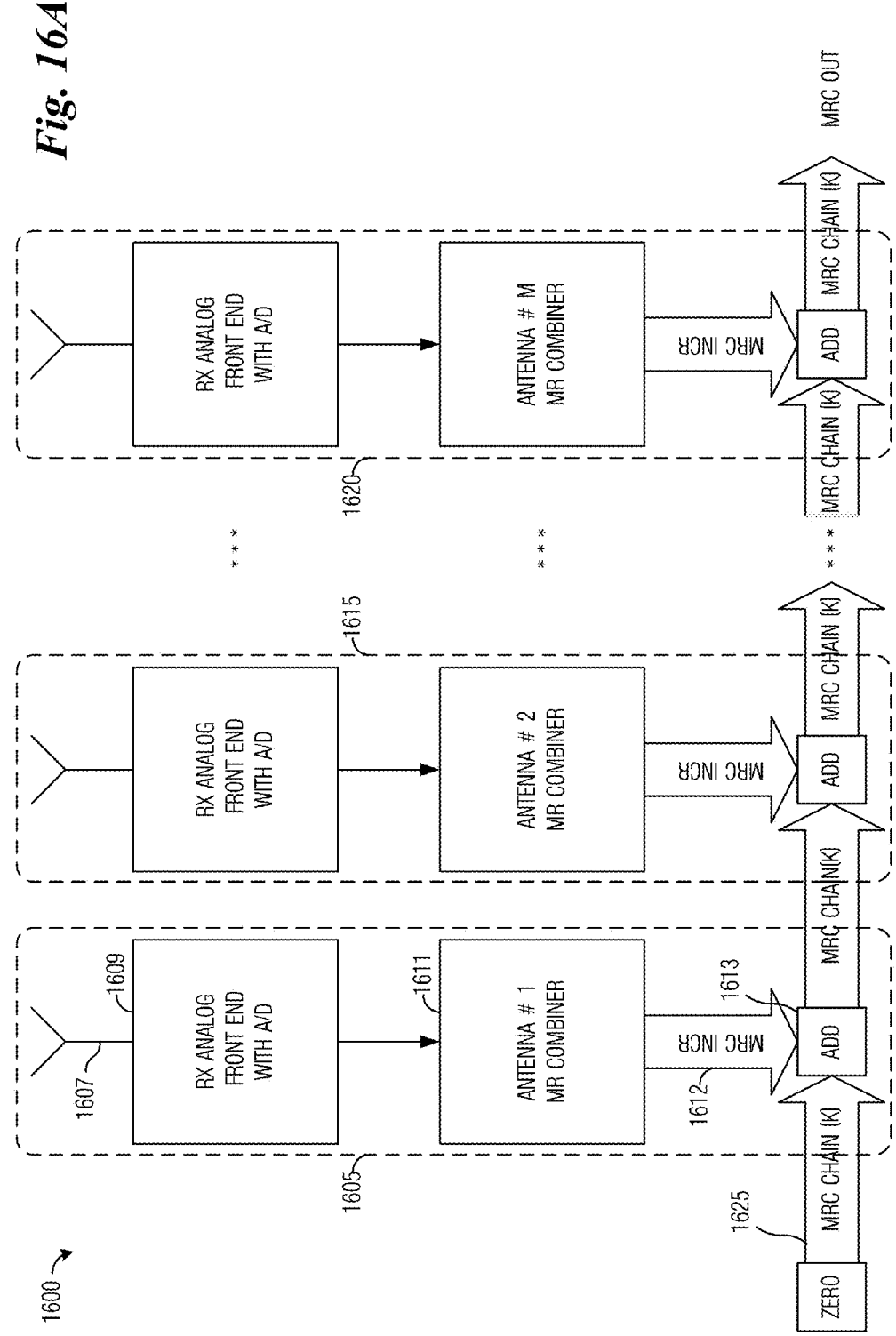
FIG. 16A illustrates a chain of AUs configured to determine a MRC vector R in a distributed computing manner according to example embodiments described herein.

FIG. 16A illustrates a chain of AUs 1600 configured to determine a MRC vector R in a distributed computing manner. Chain of AUs 1600 includes a plurality of AUs, such as AU #1 1605, AU #2 1615, and AU #M 1620. Each AU includes a receive antenna, such as receive antenna 1607, and a receiver (RX) analog front end (which may include filters) with A/D converter, such as RX analog front end with A/D converter 1609. The AU also includes a maximum ratio (MR) combiner, such as Antenna #1 MR combiner 1611, configured to generate an individual MR component for the AU. The AU also includes an adder, such as adder 1613, configured to accumulate an MR component from the MR combiner with an MR component from a first neighboring AU. The adder is coupled to the MR combiner over an MRC INCR connection, such as MRC INCR connection 1612. In the case of AU #1 1605, the MR component from the first neighboring AU is set to 0. Output of the adder is provided to a second neighboring AU. Inputs to and outputs from the adder are communicated over a MRC connection 1625. Chain of AUs 1600 is configured to operate in a pipelined fashion.

Figure 16B:
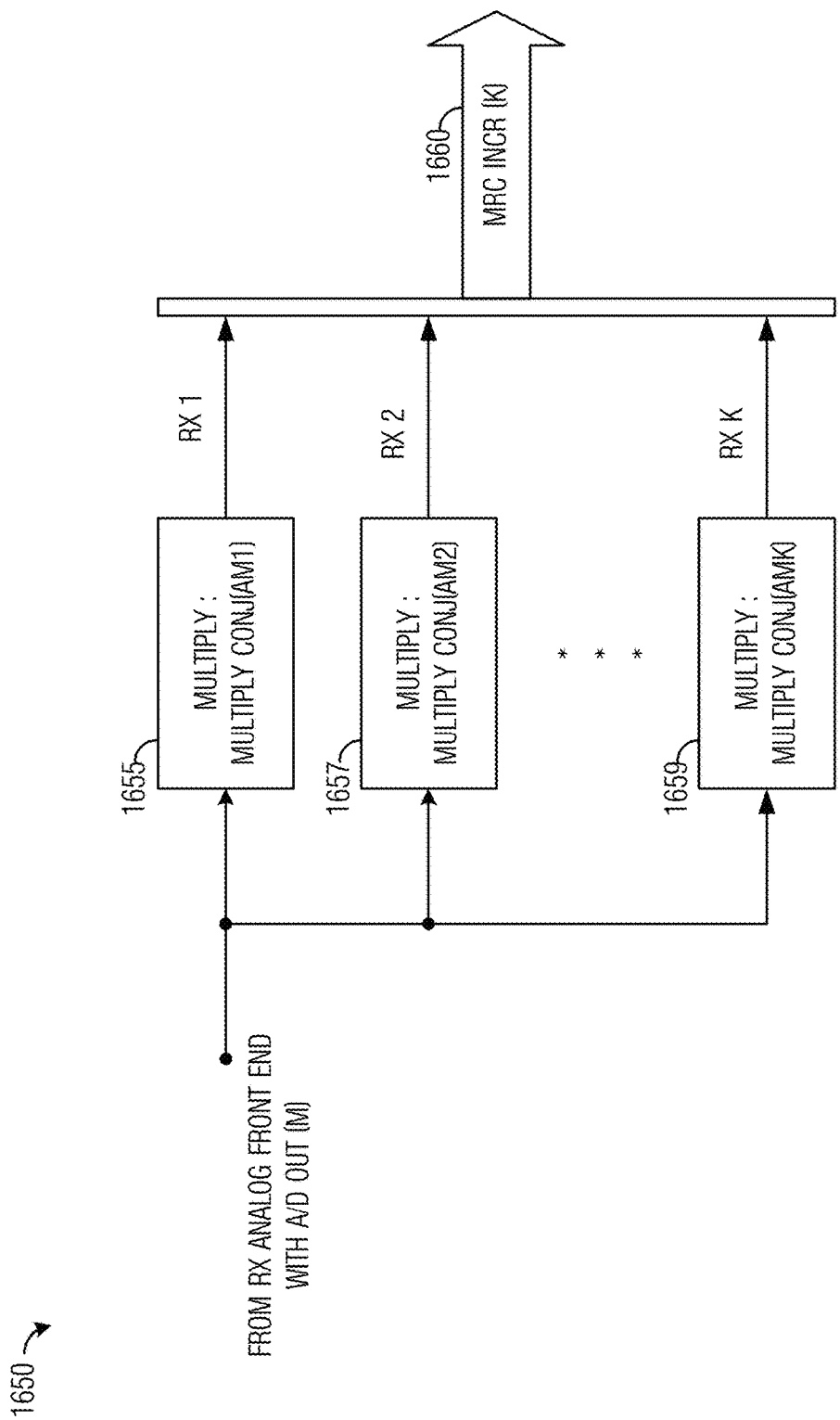
FIG. 16B illustrates an example MR combiner of an AU according to example embodiments described herein.

FIG. 16B illustrates an example MR combiner 1650 of an AU. MR combiner 1650 may be an implementation of a MR combiner of an AU in a chain of AUs configured to determine a MRC vector R in a distributed computing manner. MR combiner 1650 may be implemented in hardware or software or a combination of hardware and software. MR combiner 1650 includes K multipliers, such as multiplier 1655, multiplier 1657, and multiplier 1659, wherein each of the K multipliers multiplies an accumulated value with a conjugate of an output of RX analog front end with A/D converter to produce a MRC component for each of the K users. Outputs from the K multipliers (the K MRC components) are outputted over MRC INCR channel 1660 to an adder.

According to an example embodiment, an autocorrelation matrix Acor is represented as an accumulation of increments from the M receive antennas. The autocorrelation matrix Acor is expressible as $$Acor = A^T \cdot A = \sum_{m=1}^{M} Acor_m$$

and $$Acor_m = A_m^T \cdot A_m$$

where $Acor_m$ is a component of the autocorrelation matrix that is associated with receive antenna #m, and $A_m$ is an m-th row of channel matrix A that is associated with receive antenna #m and is a vector of length K. Therefore, the autocorrelation matrix Acor may be simply generated by summing individual $Acor_m$ components received from each of the M receive antennas. If the summation is performed at the AUs, the central processing unit may not need to perform significant processing to determine the autocorrelation matrix Acor.

Figure 17:
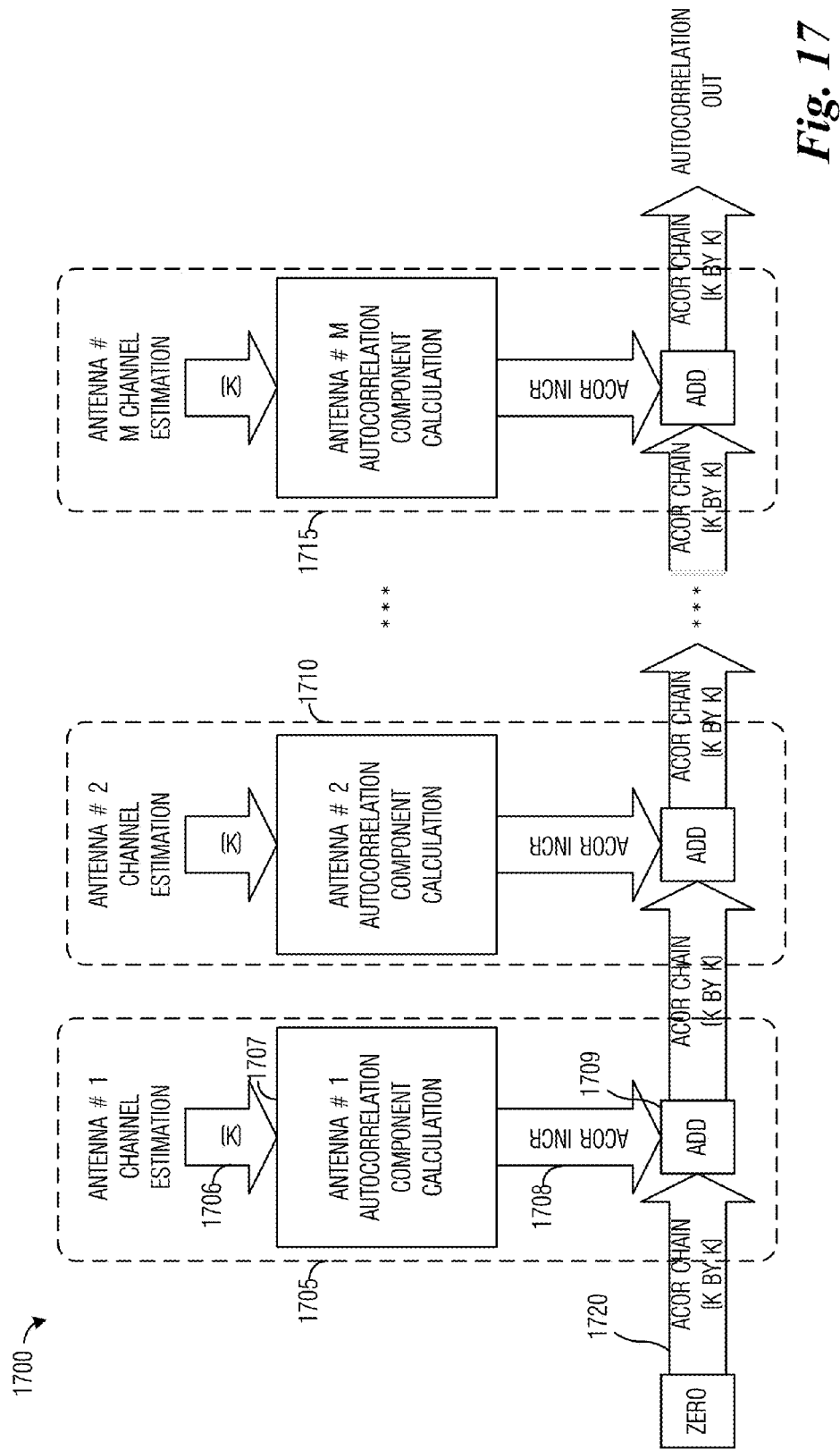
FIG. 17 illustrates a chain of AUs configured to determine an autocorrelation matrix Acor in a distributed manner according to example embodiments described herein.

FIG. 17 illustrates a chain of AUs 1700 configured to determine an autocorrelation matrix Acor in a distributed manner. Chain of AUs 1700 includes a plurality of AUs, such as AU #1 1705, AU #2 1710, and AU #M 1715. Each AU includes an autocorrelation component calculation unit, such as Antenna #1 autocorrelation component calculation unit 1707, configured to determine an autocorrelation component $Acor_m$ in accordance with a channel estimate for the receive antenna. The autocorrelation component calculation unit is coupled to a receive antenna by a connection, such as connection 1706. The AU also includes an adder, such as adder 1709, configured to accumulate the autocorrelation component from the autocorrelation component calculation unit with an autocorrelation component from a first neighboring AU. The adder is connected to the autocorrelation component calculation unit with an ACOR INC connection, such as ACOR INC connection 1708. In the case of AU #1, the autocorrelation component from the first neighboring AU is set to 0. Output of the adder is provided to a second AU. Inputs to and outputs from the adder are communicated over an ACOR connection 1720. Chain of AUs 1700 is configured to operate in a pipelined fashion.

According to an example embodiment, it is also possible to perform MIMO precoding in a distributed computing manner. It is possible to make the following conclusions:

1. A central processing unit does not have to know channel matrix A with size M by K. It is sufficient to know a much smaller autocorrelation matrix Acor with size M by M.

2. Multiplication with the transposed channel matrix $A^T$ with size K by M may be performed independently in each AU by the individual AU processing units, for example. Each AU may multiply precoded symbols vector S with a vector $A_m^T$ that represents row #m of channel matrix A as related to transmit antenna m.

3. If the communications system is operating in time division duplexed (TDD) mode, an uplink channel estimate may be used as the downlink channel estimate.

Figure 18A:
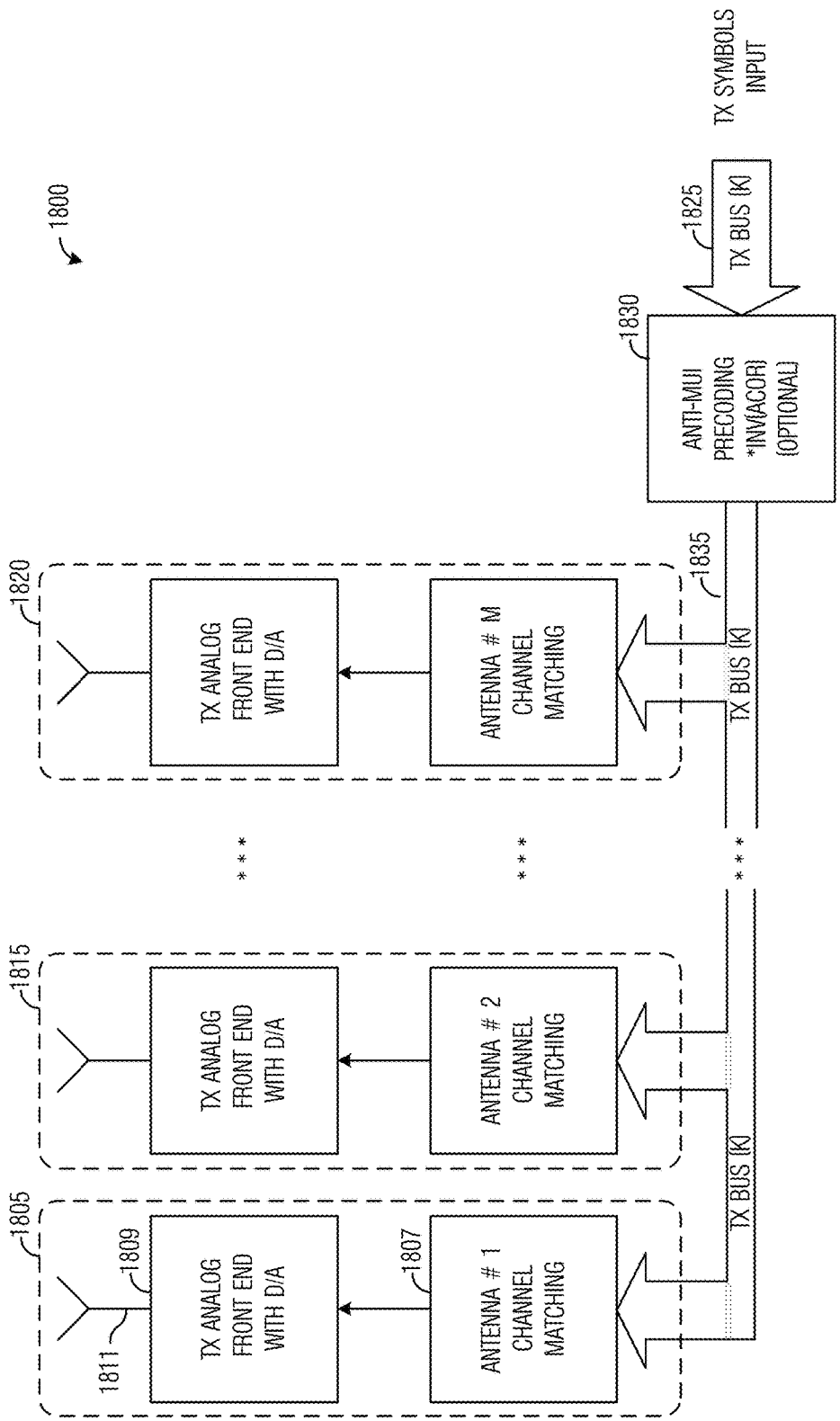
FIG. 18A illustrates a chain of AUs configured to perform MIMO precoding in a distributed computing manner according to example embodiments described herein.

FIG. 18A illustrates a chain of AUs 1800 configured to perform MIMO precoding in a distributed computing manner. Chain of AUs 1800 includes a plurality of AUs, such as AU #1 1805, AU #2 1810, and AU #M 1815. Each AU includes an antenna channel matching unit, such as antenna #1 channel matching unit 1807, configured to apply a channel transfer function to transmission symbols prior to transmission. Each AU also includes a transmit analog front end with D/A converter, such as TX analog front end with D/A converter 1809, which includes amplifiers, filters, constellation mappers, as well as a D/A converter, to generate transmission signals that are provided to a transmit antenna, such as a transmit antenna 1811. Transmission symbols are provided over a TX bus 1825 and anti-multiuser interference (ANTI-MUI) may be applied by an ANTI-MUI precoder 1830. The transmission symbols are provided over a TX bus 1835 to the plurality of AUs.

Figure 18B:
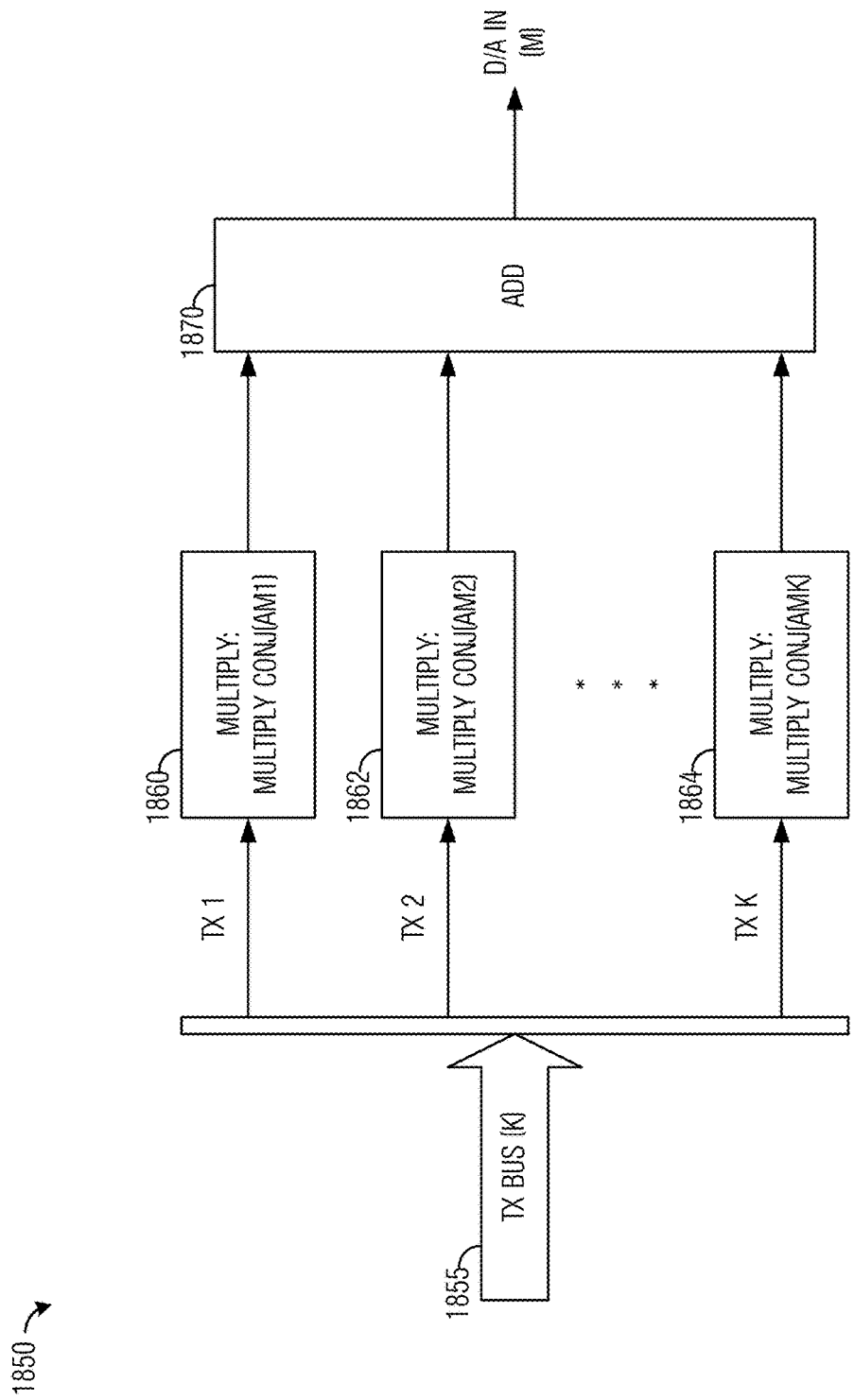
FIG. 18B illustrates an example channel matching unit of an AU according to example embodiments described herein.

FIG. 18B illustrates an example channel matching unit 1850 of an AU. Channel matching unit 1850 may be an implementation of a channel matching unit of an AU in a chain of AUs configured to perform MIMO precoding. Channel matching unit 1850 may be implemented in hardware or software or a combination of hardware and software. TX symbols are provided to channel matching unit 1850 over a TX bus 1855. Channel matching unit 1850 includes K multipliers, such as multiplier #1 1860, multiplier #2 1862, and multiplier #K 1864, wherein each of the K multipliers multiplies the TX symbols with a channel transfer function associated with a user. An adder 1870 combines the outputs of the K multipliers and an output of adder 1870 is provided to a D/A converter.

As discussed previously, a central processing unit does not need to know channel information of each transmit antenna. It is sufficient to know only accumulated autocorrelation matrix with a smaller size of K by K. Therefore, each AU may be able to maintain its own channel information without having to transfer the channel information to the central processing unit.

When dealing with the uplink (a transmission from a user to a base station), each user transmits its own reference signal for use in channel estimation. Therefore, the total number of reference signals is equal to the number of users K Each AU (e.g., AU #m) may use the K reference signals to estimate channel vector $A_m$ with length K. If a least mean squared (LMS) algorithm is used in the estimation, the estimated channel vector is expressible as $$a_{m,k} = \frac{1}{N} \cdot \sum_{n=1}^{N} (y_m \cdot ref_k(n)),$$

where N is the length of the reference sequence (also referred to as accumulation length), $y_m$ is a sample that is received by receive antenna #m, and $ref_k(n)$ is the reference signal for user k.

Figure 19A:
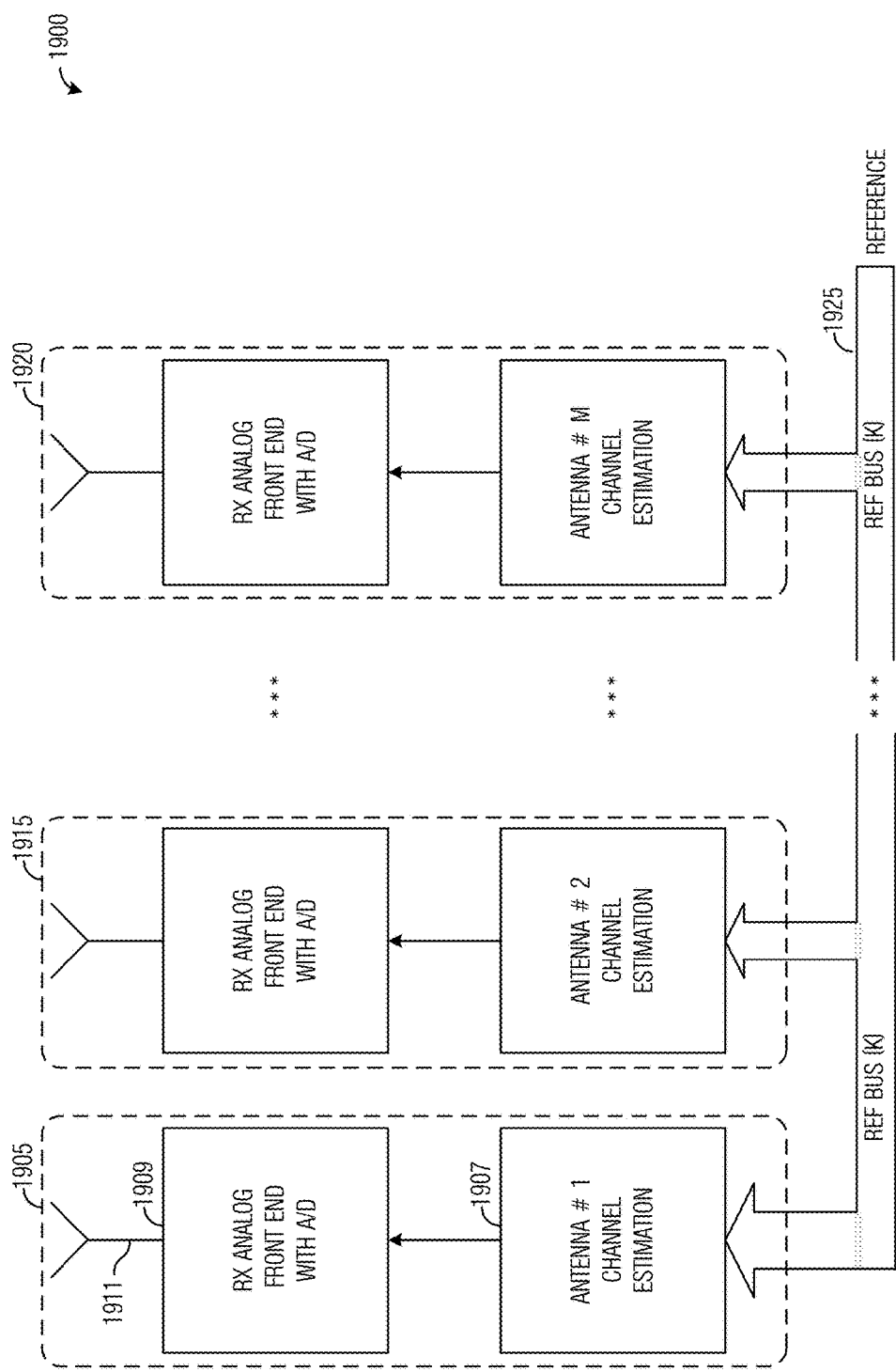
FIG. 19A illustrates a chain of AUs configured to determine channel estimates in a distributed computing manner according to example embodiments described herein.

FIG. 19A illustrates a chain of AUs 1900 configured to determine channel estimates in a distributed computing manner. Chain of AUs 1900 includes a plurality of AUs, such as AU #1 1905, AU #2 1915, and AU #M 1920. Each AU includes an antenna channel estimation unit, such as antenna #1 channel estimation unit 1907, configured to estimate a channel between the AU and the users, and a receiver (RX) analog front end (which may include filters) with A/D converter, such as RX analog front end with A/D converter 1909. Each AU also includes a receive antenna, such as receive antenna 1911. The reference signals for the different users are provided to chain of AUs 1900 by way of reference bus 1925.

Figure 19B:
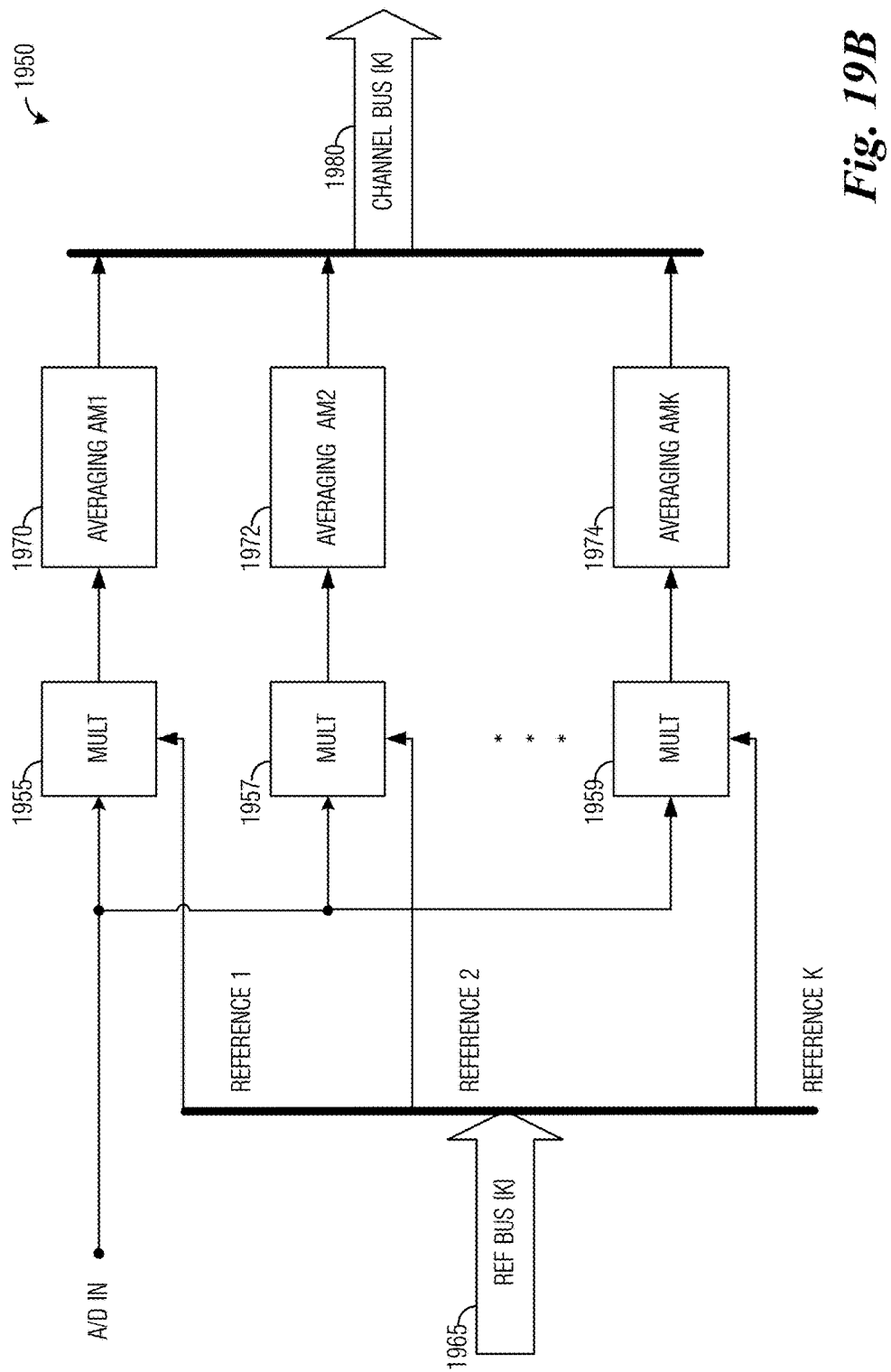
FIG. 19B illustrates an example antenna channel estimation unit according to example embodiments described herein.

FIG. 19B illustrates an example antenna channel estimation unit 1950. Antenna channel estimation unit 1950 may be an implementation of an antenna channel estimation unit of an AU in a chain of AUs configured to determine channel estimates in a distributed computing manner. Antenna channel estimation unit 1950 may be implemented in hardware or software or a combination of hardware and software. Antenna channel estimation unit 1950 includes K multipliers, such as multiplier 1955, multiplier 1957, and multiplier 1959, configured to multiply the reference signals associated with the users (provided by reference bus 1965 that has width K) with received signals from an RX analog front end with A/D converter. Antenna channel estimation unit 1950 also includes K averaging units, such as averaging unit 1970, averaging unit 1972, and averaging unit 1974, configured to maintain an average (e.g., a running average) of outputs of the multipliers, thereby producing channel estimates for each of the K users.

As discussed previously, it is possible to generate beams that have desired directions (α,β). As an example, FIG. 4 illustrates a plurality of antenna beams 400 that includes antenna beam 405 with direction $(\alpha,\beta)_1$, antenna beam 410 with direction $(\alpha,\beta)_2$, and antenna beam 415 with direction $(\alpha,\beta)_3$. In order to generate antenna beams with desired directions (α,β), a MIMO communications device may have to be able to determine the desired directions (α,β).

Figure 20:
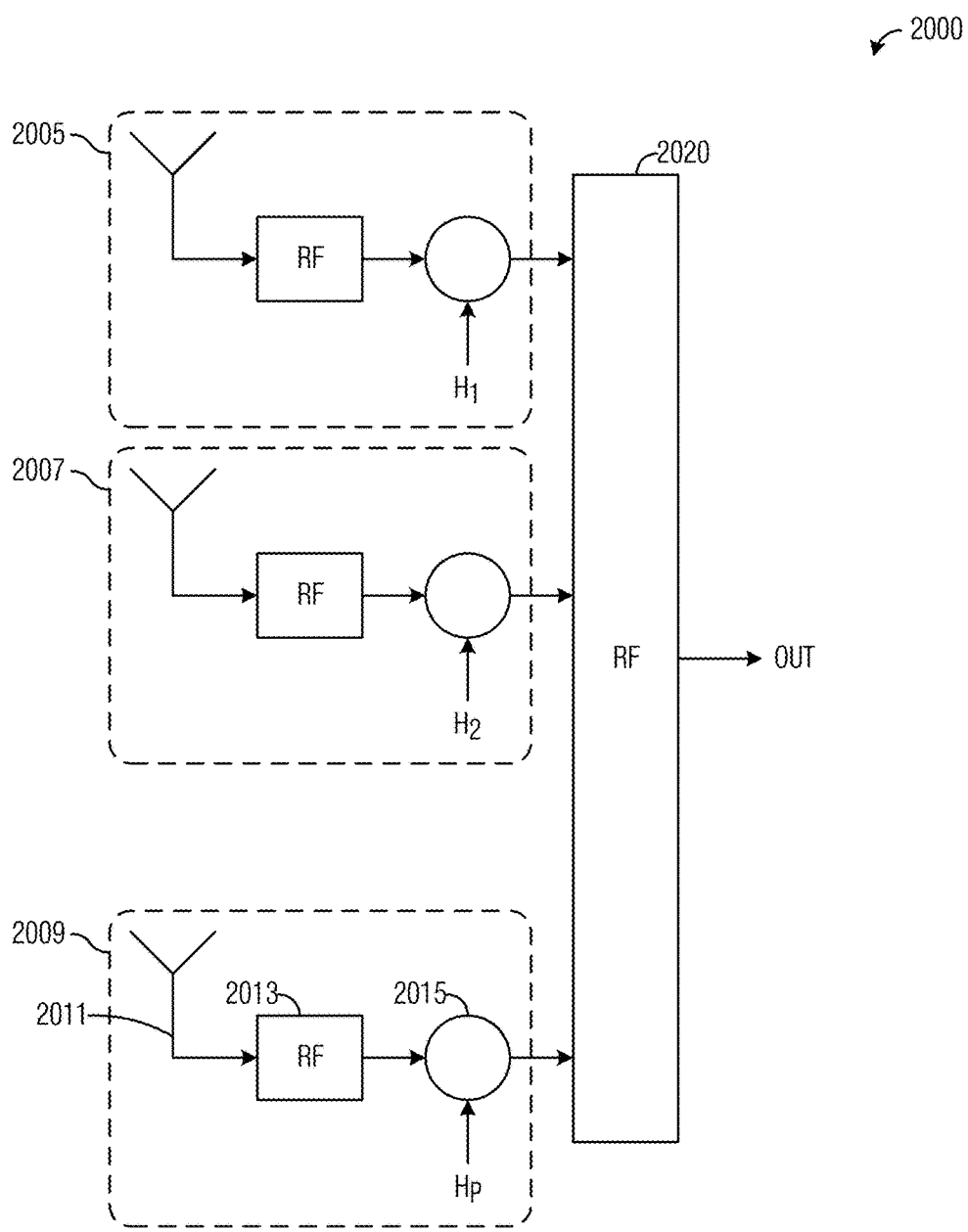
FIG. 20 illustrates the architecture of a portion of an example massive MIMO multi-beam receiver according to example embodiments described herein.

FIG. 20 illustrates the architecture of a portion of an example massive MIMO multi-beam receiver 2000. Massive MIMO multi-beam receiver 2000 includes a plurality of receive antenna units, such as receive antenna unit #1 2005, receive antenna unit #2 2007, and receive antenna unit #P 2009. Each receive antenna unit includes a receive antenna, such as receive antenna 2011, a RF front end, such as RF front end 2013, and a multiplier, such as multiplier 2015. Massive MIMO multi-beam receiver 2000 also includes RF circuit 2020 that combines outputs from the plurality of receive antenna units.

In general, the coefficients for receive antenna unit #P 2009 for a single antenna beam with angle (α,β) is expressible as $$\overline{H}_p(\alpha, \beta) = \exp\left(j \cdot 2 \cdot \pi \cdot \frac{(x_p - x_0) \cdot \cos(\alpha) \cdot \cos(\beta) + (y_p - y_0) \cdot \cos(\alpha) \cdot \sin(\beta) + (z_p - z_0) \cdot \sin(\alpha)}{\lambda}\right),$$

where $(x,y,z)_p$ is the coordinates of receive antenna unit #p 2009, and $(x_o,y_o,z_o)_P$ is the reference coordinates of massive MIMO multi-beam receiver 2000. Similarly, the coefficients for receive antenna unit #P 2009 for multiple beams with multiple angles is expressible as $$H_p = \sum_{k=0}^{K-1} \overline{H}_p(\alpha_k, \beta_k).$$

However, determining the angles for the multiple beams may be a difficult task since a search space to determine the angles is very large. Therefore, the scanning of the search space to find the angles with the most energy can take an extended amount of time. Furthermore, since the beam width of antenna beams generated by a communications device (e.g., a massive MIMO multi-beam receiver) is inversely proportional to the number of antennas, the scan of the search space takes an even greater amount of time due to the narrow beam width of the antenna beams generated by the massive MIMO multi-beam receiver.

According to an example embodiment, a distributed approach is applied to the scanning of the search space to find the angles with the most energy. The search space is partitioned into a plurality of independent portions that may be separately scanned. Since each independent portion is smaller, the scan of each independent portion will take less time.

According to an example embodiment, the inverse relationship between the beam width of antenna beams generated by a communications device and the number of antennas of the communications device used to generate the antenna beams is exploited. Since the beam width of the antenna beams will generally increase as the number of antennas used to generate the antenna beams, the number of antennas used to generate the antenna beams that are used in the scanning of the search space is decreased to increase the beam width of the antenna beams. The greater beam width of the resulting antenna beams may shorten the amount of time to scan the search space due to increased search granularity.

According to an example embodiment, both the distributed approach and the antenna beam width are used to help accelerate the scan of the search space. The combining of both techniques may help further speed up the finding of the angles of the antenna beams.

According to an example embodiment, once the angles of the antenna beams are found, antenna beams with narrower beam widths are used to increase precision. A two-stage process is used to increase performance. In a first stage, the finding of the angles of the antenna beams is performed quickly with smaller search spaces and wider beam widths, while in a second stage, after the angles have been found increased precision is achieved by using antenna beams with narrower beam widths.

Figure 21:
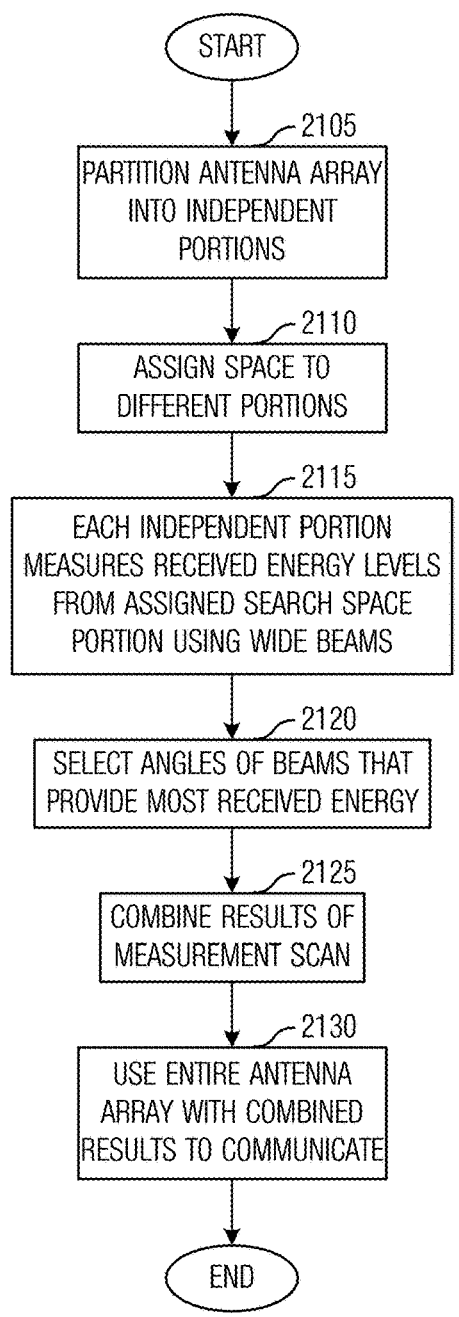
FIG. 21 illustrates a flow diagram of example operations occurring in a fast determining of antenna beams for a massive MIMO communications device according to example embodiments described herein.

FIG. 21 illustrates a flow diagram of example operations 2100 occurring in a fast determining of antenna beams for a massive MIMO communications device. Operations 2100 may be indicative of operations occurring in a massive MIMO communications device, such as MIMO communications devices shown in FIGS. 11, 12A, 12B, and 13.

Operations 2100 may begin with a partitioning of an antenna array into a plurality of independent antenna array portions (block 2105). The antenna array may be partitioning into an integer number of independent antenna array portions. As illustrative examples, the antenna array is partitioned into 2, 4, 8, 16, and so on, independent antenna array portions. In general, as the number of antennas in the independent antenna array portions decreases as the number of independent antenna array portions increases. However, overhead also increases. Each independent antenna array portion may contain about the same number of antennas to simplify implementation. Each independent antenna array portion is assigned to scan a different part of the search space (block 2110). The search space may be partitioned into a plurality of search space portions. The number of search space portions may be equal to the number of independent antenna array portions. Alternatively, there may be more search space portions than the number of independent antenna array portions. In such a situation, each independent antenna array portion scans one or more search space portions.

Each independent antenna array portion measures received energy from the search space portion(s) assigned to it (block 2115). Since the independent array portions comprise a smaller number of antennas than the antenna array, the beam widths of the antenna beams will be greater, thereby speeding up the scan of the search space portion(s). As an illustrative example, a measurement process includes a central processing unit associated with an independent antenna array portion configures an antenna beam so that it is directed inside the search space portion assigned to the independent antenna array portion and measures an energy level associated by the antenna beam. The central processing unit continues the measurement process with other antenna beams until the search space portion has been measured. If the independent antenna array portion has been assigned multiple search space portions, the measurement process may continue until all assigned multiple search space portions have been scanned.

The antenna beam(s) associated with the highest energy levels are selected (block 2120). The number of antenna beams selected may be a configurable number. As an illustrative example, if there is a large number of search space portions, only a relatively small number of antenna beams are selected (for example, 1 or 2 antenna beams per search space portion). While, if there is a small number of search space portions, a relatively large number of antenna beams are selected (for example, 4 or 5 antenna beams per search space portion). Alternatively, every antenna beam with a measured energy level exceeding a threshold is selected. Alternatively, a combination of a number of antenna beams and a threshold is used in the selection of antenna beams. The selected antenna beams from different search space portion is combined (block 2125). The antenna array, in its entirety, is used with the selected antenna beams to communicate (block 2130). The use of the antenna array, with its larger number of antennas, results in narrower beam width antenna beams. The narrower beam width antenna beams provide greater precision, such as in receiving more of a transmission to the massive MIMO communications device while receive less noise and/or interference since the transmission encompasses a larger percentage of the narrower beam width antenna beam.

Figure 22:
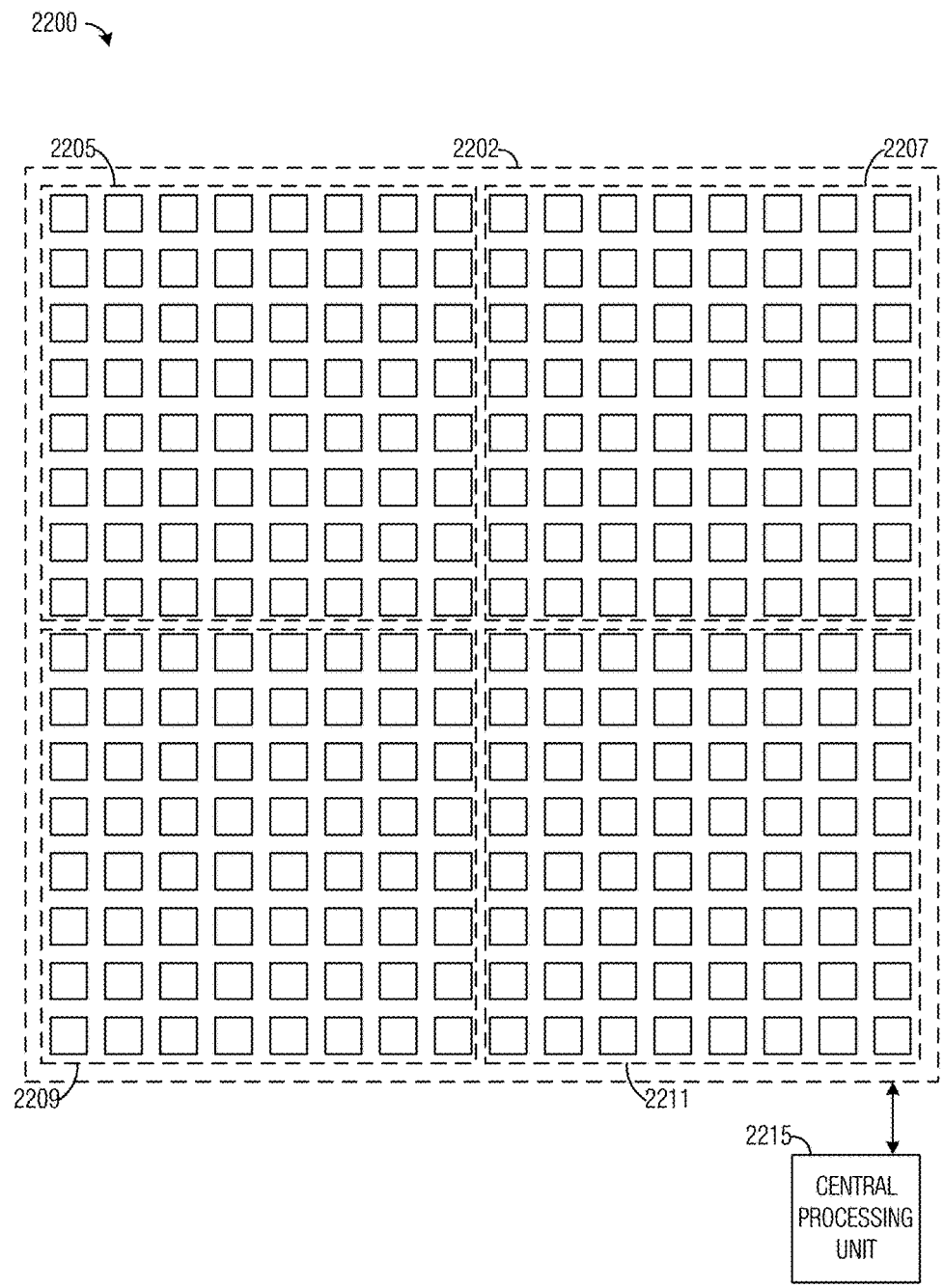
FIG. 22 illustrates an example massive MIMO communications device, highlighting a partitioned antenna array according to example embodiments described herein.

FIG. 22 illustrates an example massive MIMO communications device 2200, highlighting a partitioned antenna array. Massive MIMO communications device 2200 includes an antenna array 2202 that is partitioned into 4 independent antenna array portions 2205, 2207, 2209, and 2211. Massive MIMO communications device 2200 also includes a central processing unit 2215 operatively coupled to antenna array 2202. Each independent antenna array portion is capable of scanning a search space using antenna beams and measuring received energy.

Figure 23:
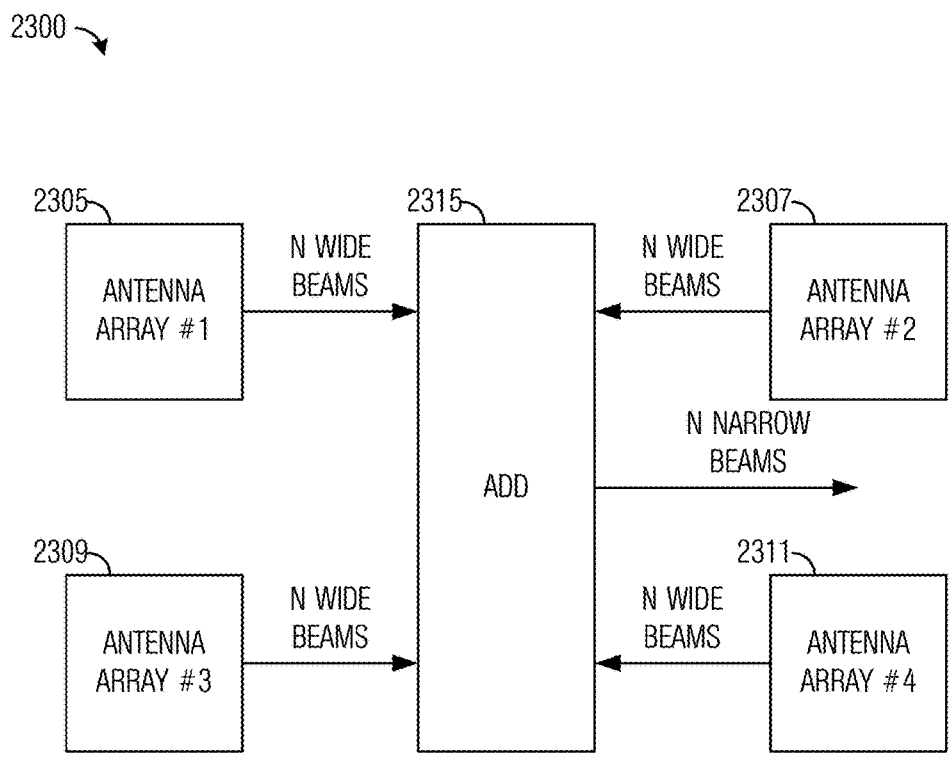
FIG. 23 illustrates an example combining circuit according to example embodiments described herein.

FIG. 23 illustrates an example combining circuit 2300. Combining circuit 2300 combines N wide beam width antenna beams from four independent antenna array portions 2305, 2307, 2309, and 2311, with an adder 2315 to produce N narrow beam width antenna beams, where N is a positive integer value.

It is noted that the conventional LMS algorithm does not work well when the number of antennas is large because the SNR per antenna is reduced by M in order to maintain an accumulated SNR, where M is the number of antennas. As an illustrative example, if M=100, then the per antenna SNR is 20 dB below nominal (10 $\log_{10}$(M)). In order to estimate the channel with such a low SNR using the convention per antenna LMS algorithm, the pilot sequence must be increased M times. With the increasing number of antennas, it may not be possible to continue to increase the pilot sequence.

Another significant limitation of the conventional LMS algorithm is that it is applicable only for the uplink channels. In order to estimate the downlink channel, multiple unique pilot sequences must be allocated to each antenna. In situations with large numbers of antennas, the simply is not a sufficient number of unique pilot sequences or if there is a sufficient number of unique pilot sequences, the communications overhead dominates overall communications system performance and leads to poor performance. An alternative is to employ channel reciprocity to extrapolate the downlink channel using the estimate of the uplink channel. However, channel reciprocity typically works well for TDD communications modes and yields poor results in frequency division duplexed (FDD) communications modes because in TDD, the same frequency bands are used for both uplink and downlink channels, while in FDD, different frequency bands are used for uplink and downlink channels. Therefore, the characterization of the uplink channel may not apply to the downlink channel.

Therefore, channel estimation is a major issue and bottleneck for massive and large scale MIMO operation. One approach to channel estimation is to represent the channel as a set of beams with different directions of arrival or departure. However, multi-beam channel representation does not fit many situations when considering the near field scenario, such as indoor, multi-cell cooperation, and so on.

According to an example embodiment, the channel between an antenna m and a user k is expressible as a superposition of S beams. In general, S is much smaller than M (the number of antennas in a large scale MIMO antenna array). In FIG. 4, plurality of antenna beams 400 of antenna array 402 and their respective directions ($\alpha, \beta$) relative to a user k are shown. It is noted that the number of antenna beams S in plurality of antenna beams 400 of antenna array 402 may remain constant or relatively constant as the number of antennas M in antenna array 402 increases.

In a random displacement deployment, where the antennas of antenna array 402 are not necessarily planar nor equality spaced, the multipath uplink and downlink channels for antenna m as a function of S beams are expressible as $$h_{UL,m}(n_F) = \sum_{s=1}^{S} a_{UL,s} \cdot \exp(j \cdot 2 \cdot \pi \cdot n_F \cdot \Delta f \cdot \tau_s) \cdot steering_m(f_{UL} + n_F \cdot \Delta f, \alpha_s, \beta_s)$$

and $$h_{DL,m}(n_F) = \sum_{s=1}^{S} a_{DL,s} \cdot \exp(j \cdot 2 \cdot \pi \cdot n_F \cdot \Delta f \cdot \tau_s) \cdot steering_m(f_{DL} + n_F \cdot \Delta f, \alpha_s, \beta_s)$$

Where: $(x_m, y_m, z_m)$ is the location of antenna m;
$(a_s, \alpha_s, \beta_s, \tau_s)$ are the spatial parameters for beam s, with
$a_s$—complex amplitude,
$\alpha_s, \beta_s$—angles of arrival or departure, and
$\tau_s$—delay;
$n_F$ is a subcarrier index;
$\Delta f$ is a subcarrier spacing;
$f_{UL}$ is uplink carrier frequency;
$f_{DL}$ is downlink carrier frequency;
S is the number of beams; and
$steering_m$ is a steering vector associated with a precoding vector that orient a beam towards a specified direction.

The steering vector is used to determine the coefficients of the precoding vector. As an example, $$steering_m(f, \alpha, \beta) = \exp\left(j \cdot 2 \cdot \pi \cdot f \cdot \left(\frac{x_m \cdot \cos(\alpha) \cdot \cos(\beta) + y_m \cos(\alpha) \cdot \sin(\beta) + z_m \cdot \sin(\alpha)}{c}\right)\right),$$

Where: c is the speed of light.

Therefore, not only are the channels expressible using the S beams, the beams themselves may be characterized with only four parameters, i.e., beam s is characterized by parameters $(a_s, \alpha_s, \beta_s, \tau_s)$. Hence, as the number of antennas continues to increase, it may be computationally less complex to estimate the channels using the S beams instead of the M antennas because the number of beams is usually a function of users and may remain relatively constant as the number of antennas continue to increase.

It is possible to represent an estimate of the multipath channel m as a function of antennas in the antenna array (i.e., the estimate of the multipath channel in the antenna domain) as $$\hat{h}_m = \frac{1}{N_{REF}} \cdot \sum_{n_T=1}^{N_{REF}} ref_k^*(n_F, n_T) \cdot y_m(n_F, n_T),$$

Where: $N_{REF}$ is the length of the reference or pilot sequence;
$n_T$ is the time index;
k is the user index;
$ref_k^*(n_F, n_T)$ is the reference or pilot sequence at time $n_T$ and in subcarrier $n_T$; and
$y_m(n_F, n_T)$ is the signal received by antenna m at time $n_T$ and in subcarrier $n_T$.

Using superposition, the estimate of the multipath channel k in the antenna domain may be converted into an estimate of the multipath channel as a function of angles (i.e., the estimate of the multipath channel in the angular domain) relative to the antenna array. The estimate of the multipath channel k in the angular domain is expressible as:

$$\hat{h}_k(\alpha, \beta, \tau) = \frac{1}{M} \cdot \sum_{m=1}^{M} \sum_{n_F=1}^{N_C} steering_m(f_{UL} + n_F \cdot \Delta f, \alpha, \beta, \tau) \cdot \hat{h}_m,$$

Where: M is the number of receive antennas;
$N_C$ is the number of subcarriers; and
m is the antenna index.

The estimate of the multipath channel in the angular domain is analogous to a beam s in the time domain and may be characterized using four parameters: complex amplitude a; angles of arrival or departure $\alpha$ and $\beta$; and delay $\tau$. Therefore, it is possible to find the beams by maximizing the estimate of the multipath channel in the angular domain $\hat{h}_k(\alpha, \beta, \tau)$.

Figure 24:
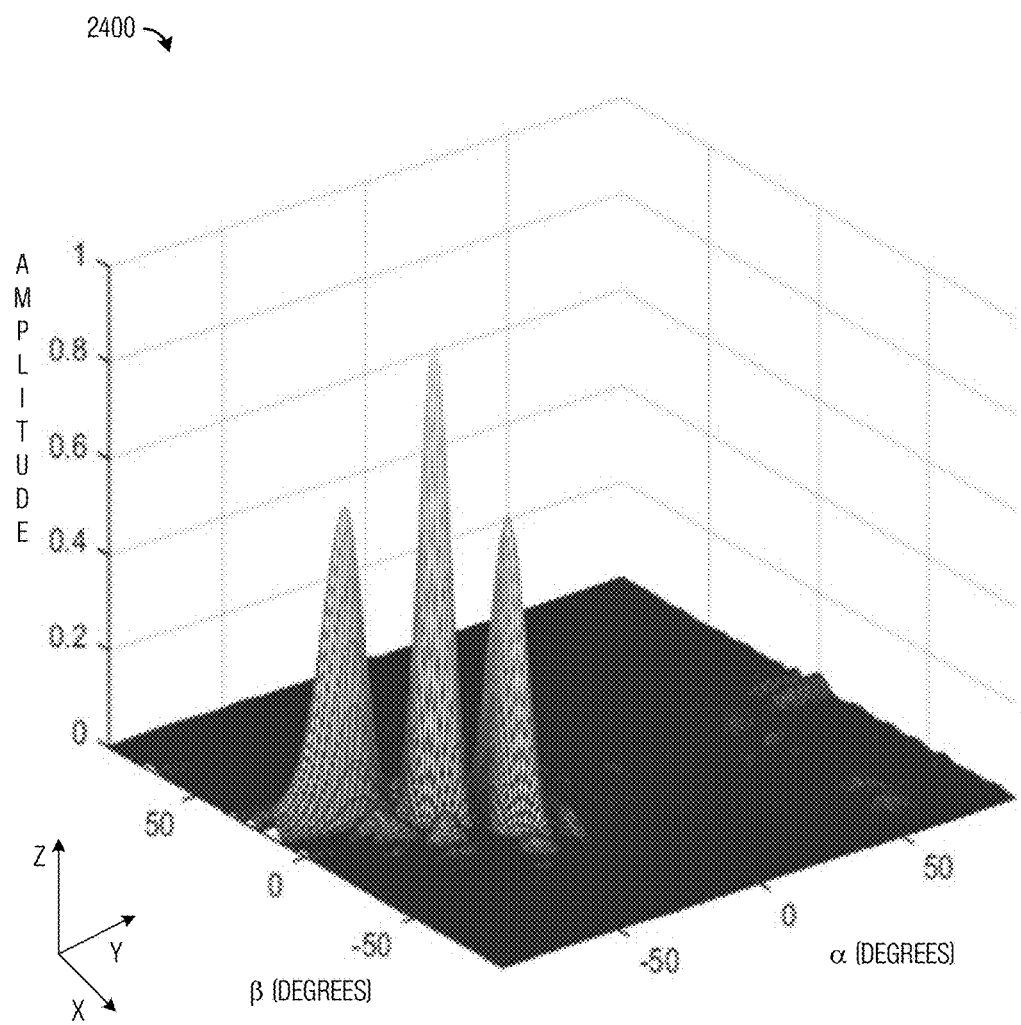
FIG. 24 illustrates a three-dimensional surface plot of the estimate of the multipath channel in the angular domain for an example antenna array according to example embodiments described herein.

FIG. 24 illustrates a three-dimensional surface plot 2400 of the estimate of the multipath channel in the angular domain for an example antenna array. Three-dimensional surface plot 2400 displays the estimate of the multipath channel in the angular domain for a fixed value of delay $\tau$, where the Y-axis is the angle $\alpha$, the X-axis is the angle $\beta$, and the Z-axis is the complex amplitude a. As shown in FIG. 24, the angular domain representation of the estimate of the multipath channel features a plurality of beams, but three of the beams have significantly greater amplitude than the remaining beams. It is possible to obtain a good estimate of the multipath channel in the angular domain with only the beams that exceed a threshold. Therefore, the contribution of beams with small amplitudes to the estimate of the multipath channel in the angular domain may be ignored, further reducing the computational complexity involved in channel estimation.

According to an example embodiment, the estimate of the multipath channel is based on the beams with amplitudes that exceed a threshold. The use of a threshold to select the beams used to estimate the multipath channel may reduce the overall number of beams used to estimate the multipath channel, thereby simplifying the estimate. A variety of search techniques are available for use in finding the beams and a simple threshold comparison may be used to determine which ones of the found beams are used in estimating the multipath channel.

The beams may be found by maximizing $\hat{h}_k(\alpha, \beta, \tau)$. In general, the parameters $\alpha, \beta', \tau$ of a beam s for user k may be found by evaluating the expression $$(\alpha_{k,s}, \beta_{k,s}, \tau_{k,s}) = \arg \max_{(\alpha, \beta, \tau)} (\hat{h}_k(\alpha, \beta, \tau)),$$

Where: $\arg \max_{(\alpha, \beta, \tau)} (\hat{h}_k(\alpha, \beta, \tau))$ provides the $(\alpha, \beta, \tau)$ that maximizes the function $\hat{h}_k(\alpha, \beta, \tau)$.

While the parameter a for a beam s for user k may be found by evaluating the expression $$a_{k,s} = \hat{h}_k(\alpha_{k,s}, \beta_{k,s}, \tau_{k,s}).$$

The actual multipath channels in the angular domain are expressible as $$h_k(\alpha, \beta, \tau) = \sum_{s=1}^{S} a_{k,s} \cdot acor_{BEAM}(\alpha, \beta, \tau, \alpha_{k,s}, \beta_{k,s}, \tau_{k,s}),$$

Where $acor_{BEAM}(\alpha, \beta, \tau, \alpha_{k,s}, \beta_{k,s}, \tau_{k,s})$ is a mathematical optimization function in the angular domain.

A variety of searches, such as an exhaustive search, simulated annealing, and the like, may be used to maximize $\hat{h}_k(\alpha, \beta, \tau)$. According to an example embodiment, a multi-phase search is used to maximize $\hat{h}_k(\alpha, \beta, \tau)$.

FIG. 25 illustrates a two-dimensional plot 2500 of the estimate of the multipath channel in the angular domain for an example antenna array, highlighting a two-phased search. Two-dimension plot 2500 displays complex amplitude as a function of a first one of the angles of arrival or departure (e.g., $\alpha$ or $\beta$) while a second one of the angles of arrival or departure (e.g., ($\beta$ or $\alpha$) is kept fixed. In a first phase, referred to as initial acquisition, a low update rate (coarse resolution) search is performed to quickly find potential maximums of the estimates of the multipath channel. As an example, amplitude values that exceed a threshold are identified as potential maximums. Results of the first phase are shown in FIG. 25 as solid vertical lines that are spaced relatively far apart, e.g., lines 2505, 2507, 2509, and 2511. Because of the coarseness of the search, the first phase is unlikely to find the maximums of the estimates of the multipath channel. However, the coarse search can locate potential maximums of the estimates of the multipath channel.

In a second phase, referred to as precise resolution search, a high update rate (fine granularity) search is performed to find the maximums of the estimates of the multipath channel. The second phase uses the results of the first phase to reduce the search space. As an illustrative example, the second phase searches around the potential maximums found in the first phase. As shown in FIG. 25, the results of the second phase are shown as dashed vertical lines that are spaced relatively closely together, e.g., dashed lines 2515, 2517, 2519, and 2521. The fine granularity of the second phase enables the locating of the maximums of the estimates of the multipath channel. It is noted that the fine granularity of the second phase will typically take more time and require more computational resources, however, the search performed in the second phase only occurs around the potential maximums found in the first phase, therefore, the search space is significantly smaller. As shown in FIG. 25, the second phase search is performed around potential maximums found in the first phase search (e.g., lines 2509 and 2511), while ignoring lines that are unlikely to be maximums (e.g., lines 2505 and 2507).

According to an example embodiment, a gradient search method is used to maximize $\hat{h}_k(\alpha,\beta,\tau)$. A gradient search takes search steps that is proportional to the gradient or an approximation of the gradient of $\hat{h}_k(\alpha,\beta,\tau)$. As an example, a peak gradient search is used. In order to implement the peak gradient search, the estimate of the multipath channels are re-expressed for the parameters of the search, such as $$G_\tau = \frac{\hat{h}_k(\alpha, \beta, \tau + \varepsilon_\tau) - \hat{h}_k(\alpha, \beta, \tau - \varepsilon_\tau)}{2 \cdot \varepsilon_\tau}$$

$$\tau_{NEW} = \tau_{OLD} + \mu_\tau \cdot G_\tau;$$

$$G_\alpha = \frac{\hat{h}_k(\alpha + \varepsilon_\alpha, \beta, \tau) - \hat{h}_k(\alpha - \varepsilon_\alpha, \beta, \tau)}{2 \cdot \varepsilon_\alpha}$$

$$\alpha_{NEW} = \alpha_{OLD} + \mu_\alpha \cdot G_\alpha; \text{ and}$$

$$G_\beta = \frac{\hat{h}_k(\alpha, \beta + \varepsilon_\beta, \tau) - \hat{h}_k(\alpha, \beta - \varepsilon_\beta, \tau)}{2 \cdot \varepsilon_\beta}$$

$$\beta_{NEW} = \beta_{OLD} + \mu_\beta \cdot G_\beta,$$

Where: $G_\tau, G_\alpha, G_\beta$ are the gradients (or errors) of the parameters of the multipath channels in the angular domain;

$\mu_\tau, \mu_\alpha, \mu_\beta$ are the gradient search (or tracking) convergence coefficients; and $\varepsilon_\tau, \varepsilon_\alpha, \varepsilon_\beta$ are the gradient step sizes.

According to an example embodiment, the relationships between the value of $\hat{h}_k$ for the current value of a parameter (e.g., $\alpha,\beta,\tau$) and the value of $\hat{h}_k$ for the early and late values of the parameter is used to determine an adjustment to the value of the parameter.

Figure 26C:
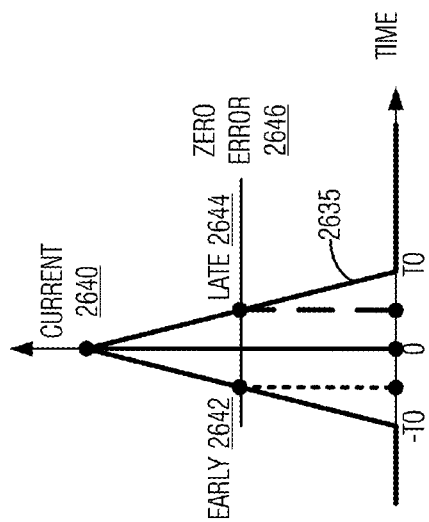
FIGS. 26A-26C illustrate example gradient searches for beam parameter $\tau$ according to example embodiments described herein.
Figure 26B:
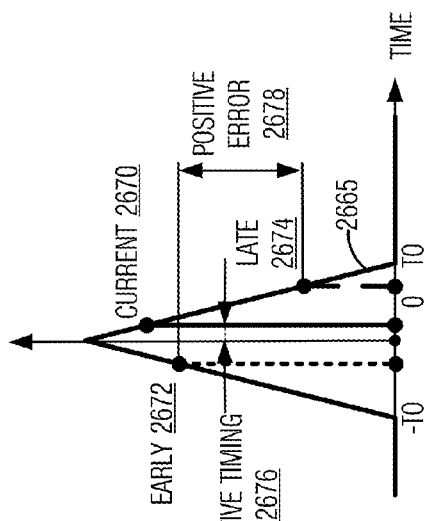
Figure 26A:
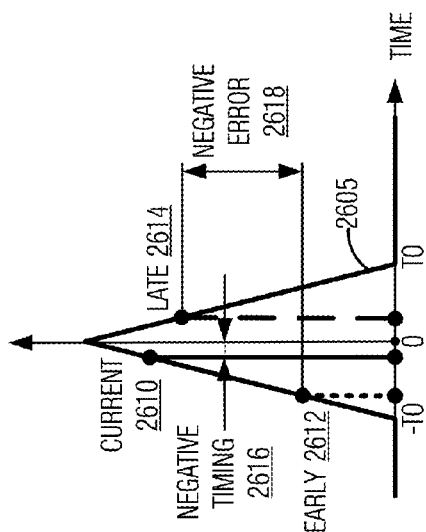

FIGS. 26A-26C illustrate example gradient searches for beam parameter $\tau$. FIG. 26A illustrates an example gradient search for beam parameter $\tau$ when the search is early. Trace 2605 illustrates $\hat{h}_k(\alpha,\beta,\tau)$ for different values of $\tau$. Current 2610 represents the value of $\hat{h}_k$ for the current value of $\tau$, early 2612 represents the value of $\hat{h}_k$ for an early value of $\tau$, and late 2614 represents the value of $\hat{h}_k$ for a late value of $\tau$. Because the current value of $\tau$ is to the left of the optimal value of $\tau$ that corresponds to the maximum value of $\hat{h}_k$, the current value of $\tau$ is said to be negative timing 2616 with respect to the optimal value of $\tau$ and a negative error 2618 results. The negative error suggests that the current value of $\tau$ should be adjusted in a positive direction.

FIG. 26B illustrates an example gradient search for beam parameter $\tau$ when the search has located a maximum value of $\hat{h}_k$. Trace 2635 illustrates $\hat{h}_k(\alpha,\beta,\tau)$ for different values of $\tau$. Current 2640 represents the value of $\hat{h}_k$ for the current value of $\tau$, early 2642 represents the value of $\hat{h}_k$ for an early value of $\tau$, and late 2644 represents the value of $\hat{h}_k$ for a late value of $\tau$. Because the current value of $\tau$ is equal to (or approximately equal to) the optimal value of $\tau$ that corresponds to the maximum value of $\hat{h}_k$, there is no timing error (shown as zero error 2646). Zero error indicates that the current value of $\tau$ should not be adjusted.

FIG. 26C illustrates an example gradient search for beam parameter $\tau$ when the search is late. Trace 2665 illustrates $\hat{h}_k(\alpha,\beta,\tau)$ for different values of $\tau$. Current 2670 represents the value of $\hat{h}_k$ for the current value of $\tau$, early 2672 represents the value of $\hat{h}_k$ for an early value of $\tau$, and late 2674 represents the value of $\hat{h}_k$ for a late value of $\tau$. Because the current value of $\tau$ is to the right of the optimal value of $\tau$ that corresponds to the maximum value of $\hat{h}_k$, the current value of $\tau$ is said to be have positive timing 2676 with respect to the optimal value of $\tau$ and a positive error 2678 results. The positive error suggests that the current value of $\tau$ should be adjusted in a negative direction.

Figure 27A:
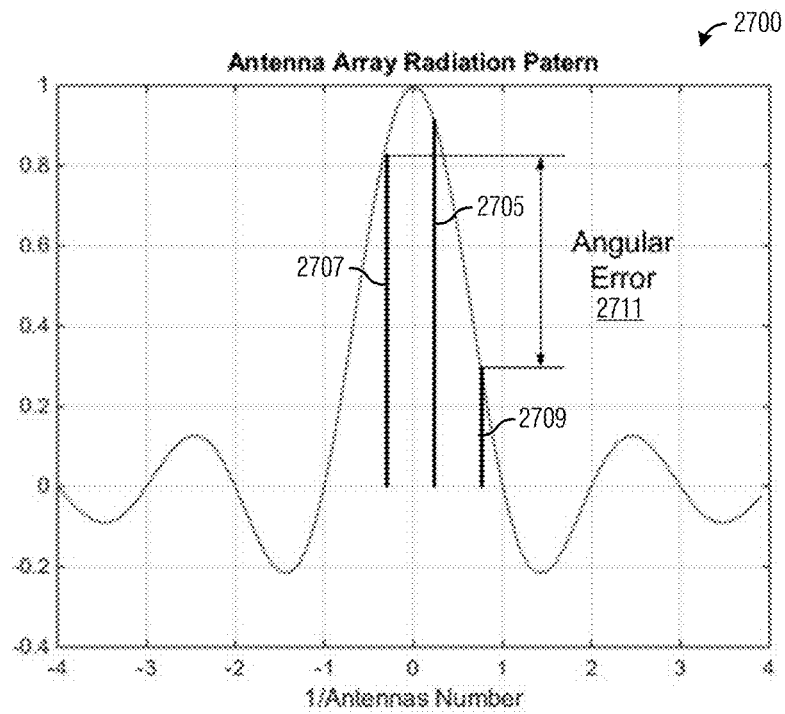
FIGS. 27A and 27B illustrate example gradient searches for beam parameters $\alpha$ and $\beta$ according to example embodiments described herein.
Figure 27B:
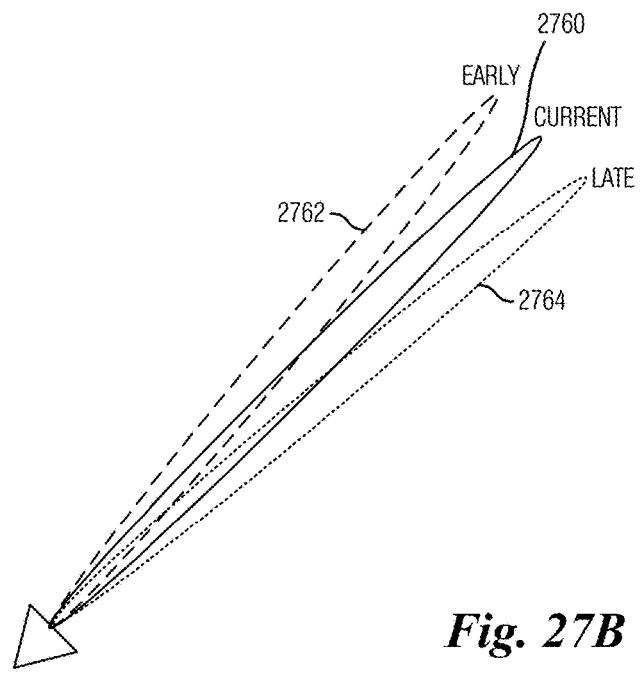

FIGS. 27A and 27B illustrate example gradient searches for beam parameters $\alpha$ and $\beta$. The gradient search is also applicable to the angles of arrival or departure (parameters $\alpha$ and $\beta$) FIG. 27A illustrates an example antenna array radiation pattern 2700. As shown in FIG. 27A, the search is late and the current value of the angle of arrival or departure is to the right of the optimal value of the angle of arrival or departure that corresponds to the maximum value of $\hat{h}_k$. Therefore, the current value of the angle of arrival or departure is said to have positive timing with respect to the optimal value of the angle of arrival or departure and a positive angular error 2711 results. The positive error suggests that the current value of the angle of arrival or departure should be adjusted in a negative direction. Similar situations occur when the current value of the angle of arrival or departure is early or is equal to (or approximately equal to) the optimal angle of arrival or departure. FIG. 27B illustrates the early and late relationships of an angle of arrival or departure in the angular domain. Beam 2760 represents a beam with an angle of arrival or departure that is equal to or approximately equal to the optimal angle of arrival or departure. Beam 2762 represents a beam with an angle of arrival or departure that is early with respect to the optimal angle of arrival or departure. Beam 2764 represents a beam with an angle of arrival or departure that is late with respect to the optimal angle of arrival or departure.

Figure 28:
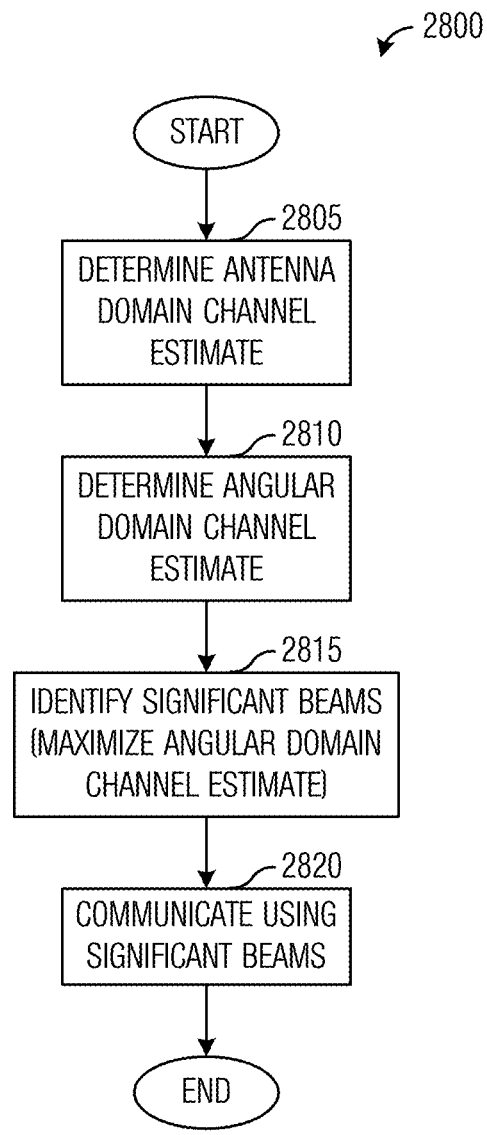
FIG. 28 illustrates a flow diagram of example operations occurring in communications using beam parameters determined from estimates of the multipath channels in the angular domain according to example embodiments described herein.

FIG. 28 illustrates a flow diagram of example operations 2800 occurring in communications using beam parameters determined from estimates of the multipath channels in the angular domain. Operations 2800 may be indicative of operations occurring in a transmitting device, such as an eNB or a UE, with a large scale MIMO antenna array as the transmitting device communicates with a receiving device.

Operations 2800 begin with the transmitting device determining channel estimates in the antenna domain for the large scale MIMO antenna array (block 2805). The transmitting device determines channel estimates in the angular domain from the channel estimates in the antenna domain (block 2810). As discussed previously, the channel estimates in the angular domain may be derived from the channel estimates in the antenna domain through the use of superposition. The transmitting device identifies significant beams in accordance with the channel estimates in the angular domain (block 2815). The transmitting device may find the significant beams by maximizing the channel estimates in the antenna domain. Techniques, such as those described previously, may be used to maximize the channel estimates in the antenna domain and find the beams. The transmitting device communicates using the beams (or the parameters thereof) (block 2820). The beams found in block 2815 may be used to precode transmissions made by the transmitting device, for example. Alternatively, the beams may be used to configure a receive beam of the large scale MIMO antenna array to receive a transmission.

Over time or as conditions change, the transmitting device may be able to update the parameters of the beams without having to repeat the antenna domain channel estimates of the large scale MIMO antenna array, which significantly reduces computational complexity and communications overhead, for example. Additionally, the parameters of the beams may be saved to memory or a database (local or remote). The parameters may then be retrieved for subsequent use. The parameters may be indexed by factors such as time of day, day of week, and so on.

Figure 29:
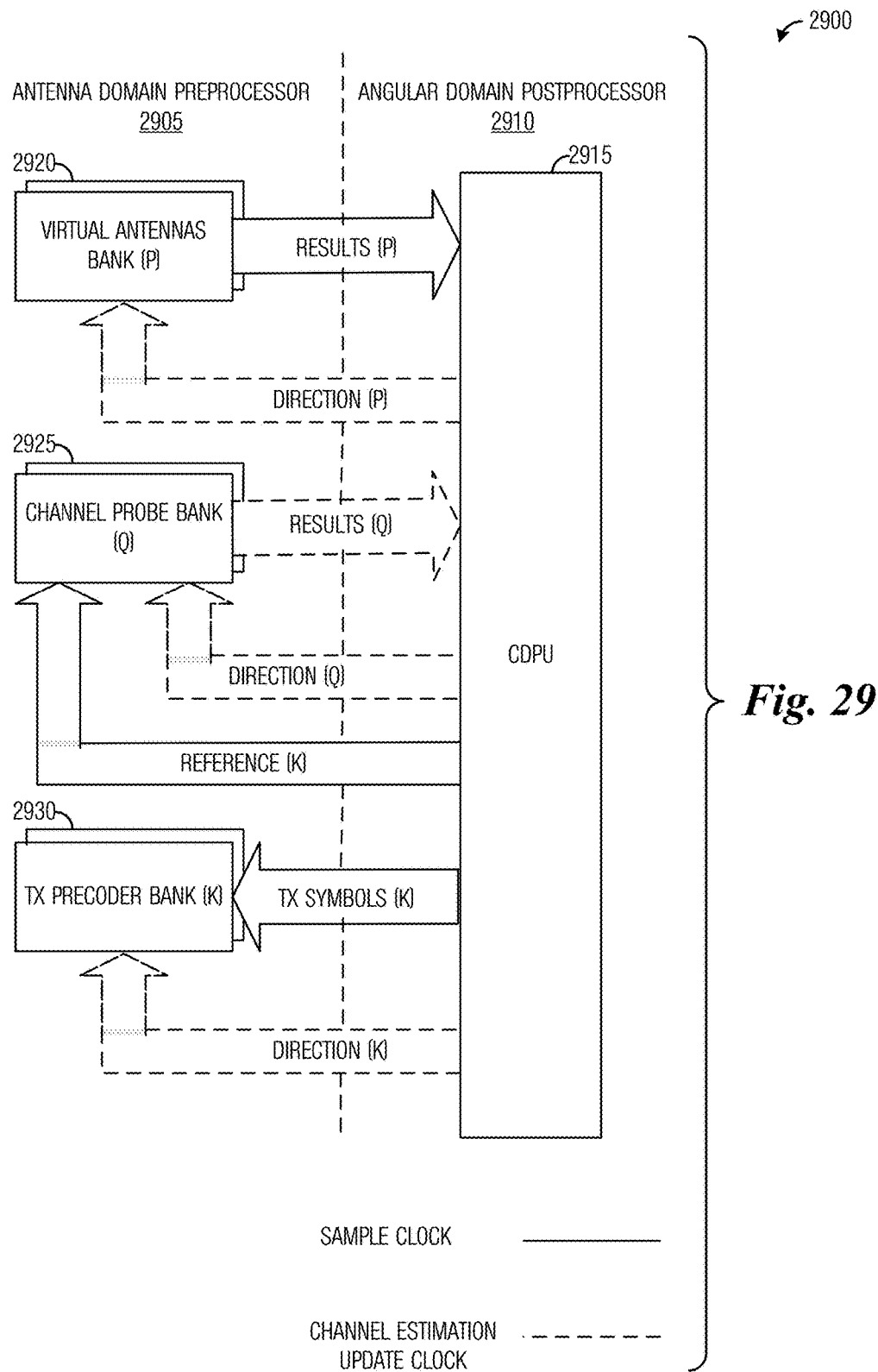
FIG. 29 illustrates an example antenna domain to angular domain (ADAD) converter according to example embodiments described herein.

FIG. 29 illustrates an example antenna domain to angular domain (ADAD) converter 2900. ADAD converter 2900 is configured to convert estimates of multipath channels in the antenna domain into estimates of multipath channels in the angular domain. ADAD converter 2900 is operable with large scale MIMO antenna arrays. ADAD converter 2900 may be partitioned into an antenna domain preprocessor 2905 and an angular domain postprocessor 2910. Antenna domain preprocessor 2905 includes hardware, software, and firmware that operates on signals in the antenna domain, and generates results that are provided to angular domain postprocessor 2910 for conversion into the angular domain. Angular domain postprocessor 2910 includes a central digital processing unit (CDPU) 2915 configured to implement the algorithms presented herein.

Antenna domain preprocessor 2905 includes a virtual antennas bank 2920, a channel probes bank 2925, and a transmit precoder bank 2930. Virtual antennas bank 2920 implements a bank of virtual antennas with steerable direction. In other words, virtual antennas bank 2920 represents the large scale MIMO antenna array with beamforming. The size of virtual antennas bank 2920 (P) is equal to P=K·S, where K is the number of users and S the average number of beams per user. For an efficient large scale MIMO implementation, P should be much smaller than the number of antennas in the large scale MIMO antenna array (M).

Figure 30:
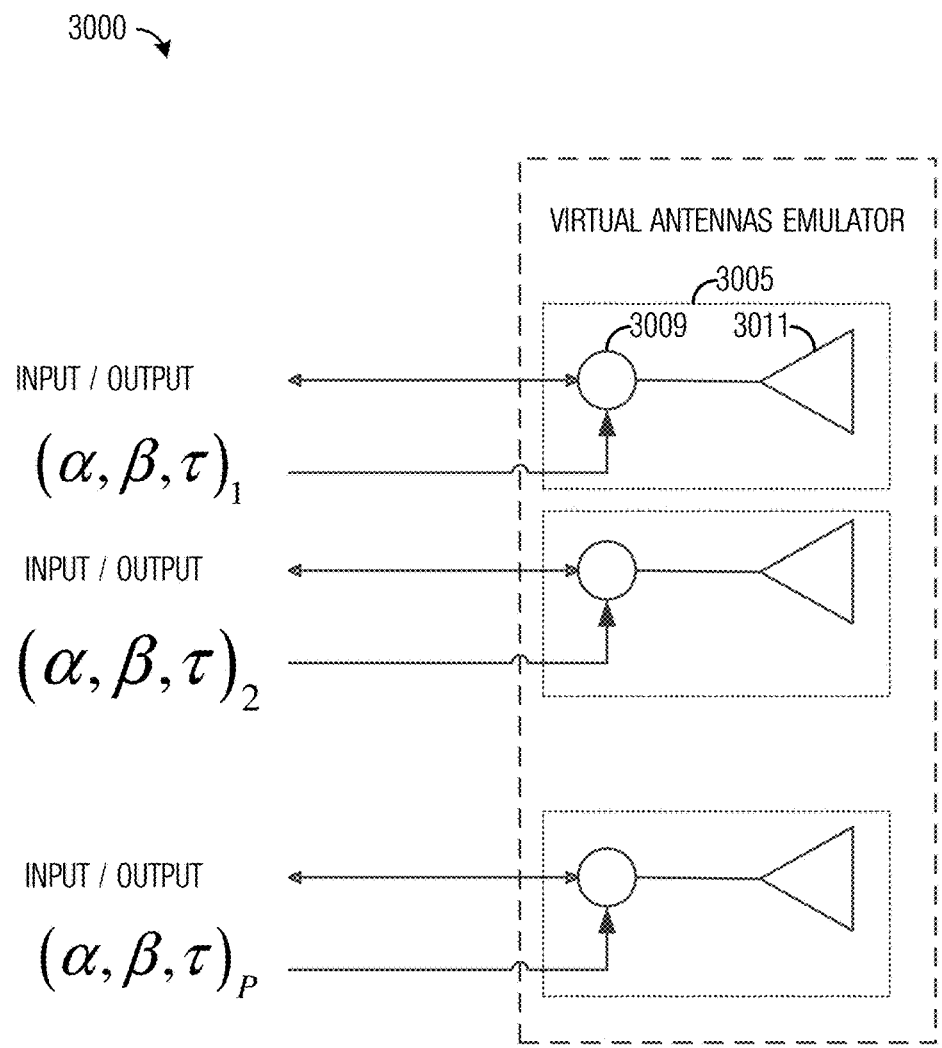
FIG. 30 illustrates a high level view of an example virtual antennas bank according to example embodiments described herein.

FIG. 30 illustrates a high level view of an example virtual antennas bank 3000. Virtual antennas bank 3000 may be an implementation of virtual antennas bank 2920. Virtual antennas bank 3000 includes P virtual antennas, such as virtual antenna 3005. Each virtual antenna includes a multiplier, such as multiplier 3009, and an antenna, such as antenna 3011. The multipliers apply beam parameters ($\alpha,\beta,\tau$) to signals being transmitted (outputs) by the virtual antenna or signals received (inputs) by the virtual antenna.

Figure 31:
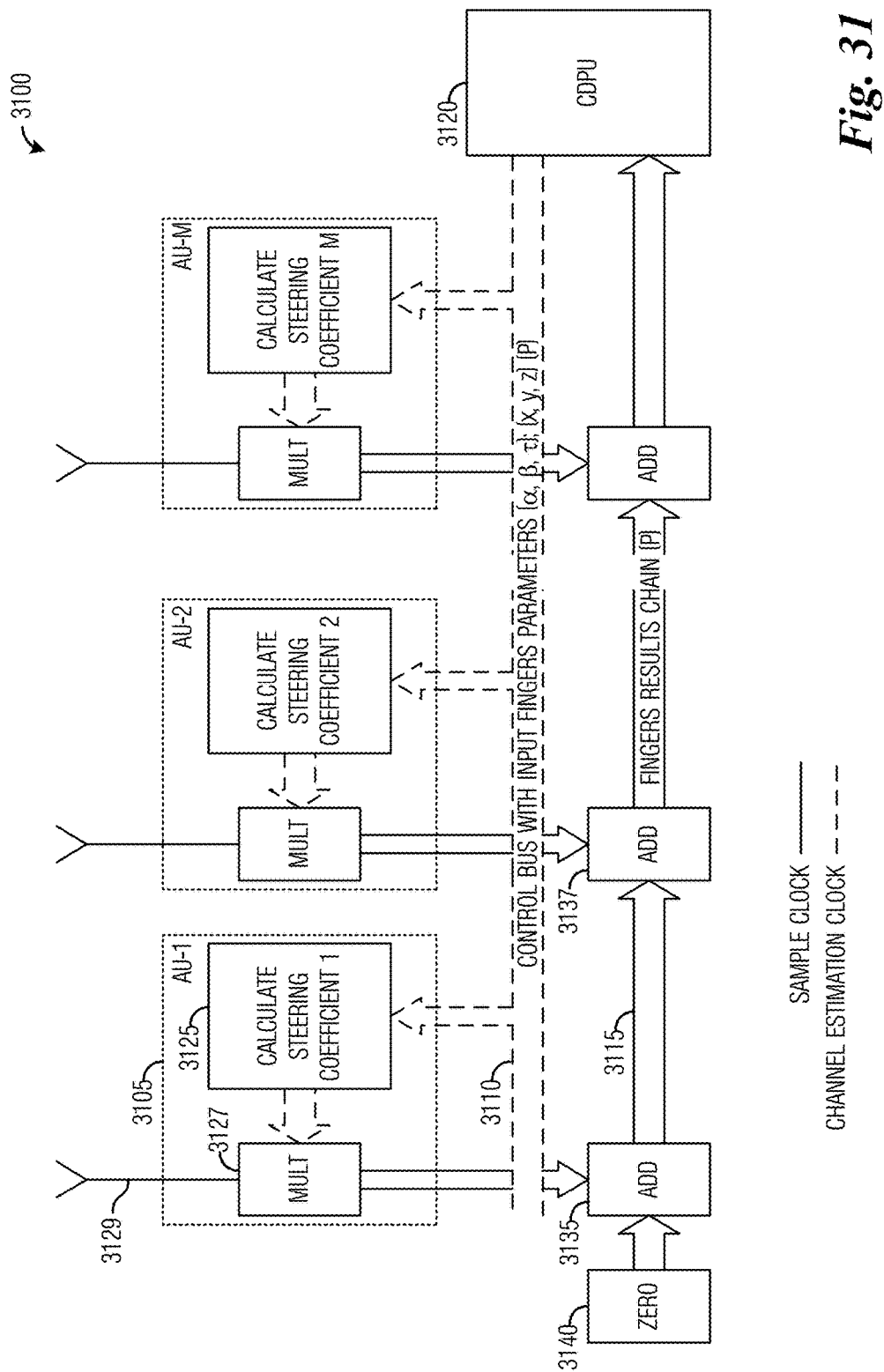
FIG. 31 illustrates an example receiving device highlighting a virtual antennas bank according to example embodiments described herein.

FIG. 31 illustrates an example receiving device 3100 highlighting a virtual antennas bank. Receiving device 3100 includes a plurality of antenna units, such as antenna unit 3105, coupled to one another via a control bus 3110 and a data bus 3115. The plurality of antenna units is coupled to a CDPU 3120 by control bus 3110 and data bus 3115. CDPU 3120 provides input fingers parameters, including beam parameters ($\alpha,\beta,\tau$) and antenna locations (x,y,z) to the plurality of antenna units via control bus 3110.

Each antenna unit includes a calculate steering coefficient unit, such as calculate steering coefficient unit 3125 of antenna unit 3105, and a multiplier, such as multiplier 3127. Each calculate steering coefficient unit is configured to determine steering coefficients for an associated antenna unit in accordance with the parameters (i.e., beam parameters ($\alpha,\beta,\tau$) and antenna locations (x,y,z) provided by CDPU 3120. Each multiplier is configured to multiply signals received by an antenna of an antenna unit, such as antenna 3129 of antenna unit 3105, by the steering coefficients associated with the antenna unit. Adders, such as adder 3135 or adder 3137, accumulate the result of an associated multiplier with a summation of outputs of other antenna units. Adder 3135 of antenna unit 3105 accumulates the output of multiplier 3127 with a zero value from zero unit 3140 because antenna unit 3105 is the first antenna unit.

The output of the multiplier of an m-th antenna unit is expressible as $$\text{steering}_m(f_{UL}+n_F\cdot\Delta f,\alpha,\beta,\tau)\cdot y_m(n_F,n_T).$$

Therefore, the received signal from the large scale MIMO antenna array (i.e., the accumulated outputs from the plurality of antenna units) is expressible as $$y(\alpha,\beta,\tau,n_F,n_T) = \frac{1}{M}\sum_{m=1}^{M}\text{steering}_m(f_{UL}+n_F\cdot\Delta f,\alpha,\beta,\tau)\cdot y_m(n_F,n_T).$$

As shown in FIG. 31, the calculate steering coefficient units are clocked by a channel estimation clock ($F_{CH}$), while the multipliers and the adders are clocked by a sample clock ($F_{SMPL}$), where the sample clock is a much higher frequency clock than the channel estimation clock ($F_{CH} \ll F_{SMPL}$).

Although the virtual antennas bank is shown in FIG. 31 as having a linear configuration, the virtual antennas bank may be arranged in other configurations, such as a mesh configuration, a tree configuration, a distributed array configuration, and so on. Therefore, the illustration and discussion of the linear configuration should not be construed as being limiting to either the scope or the spirit of the example embodiments.

Referring back now to FIG. 29, channel probes bank 2925 is configured to determine estimates of multipath channels in the angular domain. As an example, channel probes bank 2925 determines the estimates of the multipath channels in the angular domain by implementing expression $$\hat{h}_k(\alpha,\beta,\tau) = \frac{1}{M}\cdot\sum_{m=1}^{M}\sum_{n_F=1}^{N_C}\text{steering}_m(f_{UL}+n_F\cdot\Delta f,\alpha,\beta,\tau)\cdot\hat{h}_m,$$

$$\text{where } \hat{h}_m = \frac{1}{N_{REF}}\cdot\sum_{n_T=1}^{N_{REF}}\text{ref}_k^*(n_F,n_T)\cdot y_m(n_F,n_T).$$

Figure 32:
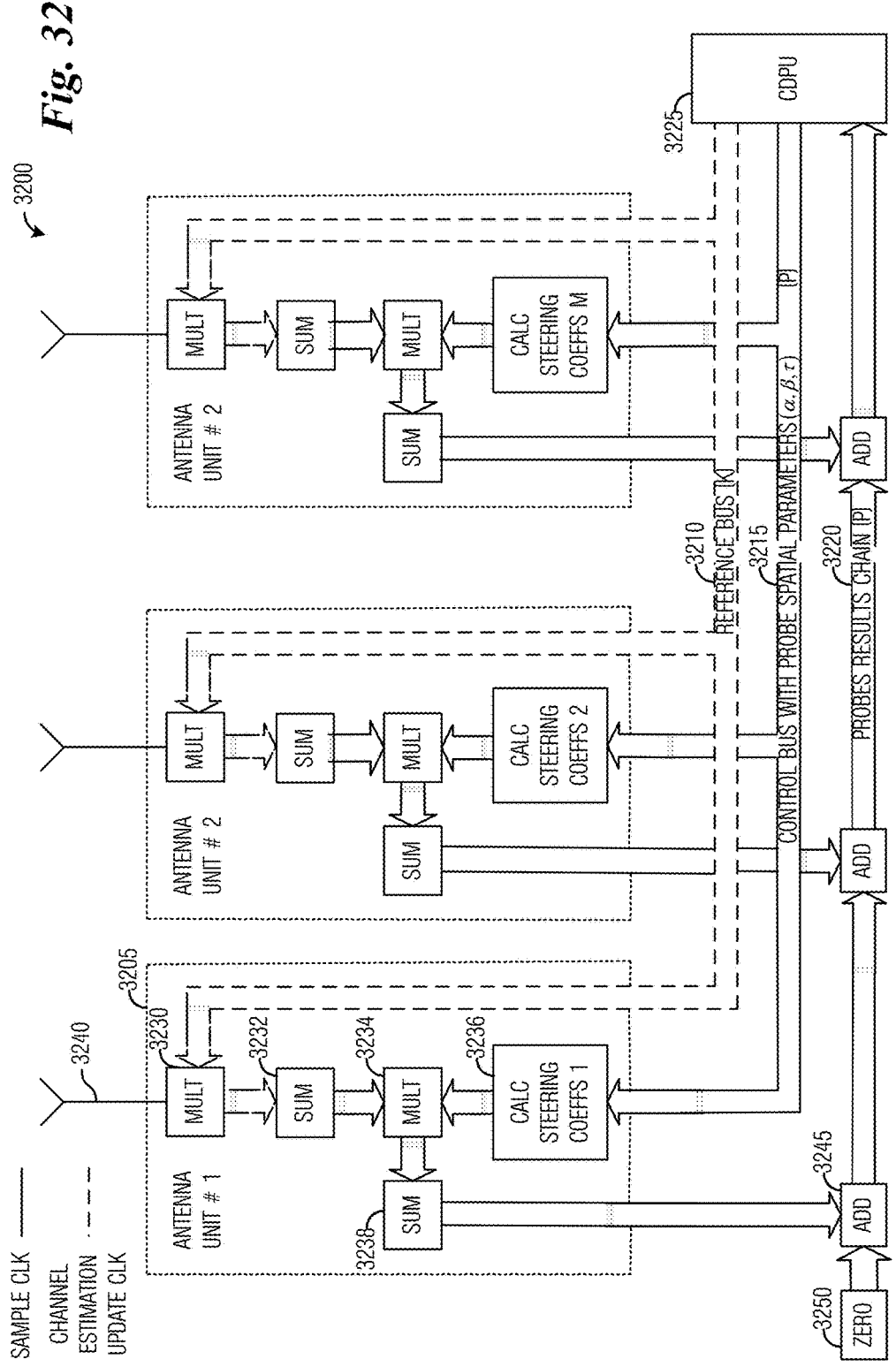
FIG. 32 illustrates an example receiving device highlighting a channel probes bank according to example embodiments described herein.

FIG. 32 illustrates an example receiving device 3200 highlighting a channel probes bank. Receiving device 3200 includes a plurality of antenna units, such as antenna unit 3205, coupled to one another via a reference bus 3210, a control bus 3215, and a data bus 3220. The plurality of antenna units is coupled to a CDPU 3225 by reference bus 3210, control bus 3215, and data bus 3220. CDPU 3225 provides parameters, such as reference signal information, such as the reference sequence) (via reference bus 3210) and spatial parameters ($\alpha,\beta,\tau$) (by way of control bus 3215).

Each antenna unit includes a first multiplier (such as first multiplier 3230) that multiplies signals received by an antenna (such as antenna 3240) with the reference signal information received from CDPU 3225. A first summation unit (such as first summation unit 3232) accumulates the output of the multiplier and provides the summation result to a second multiplier (such as second multiplier 3234). Second multiplier multiplies the summation result with steering coefficients generated by calculate steering coefficients unit (such as calculate steering coefficients unit 3236). A second summation unit (such as second summation unit 3238) accumulated the output of the second multiplier. Adders, such as adder 3245, accumulate the result produced by an associated second summation unit with a summation of outputs of other antenna units. Adder 3245 of antenna unit 3205 accumulates the output of second multiplier 3238 and a zero value from zero unit 3250 because antenna unit 3205 is the first antenna unit.

The output of the second multiplier of an m-th antenna unit is expressible as $$\Sigma_{m=1}^{M}\Sigma_{n_F=1}^{N_C} steering_m(f_{UL}+n_F \cdot \Delta f, \alpha, \beta, \tau) \cdot \hat{h}_m.$$

Therefore, the received signal from the large scale MIMO antenna array (i.e., the accumulated outputs from the plurality of antenna units is expressible as $$\hat{h}_k(\alpha, \beta, \tau) = \frac{1}{M} \cdot \sum_{m=1}^{M} \sum_{n_F=1}^{N_C} steering_m(f_{UL} + n_F \cdot \Delta f, \alpha, \beta, \tau) \cdot \hat{h}_m.$$

As shown in FIG. 32, the first multipliers and the first summation units are clocked by a sample clock, while the second multipliers, the second summation units, and the calculate steering coefficient units are clocked by a channel estimation clock, where the sample clock is a much higher frequency clock than the channel estimation clock.

Although the channel probes bank is shown in FIG. 32 as having a linear configuration, the channel probes bank may be arranged in other configurations, such as a mesh configuration, a tree configuration, a distributed array configuration, and so on. Therefore, the illustration and discussion of the linear configuration should not be construed as being limiting to either the scope or the spirit of the example embodiments.

Interference rejection combining (IRC) is a technique for decoding received signals. In general, IRC involves the regeneration of a transmitted signal as received by a receiving device (such as a base station in uplink transmissions) based upon estimates of data from prior receptions, emulation of distortion arising from multipath channels, and subtraction of regenerated interference signals from received signals to obtain an estimation of the transmitted data with greater reliability. IRC makes use of spatial characteristics of the interference. In some situations, such as when there are large numbers of receive antennas, IRC provides performance improvements over MRC.

In a multicell deployment, a user may receive interference from transmissions associated with other users (referred to herein as interfering users) operating in nearby cells. A received signal at a MIMO receiving device with spatial noise arising from intercell interference may be expressed as $$\begin{bmatrix} y_1 \\ y_2 \\ \vdots \\ y_M \end{bmatrix} = \begin{bmatrix} hu_{1,1} & hu_{1,2} & \ldots & hu_{1,KU} \\ hu_{2,1} & hu_{2,2} & \ldots & hu_{2,KU} \\ \vdots & \vdots & & \vdots \\ hu_{M,1} & hu_{M,2} & \ldots & hu_{M,KU} \end{bmatrix} \begin{bmatrix} xu_1 \\ xu_2 \\ \vdots \\ xu_{KU} \end{bmatrix} + \begin{bmatrix} hi_{1,1} & hi_{1,2} & \ldots & hi_{1,KU} \\ hi_{2,1} & hi_{2,2} & \ldots & hi_{2,KU} \\ \vdots & \vdots & & \vdots \\ hi_{M,1} & hi_{M,2} & \ldots & hi_{M,KU} \end{bmatrix} \begin{bmatrix} xi_1 \\ xi_2 \\ \vdots \\ xi_{KU} \end{bmatrix} + \begin{bmatrix} n_1 \\ n_2 \\ \vdots \\ n_M \end{bmatrix},$$

or equivalently in vector notation $$Y=H_U \cdot X_U + H_I \cdot X_I + N,$$

Where: M is the number of base station receiver antennas;
KU is the number of users served by the base station;
KI is the number of users in the interfering cells;
Y is the samples vector of the receiver with length M;
N is the receiver noise—AWGN N(0,σ) samples vector with length M;
$H_U$ is the base station users channel;
$X_U$ is the data symbols vector of the base station users with length KU;
$H_I$ is the channel of interfering users; and
$X_I$ is the data symbols of the interfering users with length KI.

The IRC expression in the antenna domain for a MIMO receiver is expressible as $$IRC = H_U^H \cdot inv(R_{YY}) \cdot Y,$$

Where: $H_U^H$ is the Hermitian or complex conjugate of $H_U$;
inv( ) is the inverse operation; and
$R_{YY}$ is the received signal covariance matrix with dimension M by M and is expressible as $$R_{YY} = H_U \cdot H_U^H + H_I \cdot H_I^H + \sigma^2 \cdot I.$$

It may be possible to estimate the covariance matrix $R_{YY}$ as $$R_{YY} = E[Y^H \cdot Y] \approx \frac{1}{N_{EST}} \cdot \sum_{n=0}^{N_{EST}} (Y(n)^H \cdot Y(n)),$$

Where: E[ ] is the expected value operation; and
$N_{EST}$ is the length of the estimation vector.

Since the channel and data of the user ($H_U$ and $X_U$, respectively) is known, the covariance matrix may be expressed more precisely as $$R_{YY} = H_U \cdot H_U^H + E[(Y - H_U \cdot X_U)^H \cdot (Y - H_U \cdot X_U)]$$

or $$R_{YY} \approx H_U \cdot H_U^H + \frac{1}{N_{EST}} \cdot \sum_{n=0}^{N_{EST}} ((Y(n) - H_U(n) \cdot X_U(n))^H \cdot (Y(n) - H_U(n) \cdot X_U(n))).$$

It is noted that the complexity associated with estimating the covariance matrix $R_{YY}$ is a function of the number of antennas. Furthermore, the energy is at each antenna drops as the number of antennas increases. Therefore, there is a need for an alternative method for estimating the covariance matrix $R_{YY}$ in large scale MIMO systems, as the number of antennas continues to increase.

According to an example embodiment, IRC decoding is performed in the angular domain. Performing IRC decoding in the angular domain enables simplifying steps that reduces the computational complexity as the number of antennas increases. Detailed discussions of techniques for performing IRC decoding in the angular domain is presented below.

Utilizing the multibeam channel model illustrated in FIG. 4, the multipath uplink and downlink channels for antenna m (where the antennas are randomly located) as a function of S beams are expressible as $$h_{UL,m}(n_F) = $$
$$\sum_{s=1}^{S} a_{UL,s} \cdot \exp(j \cdot 2 \cdot \pi \cdot n_F \cdot \Delta f \cdot \tau_s) \cdot steering_m(f_{UL} + n_F \cdot \Delta f, \alpha_s, \beta_s)$$

and

-continued $$h_{DL,m}(n_F) = \sum_{s=1}^{S} a_{DL,s} \cdot \exp(j \cdot 2 \cdot \pi \cdot n_F \cdot \Delta f \cdot \tau_s) \cdot steering_m(f_{DL} + n_F \cdot \Delta f, \alpha_s, \beta_s),$$

Where: $steering_m(f, \alpha, \beta) = \frac{1}{\sqrt{M}} \cdot$ $$\exp\left(j \cdot 2 \cdot \pi \cdot f \cdot \left(\frac{x_m \cdot \cos(\alpha) \cdot \cos(\beta) + y_m \cos(\alpha) \cdot \sin(\beta) + z_m \cdot \sin(\alpha)}{c}\right)\right).$$

The multibeam channel in matrix form is expressible as $$\begin{bmatrix} h_1 \\ h_2 \\ \vdots \\ h_M \end{bmatrix} = \begin{bmatrix} w_{1,1} & w_{1,2} & \ldots & w_{1,S} \\ w_{2,1} & w_{2,2} & \ldots & w_{2,S} \\ \vdots & \vdots & & \vdots \\ w_{M,1} & w_{M,2} & \ldots & w_{M,S} \end{bmatrix} \cdot \begin{bmatrix} a_1 \\ a_2 \\ \vdots \\ a_S \end{bmatrix}$$

or equivalently in vector notation $$H = W \cdot A,$$

Where: A is the complex amplitude matrix; and
W is the steering matrix with dimension M by S, wherein individual elements of W, $w_{m,s}$, are expressible as $$w_{m,s} = steering_m(\alpha_s, \beta_s) = \frac{1}{\sqrt{M}} \cdot$$

$$\exp\left(j \cdot 2 \cdot \pi \cdot f \cdot \left(\frac{x_m \cdot \cos(\alpha) \cdot \cos(\beta) + y_m \cos(\alpha) \cdot \sin(\beta) + z_m \cdot \sin(\alpha)}{c}\right)\right).$$

FIG. 33 illustrates large scale MIMO antenna array 3300. Large scale MIMO antenna array 3300 includes antennas uniformly arranged in a two-dimensional plane with the antennas being half-wavelength apart. In general, the location of any antenna, such as antenna 3305, in large scale MIMO antenna array 3300 is expressible in coordinate form as $$\begin{pmatrix} x_{mx,my} = 0.5 \cdot \lambda \cdot mx \\ y_{mx,my} = 0.5 \cdot \lambda \cdot my \\ z_{mx,my} = 0 \end{pmatrix},$$

Where: mx is the X dimension index and ranges from 0, 1, ..., $M_X$–1;
my is the Y dimension index and ranges from 0, 1, ..., $M_Y$–1;
$M_X$ is the number of antennas in the X dimension;
$M_Y$ is the number of antennas in the Y dimension; and
λ is the wavelength.

In the angular domain, individual elements of the steering matrix is expressible as $$w_{mx,my,sx,sy} = steering_{y_{mx,my}}(\alpha_{sx,sy}, \beta_{sx,sy}) =$$

$$\frac{1}{\sqrt{M_X \cdot M_Y}} \cdot \exp\left(j \cdot \pi \cdot \begin{pmatrix} mx \cdot \cos(\alpha_{sx}) \cdot \cos(\beta_{sy}) + \\ my \cos(\alpha_{sx}) \cdot \sin(\beta_{sy}) \end{pmatrix}\right),$$

Where: $\alpha_{sx}$, $\beta_{sy}$ are the angles of arrival or departure for beam sx, sy.

If $\begin{pmatrix} \cos(\alpha_{sx}) \cdot \cos(\beta_{sy}) = \frac{2 \cdot sx}{M_X} - 1 \\ \cos(\alpha_{sx}) \cdot \cos(\beta_{sy}) = \frac{2 \cdot sy}{M_Y} - 1 \end{pmatrix}$ with $\begin{pmatrix} sx = 0, 1, \ldots, M_X - 1 \\ sy = 0, 1, \ldots, M_Y - 1 \end{pmatrix}$, then the individual elements of the steering matrix may be simplified to $$w_{mx,my,sx,sy} = steering_{y_{mx,my}}(\alpha_{sx,sy}, \beta_{sx,sy}) =$$

$$\frac{1}{\sqrt{M_X \cdot M_Y}} \cdot \exp\left(j \cdot 2 \cdot \pi \cdot \left(\frac{mx \cdot sx}{M_X} + \frac{my \cdot sy}{M_Y}\right)\right).$$

Therefore, the steering matrix W is a discrete Fourier transform (DFT) matrix and each channel may be represented as a superposition of M orthogonal beams. Then, the following is true $$W^H \cdot W = I,$$

Where: I is the identity matrix.
Then, according to $W^H \cdot W = I$, the following relationships are true $$H_{AntennaDomain} = W \cdot H_{AngularDomain}$$

and $$H_{AngularDomain} = W^H \cdot H_{AntennaDomain}$$

The above relationships enable ready transformations between the antenna domain and the angular domain, and vice versa.

Due to the orthogonal nature of the DFT, received signals may be processed in the antenna domain as well as the angular domain without suffering any performance degradation.

$$\begin{pmatrix} H_{AngularDomain} = W^H \cdot H_{AntennaDomain} \\ Y_{AngularDomain} = W^H \cdot Y_{AntennaDomain} \\ N_{AngularDomain} = W^H \cdot N_{AntennaDomain} \end{pmatrix} \Rightarrow$$

$$\begin{pmatrix} Y_{AntennaDomain} = H_{AntennaDomain} \cdot X + N_{AntennaDomain} \\ \Updownarrow \\ Y_{AntennaDomain} = H_{AntennaDomain} \cdot X + N_{AntennaDomain} \end{pmatrix},$$

Where: $Y_{AntennaDomain}$ is the samples vector of the receiver in the antenna domain;
$Y_{AngularDomain}$ is the samples vector of the receiver in the angular domain;
$N_{AntennaDomain}$ is the receiver noise in the antenna domain;
$N_{AngularDomain}$ is the receiver noise in the angular domain; and
X is the vector of transmitted symbols.

Figure 34A:
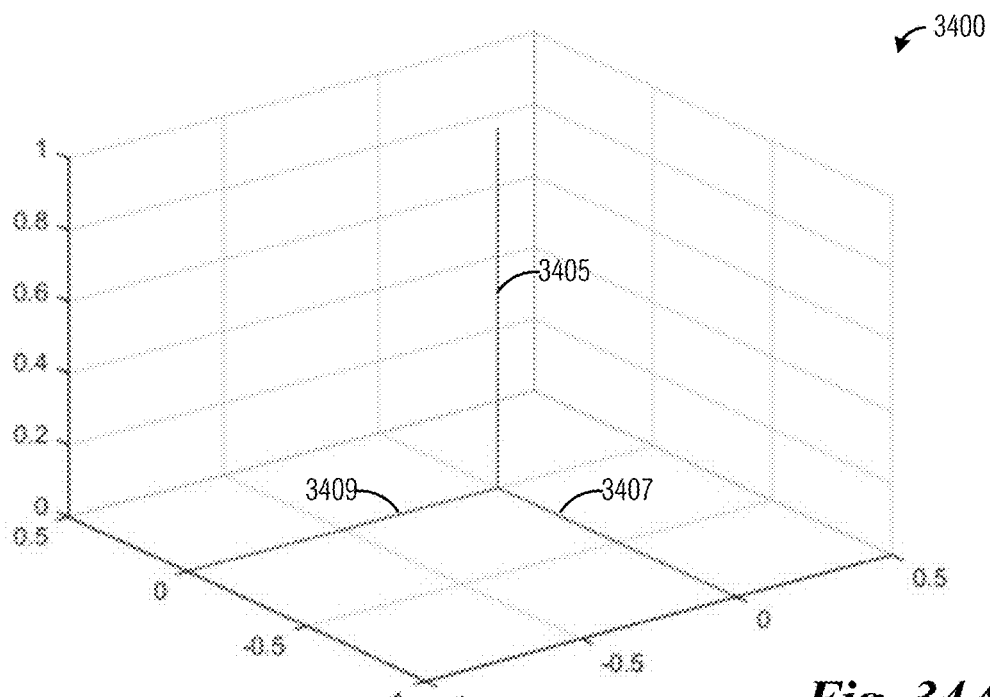
FIG. 34A illustrates a graph of beams in the angular domain for a MIMO antenna array where the antennas are arranged in a 2×2 array according to example embodiments described herein.

FIG. 34A illustrates a graph 3400 of beams in the angular domain for a MIMO antenna array where the antennas are arranged in a 2×2 array. The beams 3405-3409 represent beams in the angular domain for a 2×2 MIMO antenna array.

Figure 34B:
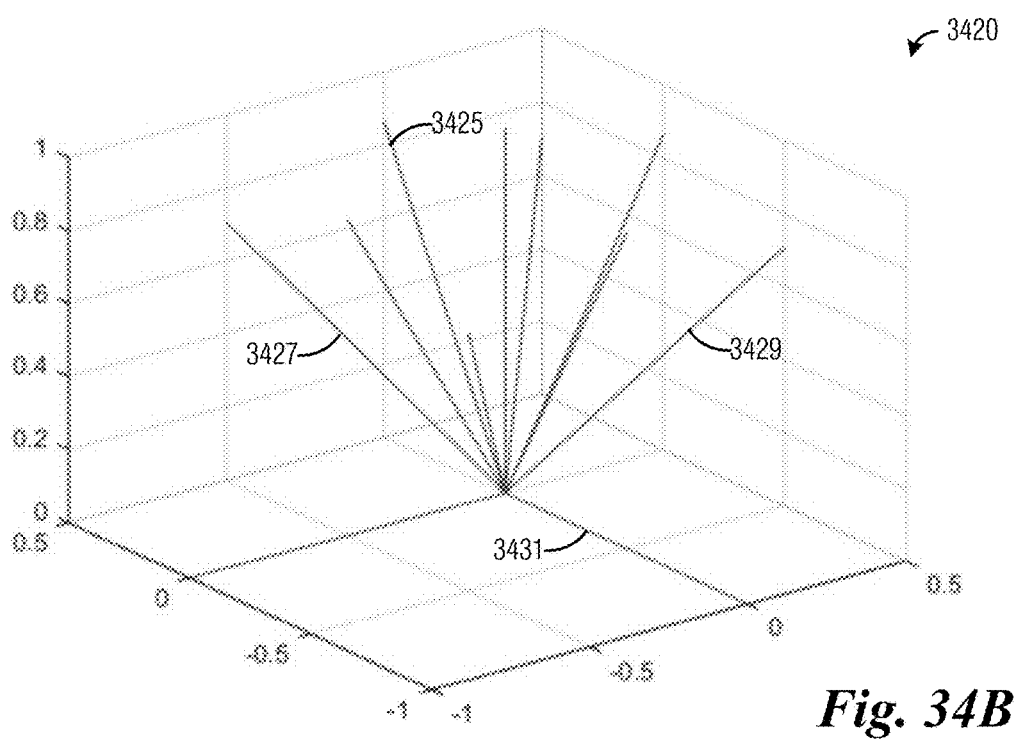
FIG. 34B illustrates a graph of beams in the angular domain for a MIMO antenna array where the antennas are arranged in a 4×4 array according to example embodiments described herein.
Figure 34C:
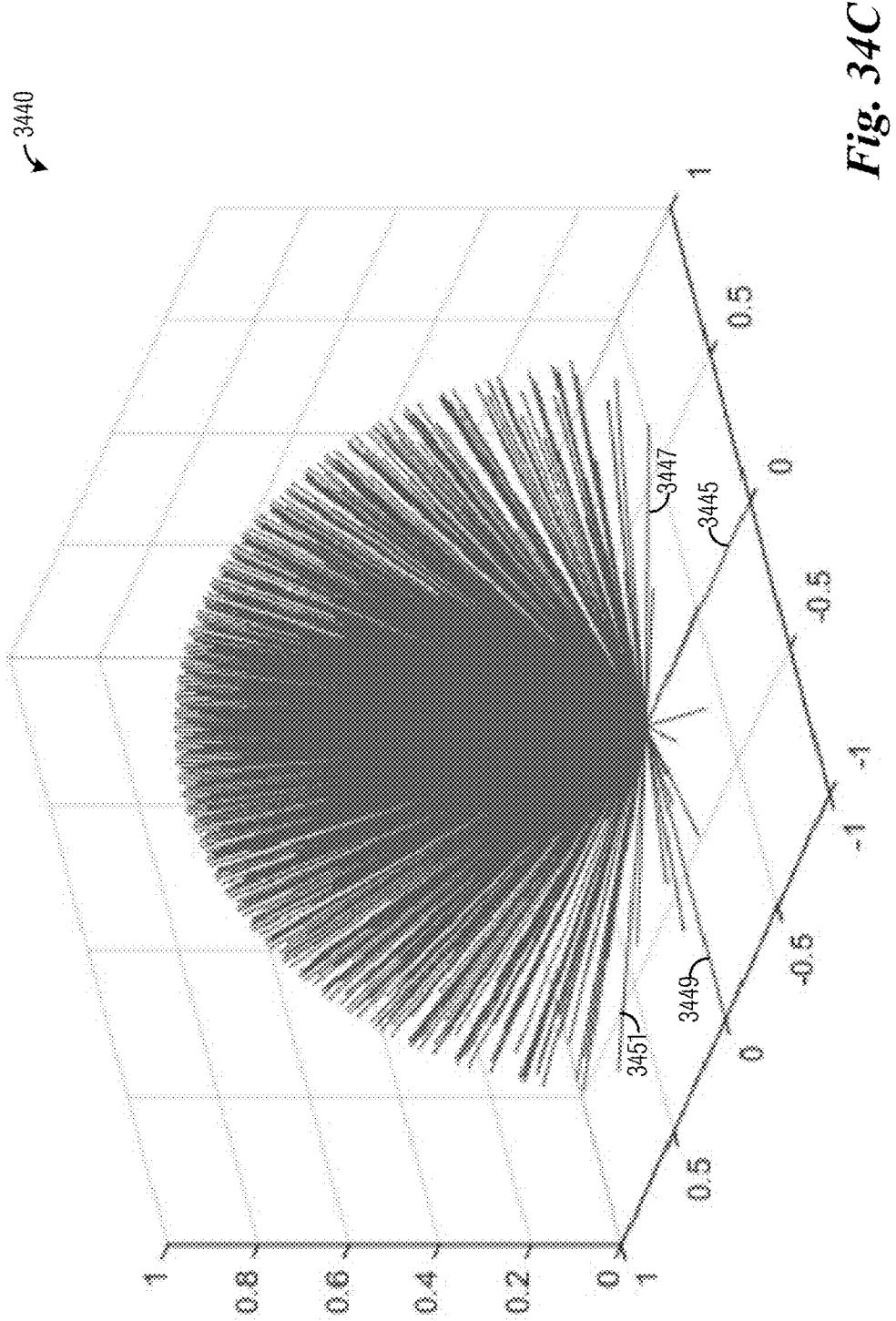
FIG. 34C illustrates a graph of beams in the angular domain for a MIMO antenna array where the antennas are arranged in a 32×32 array according to example embodiments described herein.

FIG. 34B illustrates a graph 3420 of beams in the angular domain for a MIMO antenna array where the antennas are arranged in a 4×4 array. Beams, including beams 3425-3431, beams in the angular domain for a 4×4 MIMO antenna array. FIG. 34C illustrates a graph 3440 of beams in the angular domain for a MIMO antenna array where the antennas are arranged in a 32×32 array. Beams, including beams 3445-3451, beams in the angular domain for a 32×32 MIMO antenna array. As shown in FIGS. 34A-34C, the number of beams in the angular domain increases rapidly as the number of antennas in the MIMO antenna array increases.

However, not every beam in the angular domain has a complex amplitude sufficiently large to contribute significantly to the performance of the communications system and these beams can be ignored when estimating the covariance matrix $R_{YY}$. As an example, beams with complex amplitudes that do not exceed a specified threshold are ignored when estimating the covariance matrix $R_{YY}$. The specified threshold may be specified in a technical standard, an operator of the communications system, or derived from measurements of the communications system. As an example, performance metrics (such as error rates, data throughput, signal to noise ratios, and so on) are used to set and/or adjust the specified threshold.

According to an example embodiment, the covariance matrix $R_{YY}$ is estimated in the angular domain. In general, it is possible to represent any physical channel of M omni directional antennas as a superposition of M virtual directional antennas. However, for a channel that comprises S beams, S virtual directional antennas are sufficient. As discussed previously, S virtual directional antennas are sufficient because not every beam will have complex amplitudes that contribute significantly to the performance of the communications system. These beams, which may be determined in the angular domain by a simple comparison against a threshold, may then be ignored when estimating the covariance matrix $R_{YY}$, thereby reducing computational complexity by a factor of M/S. Furthermore, the energy of users and interferers is spread uniformly between antennas, therefore, the per antenna signal to noise ratio (SNR) is low. Hence, channel and noise covariance matrix estimation in the antenna domain for large values of M is difficult. In the angular domain, energy is concentrated only in specific directions that are significant (e.g., the beams with complex amplitude exceeding the specified threshold) and the SNR in these directions is high, simplifying channel and noise covariance matrix estimation.

Figure 35:
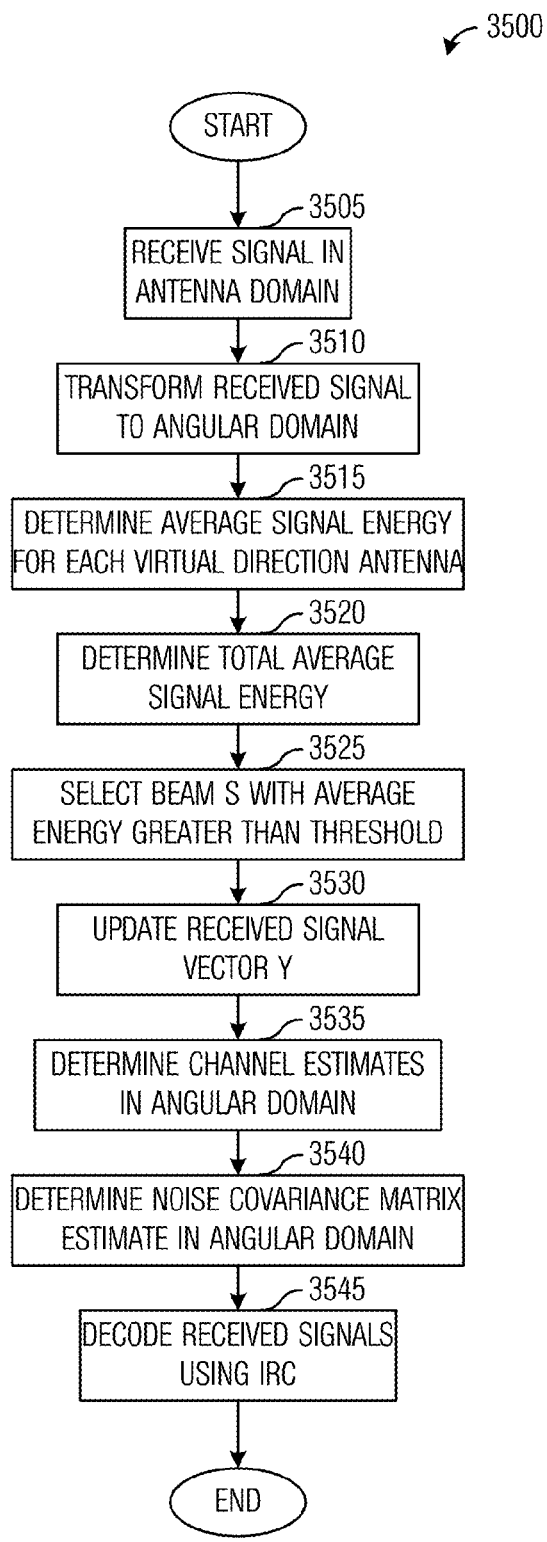
FIG. 35 illustrates a flow diagram of example operations occurring in a device receiving a transmission using a MIMO antenna array according to example embodiments described herein.

FIG. 35 illustrates a flow diagram of example operations 3500 occurring in a device receiving a transmission using a MIMO antenna array. Operations 3500 may be indicative of operations occurring in a device, such as a base station or a UE, receiving a transmission using a MIMO antenna array.

Operations 3500 begin with the device receiving signals in the antenna domain (block 3505). The received signal is denoted $Y_{AntennaDomain}$. The device transforms the received signal ($Y_{AntennaDomain}$) from the antenna domain into the received signal ($Y_{AngularDomain}$) in the angular domain (block 3510). The transformation from the antenna domain to the angular domain may be performed using $Y_{AngularDomain} = W^H \cdot Y_{AntennaDomain}$, for example. The device determines an average signal energy for each of the M virtual direction antenna (block 3515). The average signal energy for an m-th virtual direction antenna is expressible as $$E_S(m) = \frac{1}{N} \sum_{n=1}^{N} |Y_{AngularDomain}(m, n)|^2,$$

Where: N is the number of ??.

The device determines an average total signal energy for the virtual direction antennas, denoted $E_T$ (block 3520). The average total signal energy for the M virtual direction antennas is expressible as $$E_T = \frac{1}{M} \sum_{m=1}^{M} E_S(m).$$

The device selects S virtual direction antennas out of the M virtual direction antennas with an average signal energy that exceeds the specified threshold (block 3525). As an example, the device compares the average signal energy for each of the M virtual direction antennas and those with average signal energy greater than the specified threshold are selected as one of the S virtual direction antennas. The comparison may be expressed as $$E_S(m) > \text{Threshold} \cdot E_T.$$

In other words, the S virtual direction antennas are the virtual direction antennas with average signal energy greater than the specified threshold times the average total signal energy, for example.

The device updates the received signal vector Y in accordance with the S virtual direction antennas (block 3530). As an example, the device removes entries in the received signal vector in the angular domain that correspond to the virtual antenna directions that do not meet the specified threshold. The resulting received signal vector is denoted $Y'_{AngularDomain}$ and is expressible as $$Y'_{AngularDomain} = \text{select}(Y_{AngularDomain}),$$

Where: select( ) is a selection function that retains only values corresponding to the S virtual direction antennas.

The device estimates the channels in the angular domain (block 3535). The estimation of the channels involves pilot or reference sequences. The estimation of the channels in the angular domain is expressible as $$H'_{AngularDomain} = \frac{\sum_{n=1}^{N_{PLT}} PLT^*(n) \cdot Y'_{AngularDomain}(n)}{\sum_{n=1}^{N_{PLT}} PLT^*(n) \cdot PLT(n)},$$

Where: PLT(n) is the pilot or reference sequence used for channel estimation as received by the M virtual direction antennas; and PLT*(n) is the pilot or reference sequence used for channel estimation as received by the S virtual direction antennas.

The device estimates the noise covariance matrix in the angular domain (block 3540). The estimation of the noise covariance matrix is estimated in accordance with the S virtual direction antennas and is denoted $R'_{YY_{AngularDomain}}$ and is expressible as $$R'_{YY_{AngularDomain}} \approx H'_{AngularDomain} \cdot H'^H_{AngularDomain} +$$
$$\frac{1}{N_{PLT}} \cdot \sum_{n=0}^{N_{PLT}} ((Y'_{AngularDomain}(n) - H'_{AngularDomain}(n) \cdot PLT(n))^H \cdot$$
$$(Y'_{AngularDomain}(n) - H'_{AngularDomain}(n) \cdot PLT(n))).$$

The device uses IRC in the angular domain to decode the received signals (block 3545). IRC in the angular domain utilizing signals received by the S virtual direction antennas is expressible as $$IRC = H'_{AngularDomain}{}^{H} \cdot \text{inv}(R'_{YY_{AngularDomain}}) \cdot Y'_{AngularDomain}.$$

Figure 36:
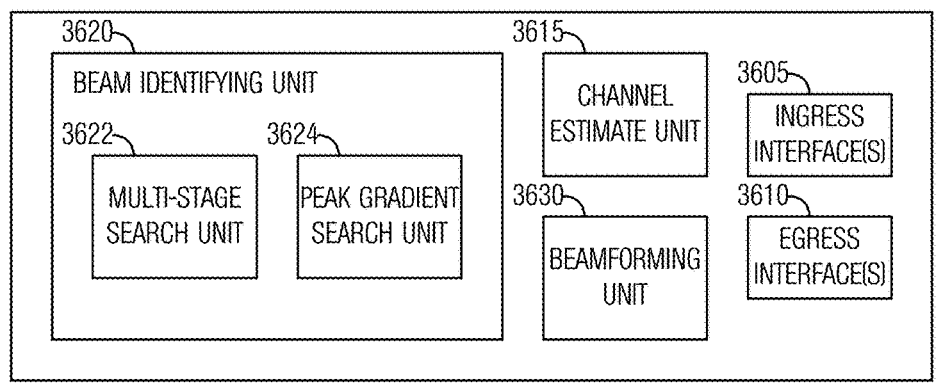
FIG. 36 illustrates a block diagram of a first embodiment communications device according to example embodiments described herein.

FIG. 36 illustrates a block diagram of a first embodiment communications device 3600. Communications device 3600 is adapted to perform communications. As shown in FIG. 36, communications device 3600 includes one or more ingress interfaces 3605, one or more egress interfaces 3610, a channel estimate unit 3615, a beam identifying unit 3620, and a beamforming unit 3630. The one or more ingress interfaces 3605 may be configured to receive information (e.g., instantaneous channel feedback, statistical channel information, etc.) from devices (e.g., receiving devices) in a wireless network, and the one or more egress interfaces 3610 may be configured to send precoded data streams to devices (e.g., receiving devices) in the wireless network.

Channel estimate unit 3615 may include hardware and/or software adapted to determine angular domain channel estimates of the large scale MIMO antenna array in accordance with antenna domain channel estimates of the large scale MIMO antenna array. As an example, the angular domain channel estimates are a superposition of the antenna domain channel estimates. Beam identifying unit 3620 may include hardware and/or software adapted to identify significant beams of the large scale MIMO antenna array by maximizing the angular domain channel estimates. Beamforming unit 3630 may include hardware and/or software adapted to communicate with at least one receiving device utilizing the significant beams as identified. Beamforming unit 3630 may include hardware and/or software adapted to beamform a transmission with beam parameters of a significant beam oriented towards the at least one receiving device, and transmit the beamformed transmission towards the at least one receiving device.

Beam identifying unit 3620 includes multi-stage search unit 3622 and a peak gradient search unit 3624. Multi-stage search unit 3622 may include hardware and/or software adapted to perform a coarse resolution search to identify first amplitudes that exceed a second threshold, and perform a precise resolution search near the first amplitudes to identify the significant beams that exceed the first threshold. Peak gradient search unit 3624 may include hardware and/or software adapted to performing a peak gradient search for each beam parameter.

Figure 37:
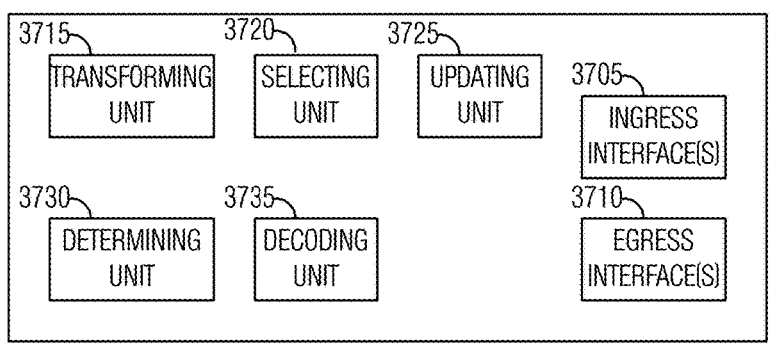
FIG. 37 illustrates a block diagram of a second embodiment communications device according to example embodiments described herein.

FIG. 37 illustrates a block diagram of a second embodiment communications device 3700. Communications device 3700 is adapted to decode received signals. As shown in FIG. 37, communications device 3700 includes one or more ingress interfaces 3705, one or more egress interfaces 3710, a transforming unit 3715, a selecting unit 3720, an updating unit 3725, a determining unit 3730, and a decoding unit 3735. The one or more ingress interfaces 3705 may be configured to receive information (e.g., instantaneous channel feedback, statistical channel information, etc.) from devices (e.g., receiving devices) in a wireless network, and the one or more egress interfaces 3710 may be configured to send precoded data streams to devices (e.g., receiving devices) in the wireless network.

Transforming unit 3715 may include hardware and/or software adapted to transform antenna domain received signals into angular domain received signals. Transforming unit 3715 may include hardware and/or software adapted to multiply the antenna domain received signal with a Hermitian of a steering matrix. Selecting unit 3720 may include hardware and/or software adapted to select antenna beams with an average energy levels exceeding a specified threshold out of available antenna beams of the receiving device. Selecting unit 3720 may include hardware and/or software adapted to determine an average energy level for each of the available antenna beams, determine a total average energy level for all of the available antenna beams, and select the antenna beams with an associated average energy level that is greater than the total average energy level times the specified threshold.

Updating unit 3725 may include hardware and/or software adapted to update a received signal vector in accordance with the selected antenna beams. Determining unit 3730 may include hardware and/or software adapted to determine angular domain channel estimates and an angular domain noise covariance matrix in accordance with the updated received signal vector. Decoding unit 3735 may include hardware and/or software adapted to decode the updated received signal vector utilizing an IRC algorithm. Decoding unit 3735 may include hardware and/or software adapted to evaluate $H'_{AngularDomain}{}^{H} \cdot \text{inv}(R'_{YY_{AngularDomain}}) \cdot Y'_{AngularDomain}$.

Figure 38:
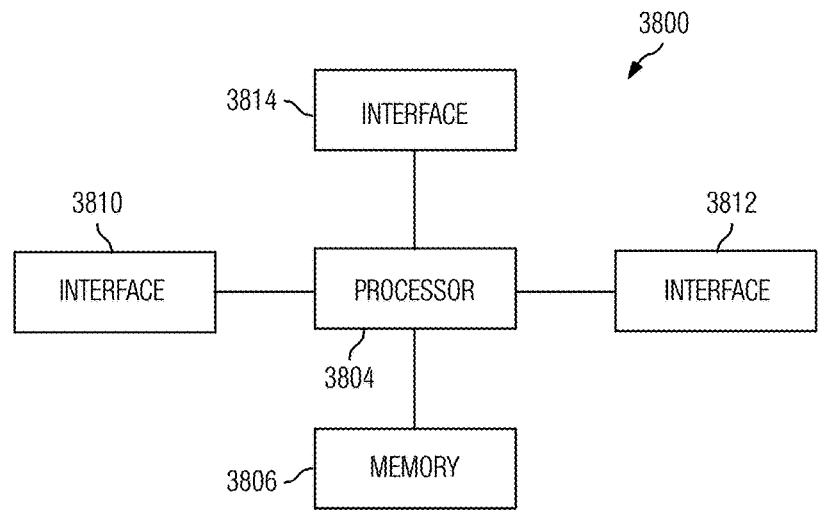
FIG. 38 illustrates a block diagram of an embodiment processing system for performing methods described herein.

FIG. 38 illustrates a block diagram of an embodiment processing system 3800 for performing methods described herein, which may be installed in a host device. As shown, the processing system 3800 includes a processor 3804, a memory 3806, and interfaces 3810-3814, which may (or may not) be arranged as shown in FIG. 38. The processor 3804 may be any component or collection of components adapted to perform computations and/or other processing related tasks, and the memory 3806 may be any component or collection of components adapted to store programming and/or instructions for execution by the processor 3804. In an embodiment, the memory 3806 includes a non-transitory computer readable medium. The interfaces 3810, 3812, 3814 may be any component or collection of components that allow the processing system 3800 to communicate with other devices/components and/or a user. For example, one or more of the interfaces 3810, 3812, 3814 may be adapted to communicate data, control, or management messages from the processor 3804 to applications installed on the host device and/or a remote device. As another example, one or more of the interfaces 3810, 3812, 3814 may be adapted to allow a user or user device (e.g., personal computer (PC), etc.) to interact/communicate with the processing system 3800. The processing system 600 may include additional components not depicted in FIG. 38, such as long term storage (e.g., non-volatile memory, etc.).

In some embodiments, the processing system 3800 is included in a network device that is accessing, or part otherwise of, a telecommunications network. In one example, the processing system 3800 is in a network-side device in a wireless or wireline telecommunications network, such as a base station, a relay station, a scheduler, a controller, a gateway, a router, an applications server, or any other device in the telecommunications network. In other embodiments, the processing system 3800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 39:
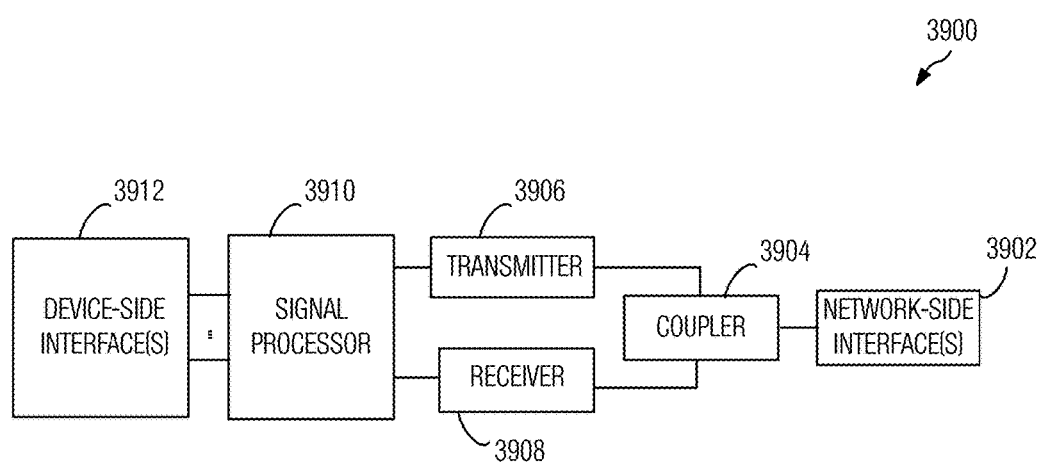
FIG. 39 illustrates a block diagram of a transceiver adapted to transmit and receive signaling over a telecommunications network according to example embodiments described herein.

In some embodiments, one or more of the interfaces 3810, 3812, 3814 connects the processing system 3800 to a transceiver adapted to transmit and receive signaling over the telecommunications network. FIG. 39 illustrates a block diagram of a transceiver 3900 adapted to transmit and receive signaling over a telecommunications network. The transceiver 3900 may be installed in a host device. As shown, the transceiver 3900 comprises a network-side interface 3902, a coupler 3904, a transmitter 3906, a receiver 3908, a signal processor 3910, and a device-side interface 3912. The network-side interface 3902 may include any component or collection of components adapted to transmit or receive signaling over a wireless or wireline telecommunications network. The coupler 3904 may include any component or collection of components adapted to facilitate bi-directional communication over the network-side interface 3902. The transmitter 3906 may include any component or collection of components (e.g., up-converter, power amplifier, etc.) adapted to convert a baseband signal into a modulated carrier signal suitable for transmission over the network-side interface 3902. The receiver 3908 may include any component or collection of components (e.g., down-converter, low noise amplifier, etc.) adapted to convert a carrier signal received over the network-side interface 3902 into a baseband signal. The signal processor 3910 may include any component or collection of components adapted to convert a baseband signal into a data signal suitable for communication over the device-side interface(s) 3912, or vice-versa. The device-side interface(s) 3912 may include any component or collection of components adapted to communicate data-signals between the signal processor 3910 and components within the host device (e.g., the processing system 3800, local area network (LAN) ports, etc.).

The transceiver 3900 may transmit and receive signaling over any type of communications medium. In some embodiments, the transceiver 3900 transmits and receives signaling over a wireless medium. For example, the transceiver 3900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 3902 comprises one or more antenna/radiating elements. For example, the network-side interface 3902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 3900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a channel estimate unit/module, a beam identifying unit/module, a beamforming unit/module, a transforming unit/module, a selecting unit/module, an updating unit/module, a determining unit/module, and/or a decoding unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for communicating using a large scale multiple input multiple output (MIMO) antenna array, the method comprising:
    determining, by a transmitting device, angular domain channel estimates of the large scale MIMO antenna array in accordance with antenna domain channel estimates of the large scale MIMO antenna array;
    identifying, by the transmitting device, significant beams of the large scale MIMO antenna array by maximizing the angular domain channel estimates; and
    transmitting, by the transmitting device, to at least one receiving device utilizing the significant beams as identified.

2. The method of claim 1, wherein the angular domain channel estimates are a superposition of the antenna domain channel estimates.

3. The method of claim 2, wherein the angular domain channel estimates are expressible as $$\hat{h}_k(\alpha, \beta, \tau) = \frac{1}{M} \cdot \sum_{m=1}^{M} \sum_{n_F=1}^{N_C} steering_m(f_{UL} + n_F \cdot \Delta f, \alpha, \beta, \tau) \cdot \hat{h}_m,$$

Where: M is a number of receive antennas;
    $N_C$ is a number of subcarriers;
    $steering_m$ is a steering vector associated with a precoding vector that orient a beam towards a specified direction;
    $\hat{h}_m$ are the antenna domain channel estimates, expressible as $$\hat{h}_m = \frac{1}{N_{REF}} \cdot \sum_{n_T=1}^{N_{REF}} ref_k^*(n_F, n_T) \cdot y_m(n_F, n_T);$$

$N_{REF}$ is a length of a reference or pilot sequence;
$n_T$ is a time index;
$ref_k^*(n_F, n_T)$ is a reference or pilot sequence at time $n_T$ and in subcarrier $n_T$; and
$y_m(n_F, n_T)$ is a signal received by antenna m at time $n_T$ and in subcarrier $n_T$.

4. The method of claim 1, wherein identifying the significant beams comprises searching for beams with amplitudes that exceed a first threshold.

5. The method of claim 4, wherein searching for the beams comprises:
    performing a coarse resolution search to identify first amplitudes that exceed a second threshold; and
    performing a precise resolution search near the first amplitudes to identify the significant beams that exceed the first threshold.

6. The method of claim 4, wherein searching for the beams comprises:
    performing a peak gradient search for each beam parameter.

7. The method of claim 1, wherein communicating with at least one receiving device comprises:

beamforming a transmission with beam parameters of a significant beam oriented towards the at least one receiving device; and transmitting the beamformed transmission towards the at least one receiving device.

8. A non-transitory computer-readable medium storing programming for execution by a processor, the programming including instructions to:

determine angular domain channel estimates of a large scale multiple input multiple output (MIMO) antenna array in accordance with antenna domain channel estimates of the large scale MIMO antenna array;

identify significant beams of the large scale MIMO antenna array by maximizing the angular domain channel estimates; and transmit to at least one receiving device utilizing the significant beams as identified.

9. The non-transitory computer-readable medium of claim 8, wherein the programming includes instructions to perform a coarse resolution search to identify first amplitudes that exceed a first threshold, and perform a precise resolution search near the first amplitudes to identify the significant beams that exceed a second threshold, wherein the second threshold is greater than the first threshold.

10. The non-transitory computer-readable medium of claim 8, wherein the programming includes instructions to perform a peak gradient search for each beam parameter.

11. The non-transitory computer-readable medium of claim 8, wherein the programming includes instructions to beamform a transmission with beam parameters of a significant beam oriented towards the at least one receiving device, and transmit the beamformed transmission towards the at least one receiving device.

12. A large scale multiple input multiple output (MIMO) communications device comprising:

an antenna array;

a processor; and a computer readable storage medium storing programming for execution by the processor, the programming including instructions configuring the large scale MIMO communications device to:

determine angular domain channel estimates of a large scale MIMO antenna array in accordance with antenna domain channel estimates of the large scale MIMO antenna array, identify significant beams of the large scale MIMO antenna array by maximizing the angular domain channel estimates, and transmit to at least one receiving device utilizing the significant beams as identified.

13. The large scale MIMO communications device of claim 12, wherein the programming includes instructions to perform a coarse resolution search to identify first amplitudes that exceed a first threshold, and perform a precise resolution search near the first amplitudes to identify the significant beams that exceed a second threshold, wherein the second threshold is greater than the first threshold.

14. The large scale MIMO communications device of claim 12, wherein the programming includes instructions to perform a peak gradient search for each beam parameter.

15. A method for decoding received signals, the method comprising:

transforming, by a receiving device, antenna domain received signals into angular domain received signals;

selecting, by the receiving device, antenna beams with an average energy levels exceeding a specified threshold out of available antenna beams of the receiving device;

updating, by the receiving device, a received signal vector in accordance with the selected antenna beams;

determining, by the receiving device, angular domain channel estimates and an angular domain noise covariance matrix in accordance with the updated received signal vector; and decoding, by the receiving device, the updated received signal vector utilizing an interference rejection combining (IRC) algorithm.

16. The method of claim 15, wherein transforming the antenna domain received signals into angular domain received signals comprises:

multiplying the antenna domain received signal with a Hermitian of a steering matrix, expressible as $$Y_{AngularDomain} = W^H \cdot Y_{AntennaDomain},$$

Where: $Y_{AntennaDomain}$ is a samples vector of the receiver in the antenna domain;

$Y_{AngularDomain}$ is a samples vector of the receiver in the angular domain;

$W^H$ is the Hermitian of a steering matrix W with dimension M by S, wherein individual elements $w_{m,s}$ are expressible as $$w_{m,s} = steering_m(\alpha_s, \beta_s) = \frac{1}{\sqrt{M}} \cdot$$

$$\exp\left(j \cdot 2 \cdot \pi \cdot f \cdot \left(\frac{x_m \cdot \cos(\alpha) \cdot \cos(\beta) + y_m \cos(\alpha) \cdot \sin(\beta) + z_m \cdot \sin(\alpha)}{c}\right)\right);$$

M is a number of antennas; and
S is a number of antenna beams.

17. The method of claim 15, wherein selecting the antenna beams with the average energy levels exceeding the specified threshold comprises:

determining an average energy level for each of the available antenna beams;

determining a total average energy level for all of the available antenna beams; and selecting the antenna beams with an associated average energy level that is greater than the total average energy level times the specified threshold.

18. The method of claim 17, wherein decoding the updated received signal vector comprises evaluating $$H'_{AngularDomain}{}^H \cdot \mathrm{inv}(R'_{YY_{AngularDomain}}) \cdot Y'_{AngularDomain}$$

Where: $H'_{AngularDomain}{}^H$ is the Hermitian of the angular domain channel estimates;

$R'_{YY_{AngularDomain}}$ is the angular domain noise covariance matrix; and $Y'_{AngularDomain}$ is the updated received signal vector.

19. A non-transitory computer-readable medium storing programming for execution by a processor, the programming including instructions to:

transform antenna domain received signals into angular domain received signals;

select antenna beams with an average energy levels exceeding a specified threshold out of available antenna beams of a receiving device;

update a received signal vector in accordance with the selected antenna beams;

determine angular domain channel estimates and an angular domain noise covariance matrix in accordance with the updated received signal vector; and decode the updated received signal vector utilizing an interference rejection combining (IRC) algorithm.

20. The non-transitory computer-readable medium of claim 19, wherein the programming includes instructions to multiply the antenna domain received signal with a Hermitian of a steering matrix, expressible as $$Y_{AngularDomain} = W^H \cdot Y_{AntennaDomain},$$

Where: $Y_{AntennaDomain}$ is a samples vector of the receiver in the antenna domain;

$Y_{AngularDomain}$ is a samples vector of the receiver in the angular domain;

$W^H$ is the Hermitian of a steering matrix W with dimension M by S, wherein individual elements $w_{m,s}$ are expressible as $$w_{m,s} = steering_m(\alpha_s, \beta_s) = \frac{1}{\sqrt{M}} \cdot$$
$$\exp\left(j \cdot 2 \cdot \pi \cdot f \cdot \left(\frac{x_m \cdot \cos(\alpha) \cdot \cos(\beta) + y_m \cos(\alpha) \cdot \sin(\beta) + z_m \cdot \sin(\alpha)}{c}\right)\right);$$

M is a number of antennas; and
S is a number of antenna beams.

21. The non-transitory computer-readable medium of claim 19, wherein the programming includes instructions to determine an average energy level for each of the available antenna beams, determine a total average energy level for all of the available antenna beams, and select the antenna beams with an associated average energy level that is greater than the total average energy level times the specified threshold.

22. The non-transitory computer-readable medium of claim 19, wherein the programming includes instructions to evaluate $$H'_{AngularDomain}{}^H \cdot \mathrm{inv}(R'_{YY_{AngularDomain}}) \cdot Y'_{AngularDomain}$$

Where: $H'_{AngularDomain}{}^H$ is the Hermitian of the angular domain channel estimates;

$R'_{YY_{AngularDomain}}$ is the angular domain noise covariance matrix; and $Y'_{AngularDomain}$ is the updated received signal vector.

* * * * *